(12) United States Patent
Coster et al.

(10) Patent No.: US 11,192,069 B2
(45) Date of Patent: Dec. 7, 2021

(54) METHOD AND APPARATUS FOR ASSESSING A STATE OF FOULING OF A REVERSE OSMOSIS SYSTEM

(71) Applicant: Nanyang Technological University, Singapore (SG)

(72) Inventors: Hans Gerard Leonard Coster, Singapore (SG); Anthony Gordon Fane, Singapore (SG); Lee Nuang Sim, Singapore (SG); Jia Shin Ho, Singapore (SG); Jiun Hui Low, Singapore (SG)

(73) Assignee: Nanyang Technological University, Singapore (SG)

( * ) Notice: Subject to any disclaimer, the term of this patent is extended or adjusted under 35 U.S.C. 154(b) by 649 days.

(21) Appl. No.: 15/568,221

(22) PCT Filed: Apr. 25, 2016

(86) PCT No.: PCT/SG2016/050193
§ 371 (c)(1),
(2) Date: Oct. 20, 2017

(87) PCT Pub. No.: WO2016/171628
PCT Pub. Date: Oct. 27, 2016

(65) Prior Publication Data
US 2018/0161730 A1   Jun. 14, 2018

(30) Foreign Application Priority Data

Apr. 24, 2015   (SG) .............................. 10201503237P
Mar. 3, 2016   (SG) ............................ 10201601624Q

(51) Int. Cl.
*B01D 65/10* (2006.01)
*B01D 61/02* (2006.01)
(Continued)

(52) U.S. Cl.
CPC .......... *B01D 65/10* (2013.01); *B01D 61/025* (2013.01); *B01D 61/10* (2013.01); *B01D 61/12* (2013.01);
(Continued)

(58) Field of Classification Search
CPC ...... B01D 61/02; B01D 61/025; B01D 61/10; B01D 61/12; B01D 65/10;
(Continued)

(56) References Cited

U.S. PATENT DOCUMENTS

| | | | | |
|---|---|---|---|---|
| 2010/0308842 | A1* | 12/2010 | Coster .................. | B01D 65/104 324/654 |
| 2011/0284480 | A1* | 11/2011 | Karabelas ............ | B01D 35/143 210/767 |

FOREIGN PATENT DOCUMENTS

| | | |
|---|---|---|
| CN | 102935334 A | 2/2013 |
| JP | 1-228509 A | 9/1989 |

OTHER PUBLICATIONS

Antony et al., "In situ structural and functional characterization of reverse osmosis membranes using electrical impedance spectroscopy," *Journal of Membrane Science* 425:89-97, 2013.
(Continued)

*Primary Examiner* — Akash K Varma
(74) *Attorney, Agent, or Firm* — Seed Intellectual Property Law Group LLP

(57) ABSTRACT

A method for assessing a state of fouling of a reverse osmosis system is provided. The method includes deriving a plurality of impedance values from a low frequency region of an electrical impedance spectrum of a reverse osmosis membrane comprised in the reverse osmosis system, and determining a state of fouling of the reverse osmosis system based on the plurality of derived impedance values. Use of the method for in-situ monitoring of fouling on a reverse
(Continued)

osmosis membrane, and an apparatus for assessing a state of fouling of a reverse osmosis system are also provided.

5 Claims, 24 Drawing Sheets

(51) Int. Cl.
  C02F 1/00  (2006.01)
  C02F 1/44  (2006.01)
  B01D 61/10  (2006.01)
  B01D 61/12  (2006.01)
(52) U.S. Cl.
  CPC ............... *C02F 1/008* (2013.01); *C02F 1/441* (2013.01); *B01D 2311/243* (2013.01); *B01D 2313/345* (2013.01); *C02F 2209/05* (2013.01); *C02F 2303/20* (2013.01)
(58) Field of Classification Search
  CPC ......... B01D 2311/243; B01D 2313/345; C02F 1/008; C02F 1/441; C02F 1/00; C02F 2209/05; C02F 2303/20; G01R 27/02; G01R 25/00; G01N 27/02
  USPC ........................................................ 210/739
  See application file for complete search history.

(56) References Cited

OTHER PUBLICATIONS

Bartels et al., "Design considerations for wastewater treatment by reverse osmosis," *Water Science & Technology* 51(6-7):473-482, 2005.
Chen et al., "In situ monitoring techniques for concentration polarization and fouling phenomena in membrane filtration," *Advances in Colloid and Interface Science* 107:83-108, 2004.
Chen et al., "Particle deposition during membrane filtration of colloids: transition between concentration polarization and cake formation," *Journal of Membrane Science* 125:109-122, 1997.
Chilcott et al., "Electrical impedance spectroscopy characterisation of conducting membranes: I. Theory," *Journal of Membrane Science* 195:153-167, 2002.
Chilcott et al., "A novel method for the characterisation of the double fixed charge (bipolar) membrane using impedance spectroscopy," *Journal of Membrane Science* 108:185-197, 1995.
Chong et al., "Enhanced concentration polarization by unstirred fouling layers in reverse osmosis: Detection by sodium chloride tracer response technique," *Journal of Membrane Science* 287:198-210, 2007.
Chong et al., "Implications of critical flux and cake enhanced osmotic pressure (CEOP) on colloidal fouling in reverse osmosis: Experimental observations," *Journal of Membrane Science* 314:101-111, 2008.
Coster et al., "Characterisation of ultrafiltration membranes by impedance spectroscopy. I. Determination of the separate electrical parameters and porosity of the skin and sublayers," *Journal of Membrane Science* 66:19-26, 1992.
Coster et al., "Impedance spectroscopy of interfaces, membranes and ultrastructures," *Bioelectrochemistry and Bioenergetics* 40:79-98, 1996.
Coster, "Principles and Application of Electrical Impedance Spectroscopy," *Membranes & Water Systems—Fouling and Monitoring*, Singapore, Feb. 2015, 22 pages.
Defrance et al., "Comparison between filtrations at fixed transmembrane pressure and fixed permeate flux: application to a membrane bioreactor used for wastewater treatment," *Journal of Membrane Science* 152:203-210, 1999.

Defrance et al., "Reversibility of fouling formed in activated sludge filtration," *Journal of Membrane Science* 157:73-84, 1999.
Field et al., "Critical flux concept for microfiltration fouling," *Journal of Membrane Science* 100:259-272, 1995.
Fortunato et al., "Electrical impedance spectroscopy characterisation of supported ionic liquid membranes," *Journal of Membrane Science* 270:42-49, 2006.
Gaedt et al., "Electrical impedance spectroscopy characterisation of conducting membranes: II. Experimental," *Journal of Membrane Science* 195:169-180, 2002.
Gao et al., "Characterization of forward osmosis membranes by electrochemical impedance spectroscopy," *Desalination* 312:45-51, 2013.
Goosen et al., "Fouling of Reverse Osmosis and Ultrafiltration Membranes: A Critical Review," *Separation Science and Technology* 39(10):2261-2297, 2004.
Hu et al., "Real-time monitoring of scale formation in reverse osmosis using electrical impedance spectroscopy," *Journal of Membrane Science* 453:320-327, 2014.
Kavanagh et al., "Fouling of reverse osmosis membranes using electrical impedance spectroscopy: Measurements and simulations," *Desalination* 236:187-193, 2009.
Kwon et al., "Experimental determination of critical flux in crossflow microfiltration," *Separation and Purification Technology* 19:169-181, 2000.
Li et al., "An assessment of depolarisation models of crossflow microfiltration by direct observation through the membrane," *Journal of Membrane Science* 172:135-147, 2000.
Li et al., "Direct observation of particle deposition on the membrane surface during crossflow microfiltration," *Journal of Membrane Science* 149:83-97, 1998.
Neal et al., "The effect of filament orientation on critical flux and particle deposition in spacer-filled channels," *Journal of Membrane Science* 214:165-178, 2003.
Park et al., "An approach to fouling characterization of an ion-exchange membrane using current-voltage relation and electrical impedance spectroscopy," *Journal of Colloid and Interface Science* 294:129-138, 2006.
Park et al., "Characterization of BSA-fouling of ion-exchange membrane systems using a subtraction technique for lumped data," *Journal of Membrane Science* 246:137-144, 2005.
Park et al., "An electrical impedance spectroscopic (EIS) study on transport characteristics of ion-exchange membrane systems," *Journal of Colloid and Interface Science* 300:655-662, 2006.
Pérez-González et al., "State of the art and review on the treatment technologies of water reverse osmosis concentrates," *Water Research* 46:267-283, 2012.
Romero et al., "Global Model of Crossflow Microfiltration Based on Hydrodynamic Particle Diffusion," *Journal of Membrane Science* 39:157-185, 1988.
Sim et al., "Detection of reverse osmosis membrane fouling with silica, bovine serum albumin and their mixture using in-situ electrical impedance spectroscopy," *Journal of Membrane Science* 443:45-53, 2013.
Smith et al., "The dependence of the conductance of phosphatidylcholine bilayers upon the concentration and composition of the external electrolyte," *Biochimica et Biophysica Acta* 812:181-192, 1985.
Wintgens et al., "The role of membrane processes in municipal wastewater reclamation and reuse," *Desalination* 178:1-11, 2005.
Xu et al., "Effect of membrane fouling on transport of organic contaminants in NF/RO membrane applications," *Journal of Membrane Science* 279:165-175, 2006.
Xu et al., "Electrochemical impedance spectroscopy analysis of sulfonated polyethersulfone nanofiltration membrane," *Desalination* 271:29-33, 2011.
Fu Dafang et al., Self-Forming Dynamic Biofilm Technology, Southeast University Press, China, Feb. 2015, pp. 67-68.

* cited by examiner (A)

(B)

(C)

(A)

(A)

(B)

(A)

(B)

(C)

(D)

(E)

METHOD AND APPARATUS FOR ASSESSING A STATE OF FOULING OF A REVERSE OSMOSIS SYSTEM

CROSS-REFERENCE TO RELATED APPLICATION

This application claims the benefit of priority of Singapore patent application No. 10201503237P filed on 24 Apr. 2015 and Singapore patent application No. 10201601624Q filed on 3 Mar. 2016, the content of which are incorporated herein by reference in their entireties for all purposes.

TECHNICAL FIELD

Various embodiments relate to a method for assessing a state of fouling of a reverse osmosis system.

BACKGROUND

Driven by the need for potable water, more than 15,000 desalination plants are in operation worldwide. Over 50% of these plants rely on reverse osmosis (RO) technology to desalt and produce potable grade water from "used" water or seawater. Reverse osmosis has been widely used in wastewater treatment and reclamation plants for production of high quality water due to the numerous advantages it provides, such as a small footprint with modular construction, process stability, and ability to produce permeate with excellent water quality.

Membrane fouling refers to the deposition of unwanted materials on a membrane surface, and remains a major obstacle limiting its applications, as it may result in (a) decline in permeate flux in constant pressure filtration or increase in transmembrane pressure (TMP) in constant flux filtration, (b) increase in energy and operational costs in order to maintain production rate, (c) reduced membrane lifetimes, (d) down-time for chemical cleaning, as well as costs associated with chemicals and their disposal, and (e) costs associated with replacement of membranes which are irreversibly fouled or damaged by chemical cleaning. Quality of the water produced may also be affected.

There are several types of particulate fouling, including fouling by microbial cells, colloids, and suspended solids. Biofouling is a type of membrane fouling involving microbial cells, and is the most severe form of fouling in processes using reverse osmosis membranes.

Biofouling is generally a biofilm phenomenon involving several stages starting with attachment of microorganisms found in seawater or wastewater feed, bacteria and/or other organic matter onto the membrane surface forming a conditioning layer. In the second stage, the bacteria cells may grow and proliferate, forming micro-colonies and embed themselves in a self-produced matrix of extracellular polymeric substances (EPS), forming a mature biofilm. Lastly, the bacteria cells may detach from the membrane surface, and this stage may be determined by concentration of nutrients, growth rates, accumulation of dispersal signals, mechanical stability of the biofilm, and also effective shear force of the feed water.

Biofouling is an inevitable and costly problem which occurs on the membrane surface despite cleaning protocols that may be in place. For example, biofouling accounted for approximately 30% of the operating cost for a reverse osmosis plant at Water Factory 21 in Orange County, California, and the amount spent on biofouling control there was estimated to be $730,000 per year. In another study, the potential annual savings that could be achieved by early warning of biofouling for seawater reverse osmosis (SWRO) plants was estimated to be $2 million.

Biofilm formation on membrane surfaces results in a severe decline in flux, or an increase in transmembrane pressure and feed pressure required to maintain flux. This may lead to higher energy consumption, and deterioration of system performance and water production.

Fouling by particulate and colloidal material may also result in severe decline in flux or an increase in the transmembrane pressure required to maintain flux. Typically, these changes in performance due to fouling are monitored by inlet pressure increase required to maintain water production and/or a drop in permeate quality. Rules of thumb, such as 10% to 15% increase in pressure are used to trigger the application of cleaning counter-measures. The raised pressure approach, however, is insensitive to initial fouling. In a multi-module pressure vessel, the pressure is a global parameter caused by fouling along the pressure vessel. Over time, the fouling shifts from inlet to outlet due to the fouling creep (or 'flux levelling'). By the time, the trigger pressure is reached; the whole system may already be extensively fouled.

In addition to the above, biofouling has been identified as the most crucial problem in the operation of seawater reverse osmosis plants. One method to prevent biofouling in these plants is to use continuous chlorine dosing of the raw seawater feed upstream and a de-chlorination process just prior to the reverse osmosis membrane stage. Another method involves use of low pressure membrane pretreatment. Notwithstanding the above, even with a microfiltration (MF) pretreatment step, biofouling in reverse osmosis cannot be eliminated completely as it only requires a few residual microorganisms to slip through the microfiltration membranes and deposit on the reverse osmosis membrane to eventually form a mature biofilm. Similarly, inorganic fouling from inorganic materials, for instance, silica and calcium salts cannot be effectively removed by pre-treatment, and eventually causes fouling and scaling on the reverse osmosis membrane.

To-date, there is no simple method to detect biofouling, except performing an autopsy study on the fouled membrane. However this is a destructive method. To minimize impact of the biofilm on the operation of wastewater treatment plants, biological parameters to assess biofouling potential of the feed water may be used, as studies have shown that the feed water quality plays a crucial role in membrane biofouling. Adenosine triphosphate (ATP) quantification and direct cell count using fluorescence microscopy are related to concentration of microorganisms present and may be used as indicators for biofouling. The amount of assimilable organic carbon (AOC), that is a growth promoting nutrient and a proxy to biofilm formation rate (BFR), has been considered as an indicator of potential biofouling.

The above-mentioned parameters may be applicable for screening of biofouling potential in the feed water but are not suited to in situ, real-time monitoring or to provide early warning of membrane fouling as they cannot be determined directly without sampling. Therefore, when an increase of bacteria count or other biological parameters is observed, the membranes would already have been severely fouled. Furthermore, most industrial plants do not have systems installed to assess the biological activities or the initiation of biofilm development, despite the enormous amount of investment spent on tackling biofouling. Without a definitive means to determine onset of biofilm formation, most of the treatment plants carry out cleaning based on a preset schedule or when there is apparent evidence of growth (such as pressure reaching a threshold). This can lead to possibility of improper dosage of biocides or suboptimal cleaning schedules.

In addition to, or apart from the above, membrane fouling may take place as a result of particulate fouling by colloids and/or suspended solids. To mitigate such fouling and improve filtration performance, one method may be to operate the reverse osmosis system below a critical flux. The critical flux may depend on variables such as hydrodynamics and feed water quality. This concept was adopted from that for microfiltration, where it was postulated that there exists a flux on start-up, below which a decline of flux with time does not occur or is minimal, whilst above this critical flux, fouling will occur.

During a membrane separation process, one component, usually water, passes through the membrane whilst other components, such as solutes and colloidal particles, in the feed do not pass through the membrane. In such a separation process, concentration of the solutes, such as salts, at the membrane surface may rise above their concentration in the bulk feed solution. This may be termed as concentration polarization (CP) effect. Operation above the critical flux may result in the deposition of a colloidal layer on the membrane surface, which may eventually consolidate and form what is referred to as a "cake". Upon cake formation, an additional resistance to the permeate flow, termed the cake resistance, is present, and this may increase the overall hydraulic resistance.

For reverse osmosis membranes, the deposited layer on the membrane surface could hinder back-diffusion of solutes, such as salt, hence concentration of the solutes due to concentration polarization tend to increase. This leads to what is termed as the cake-enhanced concentration polarization (CECP) phenomena. Further, the solutes in this 'unstirred' cake layer are not exposed to the shear forces of the crossflow, causing the concentration and the osmotic pressure of solutes at the membrane surface to be enhanced further. The transmembrane pressure required to maintain production of water will then increase further to overcome enhanced osmotic pressure at the membrane surface. Thus, loss of overall reverse osmosis performance may result both from increase in hydraulic resistance and the cake enhanced osmotic pressure (CEOP) effect.

There exist three methods for determining critical flux. Critical flux may, for example, be determined by a flux-step method, where flux is adjusted in an incremental manner and the transmembrane pressure (TMP) is recorded. The TMP measurement, however, is unable to provide information on a phenomenon commonly occurring in reverse osmosis processes, known as the cake enhanced osmotic pressure (CEOP) effect. Another method to determine critical flux involves monitoring concentration of particles in the outlet stream, and determining critical flux based on a particle mass balance. The critical flux is the maximum flux at which deposition rate of particles on the membrane is zero. This technique, however, suffers from limitations in that it may not be able to give an accurate critical flux if amount of deposition is low and relative change in the bulk concentration is not high enough. Critical flux may also be determined using a direct observation through the membrane (DOTM) technique, where particle deposition on the membrane is detected using a microscope. This method, however, may be used only with transparent membranes and modules with a transparent permeate side.

All of these methods to determine critical flux are more suited for laboratory, flat-bed, membrane systems. They are difficult to implement in an actual membrane separation system, and especially so in spiral-wound membrane modules used in industrial plants.

The concept of critical flux is useful but alone may not give sufficient guidance for plant operators to optimize the performance in actual systems. For example, in case of many actual wastewater streams, operating below the critical flux may not be sufficient to achieve zero fouling rates as other factors may come into play because of the complex nature of the feed water. As such, a concept called the threshold flux, defined as the flux at or below which a low and near constant rate of fouling occurs, but above which the rate of fouling increases markedly and rapidly, has been developed. Thus, threshold flux is a transition between low (negligible) fouling and significant fouling.

In summary, none of the above-mentioned techniques may be used to assess properties of the membrane-solution interface at or around point of critical flux, or point of threshold flux.

In view of the above, there is a need for an improved method for assessing a state of fouling of a reverse osmosis system that overcomes or at least alleviates one or more of the above-mentioned problems.

SUMMARY

In a first aspect, a method for assessing a state of fouling of a reverse osmosis system is provided. The method comprises
 a) deriving a plurality of impedance values from a low frequency region of an electrical impedance spectrum of a reverse osmosis membrane comprised in the reverse osmosis system, and
 b) determining a state of fouling of the reverse osmosis system based on the plurality of derived impedance values.

In a second aspect, an apparatus for assessing a state of fouling of a reverse osmosis system is provided. The apparatus comprises
 a) two or more electrodes configured to be arranged on opposing sides of a reverse osmosis membrane,
 b) an alternating current generator configured to generate an alternating electrical current of various frequencies between the two or more electrodes,
 c) a detector configured to measure (i) a voltage across the membrane, (ii) a current through the membrane, and (iii) a phase difference between the voltage and the current, at the various frequencies, and
 d) a processor configured to derive an impedance value in a diffusion polarization layer adjacent to the membrane using the measured voltage, current, and phase difference.

In a third aspect, use of a method according to the first aspect or an apparatus according to the second aspect for in-situ monitoring of fouling on a reverse osmosis membrane is provided.

In a fourth aspect, use of a method according to the first aspect or an apparatus according to the second aspect for in-situ monitoring of effectiveness of cleaning and/or degree of cleaning during a cleaning operation of a reverse osmosis membrane is provided.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
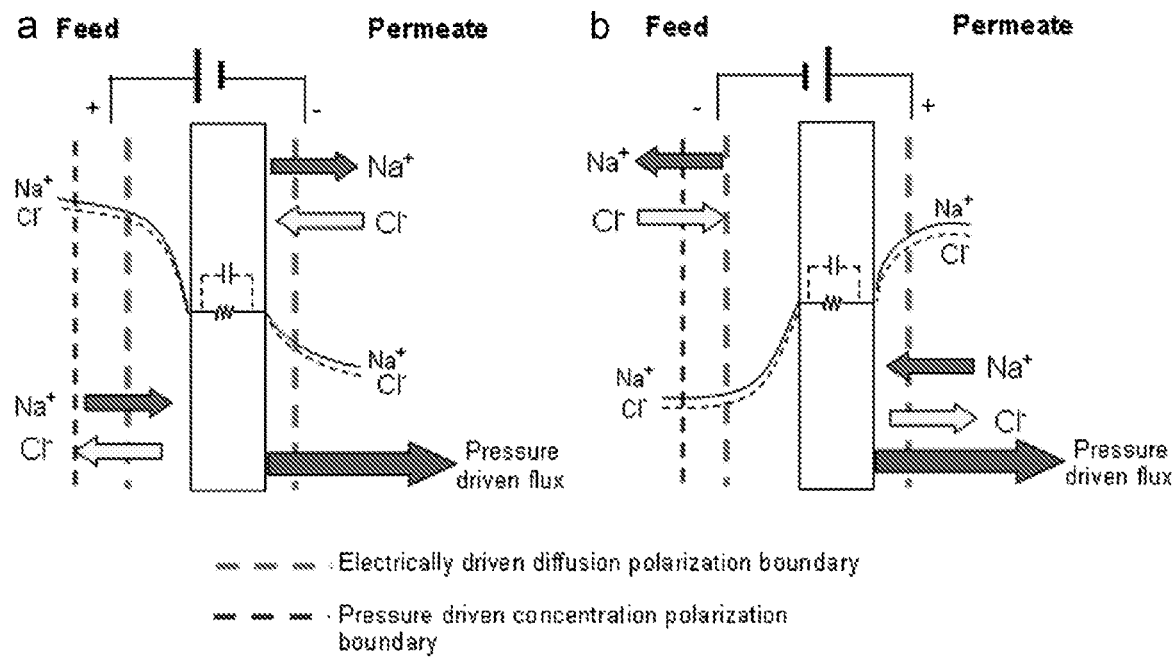
FIGS. 1(a) and (b) are schematic illustrations of electrical driven diffusion polarization (DP) process at low frequencies of alternating current. The profiles of concentration shown in (a) are for that part of the alternating current (AC) cycle when the electric current is towards the membrane from the feed side to the permeate side. Without wishing to be bound by theory and for illustration purposes only, it is assumed herein that in the membrane, the transport number (fraction of current carried) for $Na^+$ is greater than that for $Cl^-$. In the next half cycle of the AC current, the concentration profiles are reversed as shown in (b). Note that a DP layer exists at both the feed and permeate sides of the membrane and the impedance elements associated with these are electrically in series.

Various embodiments of the first aspect relate to a method for assessing a state of fouling of a reverse osmosis system. The method may be used, for example, to determine critical flux and/or threshold flux of a reverse osmosis membrane, which may in turn be used for determination of suitable operating conditions to minimize membrane fouling. The method may also be used to determine whether material, such as silica, is accumulating on the membrane, such as in the concentration polarization (CP) layer and whether a more consolidated cake is forming on the surface so that mitigation measures may be implemented to reduce this or reverse it. The method may also be used to determine whether or not biofouling is occurring on the membrane surface and for assessing the effectiveness of biocide or antimicrobial agent in mitigating fouling. As a result, fouling mitigation measures may be carried out well before the membrane is severely fouled.

The term "osmosis" as used herein refers to the net movement of a solvent across a selectively permeable membrane driven by a difference in osmotic pressure across the membrane. Osmotic pressure ($\pi$) is the pressure which, if applied to the more concentrated solution, prevents transport of solvent across the membrane. In a normal osmosis process, solvent naturally moves from a region of low solute concentration through a membrane to an area of high solute concentration. Reverse osmosis, on the other hand, operates differently from a normal osmosis process, in that an external pressure is applied to reverse the natural flow of solvent.

Generally, in a reverse osmosis (RO) process, a predetermined pressure, typically in the range from about 5 bar (about 72 psi) to about 60 bar (about 870 psi), is applied to a feed solution to overcome osmotic pressure of the feed water to force the feed solution through a selectively permeable membrane. The applied pressure acts as the driving force for mass transport through the membrane. The selectively permeable membrane in a reverse osmosis system may filter impurities from the feed solution, leaving purified solvent, otherwise termed permeate solvent, on the other side (permeate side) of the membrane.

A reverse osmosis system may comprise a reverse osmosis membrane assembly containing one or more reverse osmosis membranes. The term "membrane" as used herein refers to a semi-permeable material that selectively allows certain species to pass through it while retaining others within or on the material, thereby functioning like a filter medium to permit a component separation by selectively controlling passage of the components from one side of the membrane to the other side. In various embodiments, the selectively permeable membrane allows passage of water ($H_2O$), but rejects solute molecules and/or ions.

Examples of membrane configuration include tubular membranes, hollow fiber membranes, flat-sheet membranes, and spiral-wound membranes. Tubular membranes and hollow fiber membranes assume the form of hollow tubes of circular cross-section, whereby the wall of the tube functions as the membrane. Flat-sheet membranes, on the other hand, are formed from one or more sheets of membrane material placed adjacent to or bonded to one another. When two or more reverse osmosis membranes are present, the membranes may be arranged in series with respect to fluid flow through the membranes.

Reverse osmosis membranes are typically packed in a spiral-wound configuration. Each of the spiral wound element may be made from layers of flat-sheet membranes, feed separators and permeate spacer wrapped around a hollow core. Typically, the feed flows axially through the channels between the feed separators and the water permeates through the membrane and flows towards the central product tube. In membrane systems, the spiral wound elements are placed in series inside of a pressure vessel. Depending on the production requirement, multiple pressure vessels may be required and which may be connected in parallel to form a bank of membranes.

A feed line may be connected to the reverse osmosis membrane assembly to supply a feed stream to the membrane assembly, where it is separated into a purified water stream (permeate) and a concentrated waste stream (concentrate), and which may respectively be channeled away from the membrane assembly via a permeate line and a concentrate line. A pumping mechanism such as a feed pump is generally present in the reverse osmosis system for providing pressure to the feed source to drive the feed stream through the reverse osmosis membrane assembly.

The method comprises deriving a plurality of impedance values from a low frequency region of an electrical impedance spectrum of a reverse osmosis membrane comprised in the reverse osmosis system.

The term "a plurality of" refers to more than one, for example 2, 3, 4, 5, 6, 7, 8, 9 or more of the referenced species. In principle, if the characteristic frequency (inverse of the time constant) of the diffusion polarization layer is known, only one impedance measurement at a specific frequency is required. However, since the characteristic frequency of the diffusion polarization layer changes with time as material accumulates in the diffusion polarization layer, more than one impedance value or measurement of the impedance values at several frequencies is required.

In various embodiments, more than 2 such as more than 5, more than 10, more than 20, more than 30, or a number of impedance values in the range from about 5 to about 100, or about 2 to about 50, or about 10 to about 20, are derived. In specific embodiments, more than 10 impedance values from a low frequency region of an electrical impedance spectrum of a reverse osmosis membrane comprised in the reverse osmosis system are derived.

As used herein, the term "impedance value" refers generally to a measured value relating to resistance to electrical current flow across a component. It may include within its scope, values such as admittance, impedance, resistance, and/or conductance.

The term "admittance" as used herein refers to an electrical term describing the ease of movement of electrical charge carriers to move in a system when an electric potential is applied. It may refer to a complex electrical admittance which is comprised of mathematically real and mathematically imaginary components. The mathematical real part of the admittance is known as the conductance, which is expressed in units of Siemens (S).

Impedance is the reciprocal of admittance, and may also possess mathematically real and imaginary components, wherein the real part of the impedance may be termed the resistance and the imaginary part may be term the reactive impedance.

The term "resistance" as used herein refers to a measure of the opposition of the passage of electric current through a material. Conductance is the reciprocal of resistance, and is a measure of the ability of a body or material to conduct electricity.

In various embodiments, the impedance value is conductance. For example, a plurality of conductance values may be derived from a low frequency region of an electrical impedance spectrum of a reverse osmosis membrane comprised in the reverse osmosis system, and a state of fouling of the reverse osmosis system may be determined based on the plurality of derived conductance values.

Deriving the plurality of impedance values may comprise applying alternating current of various frequencies to the reverse osmosis system comprising the reverse osmosis membrane operating at a suitable membrane flux. In so doing, a frequency dependent impedance value of the reverse osmosis membrane at each of the frequencies may be determined to form an electrical impedance spectrum.

As used herein, the term "alternating current" refers to a flow of electric charge which periodically reverses direction. Applying alternating current of various frequencies to the reverse osmosis system may comprise applying alternating current of frequencies in the range from about 0.01 Hz to about $10^5$ Hz, such as in the range of about 0.01 Hz to about $10^4$ Hz, about 0.01 Hz to about $10^3$ Hz, about 0.01 Hz to about $10^2$ Hz, or about 0.01 Hz to about 10 Hz to the reverse osmosis system. In specific embodiments, applying alternating current of various frequencies to the reverse osmosis system comprises application alternating current of frequencies in the range from about 0.01 Hz to about 10 Hz to the reverse osmosis system.

The alternating current may be passed through at least a portion of the reverse osmosis membrane. To facilitate this, the reverse osmosis membrane may comprise electrodes which are electrically connected to the membrane, for example, located in the feed or permeate solution close to or attached to the membrane. Two or four electrodes may be electrically connected to the membrane, where one or two electrodes, respectively, may be arranged on opposing sides of the membrane. For example, each of the two electrodes, or each two of the four electrodes may be placed on opposing sides of a membrane, such that one or two electrodes are positioned on both the feed side and permeate side of the membrane.

In embodiments where a membrane assembly comprising two or more membranes is used for example, each of the two electrodes, or each two of the four electrodes may be placed on opposing sides of the membrane assembly.

In some embodiments, a four-electrode arrangement is used to carry out a 4-terminal impedance measurement. Advantageously, use of the four-electrode arrangement for impedance measurement may eliminate complicating effects due to frequency dependent impedance at voltage electrode-solution interface. Typically, a pair of electrodes on the feed side of the membrane may be used to inject the electric current stimulus signal, while the other pair of electrodes may be used on an opposing permeate side to measure the response signal. The impedance magnitude and phase difference may be determined from the stimulus and response signals.

In various embodiments, the electrodes which are electrically connected to the membrane of the module may be electrically connected to electrode terminals on a cell located outside the reverse osmosis system, so that the impedance measurements may be conducted without interrupting operation of the reverse osmosis system.

In specific embodiments, the reverse osmosis membrane may form part of an electrical impedance spectroscopy (EIS) equipped membrane system comprising two pairs of electrodes located at two sides of the membrane system (feed side and permeate side). One pair of electrodes may be used for injecting current into the membrane system whereas the other pair may be used to measure the voltage across the membrane sample.

A frequency dependent impedance value of the reverse osmosis membrane may be determined at each of the frequencies of the alternating current to form an electrical impedance spectrum. To make impedance measurements, the electrical current flow, electrical potential developed across the membrane, and the phase difference between the input alternating current signal and the generated voltage response are measured. The measurement may be carried out periodically to generate a plurality of data points for calculating the frequency dependent impedance value, which may be translated into an electrical impedance spectrum. Fouling of the membrane may result in changes to the magnitude and relative phase of the impedance value of the membrane dependent on frequency. As would be understood by a person of ordinary skill in the art, the electrical impedance spectrum may be translated to or be presented in the form of a Nyquist plot. Generally, the form of a Nyquist plot may provide direct insights on the layers of the reverse osmosis membrane as well as the processes occurring in the reverse osmosis system.

Prior to or while applying alternating current of various frequencies to the reverse osmosis membrane system, the reverse osmosis membrane comprised in the reverse osmosis system may operate at or be subjected to a suitable membrane flux. The term "membrane flux" as used herein refers to the flow volume over time per unit area of membrane, which may be expressed in units of $L\,m^{-2}\,h^{-1}$ or $g\,cm^{-2}\,hr^{-1}$.

In various embodiments, the reverse osmosis membrane is operated at a membrane flux in the range from about $1\,L\,m^{-2}\,h^{-1}$ to about $100\,L\,m^{-2}\,h^{-1}$, such as about $8\,L\,m^{-2}\,h^{-1}$ to about $100\,L\,m^{-2}\,h^{-1}$, about $25\,L\,m^{-2}\,h^{-1}$ to about $100\,L\,m^{-2}\,h^{-1}$, about $50\,L\,m^{-2}\,h^{-1}$ to about $100\,L\,m^{-2}\,h^{-1}$, about $65\,L\,m^{-2}\,h^{-1}$ to about $100\,L\,m^{-2}\,h^{-1}$, about $75\,L\,m^{-2}\,h^{-1}$ to about $100\,L\,m^{-2}\,h^{-1}$, about $85\,L\,m^{-2}\,h^{-1}$ to about $100\,L\,m^{-2}\,h^{-1}$, about $8\,L\,m^{-2}\,h^{-1}$ to about $85\,L\,m^2\,h^{-1}$, about $8\,L\,m^{-2}\,h^{-1}$ to about $70\,L\,m^{-2}\,h^{-1}$, about $8\,L\,m^{-2}\,h^{-1}$ to about $50\,L\,m^{-2}\,h^{-1}$, about $8\,L\,m^{-2}\,h^{-1}$ to about $40\,L\,m^{-2}\,h^{-1}$, about $8\,L\,m^{-2}\,h^{-1}$ to about $25\,L\,m^{-2}\,h^{-1}$, about $25\,L\,m^{-2}\,h^{-1}$ to about $85\,L\,m^{-2}\,h^{-1}$, or about $35\,L\,m^{-2}\,h^{-1}$ to about $65\,L\,m^{-2}\,h^{-1}$.

As mentioned above, a frequency dependent impedance value of the reverse osmosis membrane at each of the frequencies is determined to form an electrical impedance spectrum, such as that described in the examples. As used herein, the term "spectrum" refers to a plurality or a distribution of impedance value measurements which are taken at various frequencies. The low frequency region of the electrical impedance spectrum may correspond to the diffusion polarization layer of the reverse osmosis membrane, which may originate from a phenomenological event caused by the alternative accumulation and depletion of ions at the membrane-solution interface during the measurement of impedance using alternating currents. The diffusion polarization layer may form the dominant layer for observation and study of fouling behavior of the reverse osmosis membrane. As such, obtaining impedance values from the low frequency region of the electrical impedance spectrum allows a study of the phenomenological events at the membrane-solution interface, providing the most sensitive response as the concentration profile changes.

An impedance value for the diffusion polarization (DP) layer adjacent to the membrane may be determined from the low frequency region of the electrical impedance spectrum, such as in the range from about 0.01 Hz to about 10 Hz, of the reverse osmosis membrane by fitting the electrical impedance spectrum to a model, such as a theoretical model or a mathematical model.

Fitting the electrical impedance spectrum to a model may reveal a state of fouling of the reverse osmosis system based on the fit of the theoretical model to the generated experimental data. For example, the theoretical Maxwell-Wagner model may provide insight into presence of various elements and processes occurring in the reverse osmosis system, and may be used to identify the diffusion polarization (DP) layer and to extract the impedance value of this specific layer.

In various embodiments, fitting the electrical impedance spectrum to a model comprises fitting the electrical impedance spectrum to a Maxwell-Wagner model. Details of how the fitting may be carried out are understood by a person in the relevant technical fields, and are also exemplified and discussed in the examples.

Upon determination of the impedance value, the steps referred to above may be repeated for additional cycles to generate further impedance values of the reverse osmosis membrane. For example, the steps referred to above may be repeated for 5 or more, or 10 or more additional cycles, such as 5 to 100, 5 to 70, 25 to 100, or 20 to 40 additional cycles to generate further impedance values of the reverse osmosis membrane.

For a more accurate and meaningful analysis and comparison of data, deriving a plurality of impedance values from a low frequency region of an electrical impedance spectrum of a reverse osmosis membrane comprised in the reverse osmosis system may further comprise normalizing each of the plurality of impedance values with the impedance value at an initial condition, for example, at time=0, or when the reverse osmosis membrane has just been subjected to a feed solution. In various embodiments, deriving a plurality of impedance values from a low frequency region of an electrical impedance spectrum of a reverse osmosis membrane comprised in the reverse osmosis system further comprises normalizing each of the plurality of impedance values with the impedance value of the feed solution. This may be carried out to circumvent inaccuracies that may arise due to a membrane having different initial impedance values. Similarly, the impedance values obtained from the measurements or from fitting the impedance spectra to a Maxwell-Wagner model may be more meaningful if the impedance values are normalized with the impedance value of the feed solution. This might compensate for the variations in the impedance values due to changes in the conductivity of the feed that are not related to fouling or biofouling of the membrane.

Each of the plurality of impedance values may be derived while the reverse osmosis membrane comprised in the reverse osmosis system is operating at the same or a different membrane flux. Depending on whether the same or a different membrane flux is used, different information regarding the state of fouling of the reverse osmosis system may be derived based on the plurality of derived impedance values.

As mentioned above, the reverse osmosis membrane may be operated at a membrane flux in the range from about $1\,L\,m^{-2}\,h^{-1}$ to about $100\,L\,m^{-2}\,h^{-1}$. Accordingly, each of the membrane fluxes may be in the range from about $1\,L\,m^{-2}\,h^{-1}$ to about $100\,L\,m^{-2}\,h^{-1}$, such as about $8\,L\,m^{-2}\,h^{-1}$ to about $100\,L\,m^{-2}\,h^{-1}$, about $4\,L\,m^{-2}\,h^{-1}$ to about $80\,L\,m^{-2}\,h^{-1}$, or any suitable ranges as mentioned above.

In various embodiments, each of the plurality of impedance values is derived while the reverse osmosis membrane comprised in the reverse osmosis system is operating at a different membrane flux.

As mentioned above, deriving the plurality of impedance values may comprise applying alternating current of various frequencies to the reverse osmosis system comprising the reverse osmosis membrane operating at a suitable membrane flux; determining a frequency dependent impedance value of the reverse osmosis membrane at each of the frequencies to form an electrical impedance spectrum; determining an impedance value by fitting the electrical impedance spectrum to a model; and repeating the above steps for additional cycles to generate further impedance values of the reverse osmosis membrane. In these embodiments, repeating the steps for additional cycles to generate the further impedance values of the reverse osmosis membrane comprises generating each impedance value at a different membrane flux. In so doing, each of the plurality of impedance values is derived while the reverse osmosis membrane comprised in the reverse osmosis system is operating at a different membrane flux.

The membrane fluxes may be varied using a "flux step method". For example, a membrane flux at which an impedance value is derived may be smaller or larger than the subsequent membrane flux at which a subsequent impedance value is derived.

Advantageously, this may result in a more manageable control of flux, and a constant flow of foulants towards the membrane may be established more easily during measurements.

In various embodiments, a membrane flux at which an impedance value is derived is smaller than the subsequent membrane flux at which a subsequent impedance value is derived. This may, for example, involve obtaining the first impedance value at the lowest desired membrane flux, and periodically increasing the membrane flux to generate further impedance values, until the highest desired flux is reached where a final impedance value is obtained. In other words, the membrane flux of each additional cycle may be greater than the membrane flux of the preceding cycle.

Alternatively, a membrane flux at which an impedance value is derived may be larger than the subsequent membrane flux at which a subsequent impedance value is derived. This may, for example, involve obtaining the first impedance value at the highest desired membrane flux, and periodically decreasing the membrane flux to generate further impedance values, until the lowest desired flux is reached where a final impedance value is obtained. In other words, the membrane flux of each additional cycle may be smaller than the membrane flux of the preceding cycle.

A state of fouling of the reverse osmosis membrane system is determined based on the plurality of derived impedance values. As mentioned above, depending on whether the same or a different membrane flux is used, different information regarding the state of fouling of the reverse osmosis system may be derived based on the plurality of derived impedance values.

In various embodiments, determining a state of fouling of the reverse osmosis membrane system comprises determining a critical flux of the reverse osmosis membrane. By generating each impedance value at a different membrane flux, and correlating the impedance values to the membrane fluxes used to generate the impedance values, a critical flux of the reverse osmosis membrane may be determined.

The term "critical flux" is generally used to refer to permeate flux of a membrane below which fouling does not occur. Since in practice, operating below the critical flux may not be sufficient to achieve zero fouling rates, the term "critical flux" as used herein also includes embodiments in which "threshold flux" is referred to or is determined, wherein the term "threshold flux" refers to permeate flux of a membrane at or below which a low and near constant rate of fouling occurs, but above which the rate of fouling increases markedly. By taking into account the critical flux, this may provide for an estimation of sustainable flux, referred to as "a flux in which fouling is minimized to avoid frequent cleaning", which may provide opportunities to tune operations to provide more economically sustainable performance with minimum fouling. Estimation of the sustainable flux may be useful, for example, in the wastewater industry for plant process optimization at the start-up stage.

With the above in mind, the critical flux may be used to determine an initial membrane flux at which a reverse osmosis membrane in the reverse osmosis membrane may be operated or may be operating at.

Determining a critical flux of the reverse osmosis membrane may comprise plotting the plurality of impedance values as a function of membrane flux to generate a curve, and determining the membrane flux at a point of reversal of the slope of the curve.

When the impedance value is conductance, determining the membrane flux at a point of reversal of the slope of the curve may comprise determining the membrane flux at a point at which a slope of the curve transitions from a negative slope to a positive slope.

Without wishing to be bound by theory, the inventors believe that an initial decrease in conductance values as flux increases may be due to an increase in concentration of non-conducting foulants such as silica particles in suspension close to the membrane-solution interface rather than formation of a cake. This may result in a less conductive environment as the flux increases. This polarized layer may be at a lower concentration at a low flux, and it is more likely to exist as a flowing suspension as the conditions at the low flux conditions may not result in consolidation arising from solute-solute interactions.

With further increase in flux to the sub-critical flux region, concentration of ions, such as salts, in the permeate side may decrease due to the higher water flux. This may result in a lower conductance. As the flux is increased to a critical point, the flowing suspension layer on the feed side may eventually reach a maximum volume fraction of the particles at the membrane surface. At this condition, a stagnant cake layer may form beneath the flowing suspension layer. The flux at this critical point may be termed the critical flux.

When flux is further increased above this critical point, conductance may increase sharply with increasing flux, and this may signal formation of a more structured cake layer from the polarized layer on the membrane surface. The sharp rise in conductance may be attributed to an increase in salt concentration at the membrane-solution interface due to the cake enhanced concentration polarization effect.

Further, the method disclosed herein allows in-situ monitoring of fouling on a reverse osmosis membrane to be carried out, to assess the degree of accumulation of material such as, for example silica, from the changes in the low frequency impedance values or the impedance values of the diffusion polarization layer derived from the Maxwell-Wagner model fitted to the data or identified in the low frequency region in a Nyquist plot.

As mentioned above, during operation of a reverse osmosis membrane system, a condition may be reached where the nature of deposited material on the membrane undergoes a change such as for instance, the formation of an immobile cake. When the material in the diffusion polarization layer starts to consolidate into a cake, the cake enhanced concentration polarization may be assessed by the appearance of an inflexion or reversal in the rate of change with time of the impedance value of this layer. Fouling, cake enhanced concentration polarization effect, and cake enhanced concentration osmotic pressure will then increase more rapidly with time from that point on. This allows defining of a threshold or critical situation where the flux is at a critical flux point.

Advantageously, the critical flux point may be used for determining onset of cake enhanced concentration polarization (CECP) and/or cake enhanced osmotic pressure (CEOP) of the reverse osmosis membrane. In other words, where operating conditions are approaching the critical flux point, which may lead to onset of the cake enhanced concentration polarization effect that leads to cake-enhanced osmotic pressure, methods disclosed herein may provide advantageously a quantitative early signal of an incipient fouling event, which in turn allows remedial actions such as alteration of the operational pressures and flow velocities and ultimately specific cleaning regimes for restoring membrane performance to be carried out before actual fouling occurs.

Accordingly, in these embodiments, determining a state of fouling of the reverse osmosis membrane system comprises determining a critical flux point of the reverse osmosis membrane. Each of the plurality of impedance values may be derived at intermittent time intervals or at set time intervals to monitor the diffusion polarization layer, which may take place at the same or a different membrane flux. By plotting the plurality of impedance values as a function of time to generate a curve, and determining the time at a point of reversal of the slope of the curve, the critical flux point of the reverse osmosis membrane may be determined.

In embodiments wherein the impedance value is conductance, determining the time at a point of reversal of the slope of the curve comprises determining the time at a point at which a slope of the curve transitions from a negative slope to a positive slope. For example, the curve may be in the form of a "V" shape curve, where slope of the curve transitions from a negative slope to a positive slope.

In addition to, or apart from the above mentioned, methods disclosed herein are able to provide an indication of whether or not biofouling is occurring on the membrane surface.

Accordingly, method disclosed herein may be used to monitor occurrence of biofouling at a reverse osmosis membrane. The method comprises deriving a plurality of conductance values from a low frequency region, such as in the range from about 0.01 Hz to about 10 Hz, of an electrical impedance spectrum of the reverse osmosis membrane. The plurality of conductance values is plotted as a function of time to generate a curve. By determining presence of a point at which a slope of the curve transitions from a positive slope to a negative slope, this serves as indication that biofouling has occurred.

The methods described above for deriving the plurality of impedance values may apply, difference being that, for purposes of monitoring occurrence of biofouling, conductance, instead of impedance values, are measured. Accordingly, deriving the plurality of conductance values may comprise applying alternating current of various frequencies, such as in the range from about 0.01 Hz to about 10 Hz, to the reverse osmosis system comprising the reverse osmosis membrane operating at a suitable membrane flux; determining a frequency dependent impedance value of the reverse osmosis membrane at each of the frequencies to form an electrical impedance spectrum; determining a conductance value by fitting the electrical impedance spectrum to a model; and repeating the above steps for additional cycles to generate further conductance values of the reverse osmosis membrane.

In some embodiments, fitting the electrical impedance spectrum to a model comprises fitting the electrical impedance spectrum to a Maxwell-Wagner model.

As mentioned previously, for a more accurate and meaningful analysis and comparison of data, deriving a plurality of conductance values from a low frequency region of an electrical impedance spectrum of a reverse osmosis membrane comprised in the reverse osmosis system may further comprise normalizing each of the plurality of conductance values with the conductance value at an initial condition, for example, at time=0, or when the reverse osmosis membrane has just been subjected to a feed solution. In various embodiments, deriving a plurality of conductance values from a low frequency region of an electrical impedance spectrum of a reverse osmosis membrane comprised in the reverse osmosis system further comprises normalizing each of the plurality of conductance values with the conductance value of the feed solution. This may be carried out to circumvent inaccuracies that may arise due to a membrane having different initial conductance values. The conductance values obtained from the measurements or from fitting the impedance spectra to a Maxwell-Wagner model may be more meaningful if the conductance values are normalized with the conductance value of the feed solution. This might compensate for the variations in the conductance values due to changes in the conductivity of the feed that are not related to biofouling of the membrane.

In various embodiments, each of the plurality of conductance values is derived while the reverse osmosis membrane comprised in the reverse osmosis system is operating at the same or substantially the same membrane flux. As used herein, the term "substantially the same" refers to membrane fluxes having a variance of within, for example, ±5%, ±3%, or ±1%. In some embodiments, each of the plurality of conductance values is derived while the reverse osmosis membrane comprised in the reverse osmosis system is operating at the same membrane flux.

The membrane flux may, for example, be in the range from about 4 L m$^{-2}$ h$^{-1}$ to about 80 L m$^{-2}$ h$^{-1}$, such as about 8 L m$^{-2}$ h$^{-1}$ to about 80 L m$^{-2}$ h$^{-1}$, about 10 L m$^{-2}$ h$^{-1}$ to about 60 L m$^{-2}$ h$^{-1}$, about 15 L m$^{-2}$ h$^{-1}$ to about 50 L m$^{-2}$ h$^{-1}$, about 4 L m$^{-2}$ h$^{-1}$ to about 40 L m$^{-2}$ h$^{-1}$, or about 15 L m$^{-2}$ h$^{-1}$ to about 30 L m$^{-2}$ h$^{-1}$.

Each of the plurality of conductance values may be derived at intermittent time intervals or at set time intervals. For example, repeating the steps for additional cycles to generate further conductance values of the reverse osmosis membrane in embodiments mentioned above may be carried out intermittently or at set intervals to monitor the diffusion polarization layer. In some embodiments, repeating the steps for additional cycles to generate further impedance values of the reverse osmosis membrane is carried out for a time period in the range from about 1 hour to 10 hours, 1 day to about 30 days, such as about 1 day to about 10 days, about 1 hour to about 5 days, about 2 hours to about 8 days, about 3 hours to about 9 days, or about 4 days to about 8 days.

As mentioned above, the plurality of conductance values can be plotted as a function of time to generate a curve. By determining presence of a point at which a slope of the curve transitions from a positive slope to a negative slope, this serves as indication that biofouling has occurred. For example, the curve may be in the form of an inverse "V" shape curve, where slope of the curve transitions from a negative slope to a positive slope.

Without wishing to be bound by theory, it was postulated by the inventors that accumulation of live bacteria on the membrane surface may lead to an initial increase of the normalized conductance of the DP layer, as the interior of the bacterial cells and their respiration products are very conductive. This may correspond to an induction phase of biofilm development where bacteria start to attach on the membrane surface before forming micro-colonies. The normalized conductance may also be enhanced by accumulation of solute such as ions or other materials material by concentration polarization. With increase in time, upon reaching a maximum point, the normalized conductance may start to decrease due to substantial formation of extracellular polymeric substances (EPS), which may be produced continuously by the bacteria cells to provide the biofilm with greater structural integrity. The accumulation of the EPS matrix may displace the salt or restrict the diffusion of ions in the diffusion polarization layer thereby resulting in a lower normalized conductance of this layer. The accumulation of a tighter EPS matrix may reduce the electrical conductivity in the fouling layer, despite concentration polarization effects, resulting in a lower normalized conductance.

Advantageously, by taking into account the above, this allows in-situ monitoring of biofouling on a reverse osmosis membrane to be carried out. The methods disclosed herein may allow monitoring the membrane-solution interface as particles, including bacteria continually deposit on the membrane surface. Various embodiments disclosed herein allow detection of the presence of biofouling and the extent of biofouling to be monitored in-situ. This compares favorably against state of the art methods, where preventive measures such as dosing biocide or biostat are implemented to mitigate biofouling. Even though biocide or biostat may be used to minimize biofouling, use of the chemicals is not based on any measure of actual biofouling on the membrane.

The methods disclosed herein are able to detect formation of a mature biofilm on a reverse osmosis membrane surface and provide insights on its development. The methods disclosed herein may also be used to assess cleaning efficiency or effectiveness of control strategies for biofouling in water treatment plants.

The method for assessing a state of fouling of a reverse osmosis membrane system may be incorporated in a fouling monitor for installation in a side stream of a reverse osmosis system as a canary cell, wherein the term "canary cell" as used herein refers to a device that provides a warning of some type.

For example, the fouling monitor may be connected in-situ and in parallel with the reverse osmosis membrane to mimic its fouling behavior in the reverse osmosis system, while assessing their fouling or biofouling conditions or cleaning efficiency in a real time, non-invasively and online. This is advantageous over state of the art methods such as membrane autopsy, which is a destructive method and is only useful after the irreversible fouling has already occurred, and assay of feed water and antimicrobial agent which does not actually determine whether or not fouling or biofouling is occurring on membrane surface and which may be time consuming due to sampling requirements. The fouling monitor may also be used for in-situ determination of the onset of cake formation, cake enhanced concentration polarization (CECP) on the surface of the membrane or reaching a state where the critical flux point has been reached or exceeded.

Accordingly, various embodiments refer in a second aspect to an apparatus for assessing a state of fouling of a reverse osmosis system. Advantageously, the apparatus may be configured to assess a state of fouling of a reverse osmosis system on-line.

The apparatus comprises two or more electrodes configured to be arranged on opposing sides of a reverse osmosis membrane; an alternating current generator configured to generate an alternating electrical current of various frequencies between the two or more electrodes; a detector configured to measure (i) a voltage across the membrane, (ii) a current through the membrane, and (iii) a phase difference between the voltage and the current, at the various frequencies; and a processor configured to derive an impedance value in a diffusion polarization layer adjacent to the membrane using the measured voltage, current, and phase difference.

As mentioned above, the reverse osmosis membrane may comprise a plurality of electrodes, such as two electrodes or four electrodes, which are electrically connected to the membrane, for example, located in the feed or permeate solution close to or attached to the membrane. The plurality of electrodes may be electrically connected to the membrane, where one or two electrodes may respectively be arranged on opposing sides of the membrane. Depending on the number of electrodes used, each of the two electrodes, or each two of the four electrodes may be placed on opposing sides of a membrane, such that one or two electrodes are positioned on both the feed side and permeate side of the membrane.

In one embodiment, the number of electrodes is four and the electrodes are configured to be arranged in pairs on opposing sides of a reverse osmosis membrane.

An alternating current generator configured to generate an alternating electrical current of various frequencies between the two or more electrodes is electrically connected to each of the plurality of electrodes. In various embodiments, the alternating current generator is configured to generate an alternating electrical current in the frequency range from about 0.01 Hz to about $10^5$ Hz.

A voltage across the membrane, a current through the membrane and a phase difference between the voltage and the current is measured by a detector comprised in the apparatus. As mentioned above, one or a pair of electrodes on the feed side of the membrane may be used to inject the electric current stimulus signal, while the other or other pair of electrodes may be used on an opposing permeate side to measure the response signal. Accordingly, the electric current, the voltage across the membrane and the phase difference between the voltage and the current may be determined by the detector from the stimulus and response signals.

The measured voltage, current and phase difference are provided to a processor configured to derive an impedance value in a diffusion polarization layer adjacent to the membrane using the measured voltage, current and phase difference, at the various frequencies of the alternating electrical current. For example, the processor may be configured to derive or determine an impedance value in a diffusion polarization layer adjacent to the membrane by fitting the measured voltage, current, and phase difference to a model, such as a Maxwell-Wagner model. Examples of how the impedance value may be derived have already been discussed above.

A plurality of impedance values may be obtained from the reverse osmosis system. The impedance values generated may be expressed or plotted as a function of membrane flux or as a function of time to determine a state of fouling of the reverse osmosis system, which may be carried out manually by a human or a system operator, or by virtue of a device such as a computer. Accordingly, in various embodiments, the apparatus further comprises a device configured to express a plurality of impedance values as a function of membrane flux and/or time. The device may be a recording device and/or a plotting device.

For example, the device may be configured to determine a state of fouling of the reverse osmosis system by determining a critical flux of the reverse osmosis system. In such embodiments, the device may be configured to plot the plurality of impedance values as a function of membrane flux to generate a curve. The device may be further configured to determine the membrane flux at a point of reversal of the slope of the curve, which corresponds to the critical flux of the reverse osmosis membrane.

In embodiments wherein the impedance value is conductance, determining the membrane flux at a point of reversal of the slope of the curve comprises determining the membrane flux at a point at which a slope of the curve transitions from a negative slope to a positive slope.

As another example, the device may be configured to determine a state of fouling of the reverse osmosis system by determining a critical flux point of the reverse osmosis system. In such embodiments, the device may be configured to plot the plurality of impedance values as a function of time to generate a curve. At the same time, the membrane flux at which each of the plurality of impedance values is derived may be recorded by the device. The device may be further configured to determine the time at a point of reversal of the slope of the curve, where such a point corresponds to the critical flux point of the reverse osmosis membrane.

In embodiments wherein the impedance value is conductance, determining the time at a point of reversal of the slope of the curve comprises determining the time at a point at which a slope of the curve transitions from a negative slope to a positive slope or from a positive slope to a negative slope. The former may indicate that a critical flux point has been reached for inorganic fouling whilst the latter may indicate that a critical flux point due to biofouling has been reached.

As a further example, methods disclosed herein may be used for monitoring the biofouling processes and also to identify the minimum flux levels for mitigating biofouling. Methods disclosed herein may also be used also to monitor effectiveness of biocide or antimicrobial agent in mitigating fouling.

Various embodiments refer in a further aspect to use of a method according to the first aspect or an apparatus according to the second aspect for in-situ monitoring of fouling on a reverse osmosis membrane. The method may also be used for in-situ determination of the onset of cake formation, cake enhanced concentration polarization (CECP) on the surface of the membrane or reaching a state where the critical flux point has been reached or exceeded. Methods disclosed herein may be implemented in any of existing reverse osmosis water treatment plants for process optimization.

The method disclosed herein may also be used to assess the cleaning efficiency or effectiveness of control strategies for fouling or to determine the progression of membrane cleaning during a cleaning operation in water treatment plants. Accordingly, various embodiments refer in a fourth aspect to use of a method according to the first aspect or an apparatus according to the second aspect for in-situ monitoring of effectiveness of cleaning and/or degree of cleaning during a cleaning operation of the reverse osmosis membrane.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

A non-invasive technique, electrical impedance spectroscopy (EIS) to elucidate the phenomenon occurring below, around and above the critical flux in RO processes according to various embodiments is disclosed herein. The technique is near real time, non-invasive and in-situ. Critical flux of a colloidal suspension in reverse osmosis (RO) may be determined, and changes occurring at the membrane-solution interface below, around and above the critical flux may be detected using EIS. In an experimental set up, the trends in EIS signals were able to identify the critical flux determined by transmembrane pressure (TMP) changes when the flux was changed in steps.

The potential of EIS in providing valuable information on the phenomenon occurring at the membrane-solution interface around the critical flux as well as signaling the onset of cake formation and CEOP development are demonstrated herein. The critical flux measured by TMP from filtration at different imposed fluxes using the flux stepping method with parameters derived from the real time, have been corroborated using in-situ EIS measurement.

The impedance of the diffusion polarization (DP) layer derived from the low frequency region of the EIS signal was identified as the most important EIS parameter for signaling the onset of cake formation and the concentration enhanced osmotic pressure (CEOP) effect. Various embodiments described herein rely on measurement of the electrical impedance of membranes and membrane systems.

TMP measurements provide little information on these phenomena. The critical flux was affected strongly by the crossflow velocity and this was also illustrated in the change in the inflexion point of the impedance value of the diffusion polarization layer as the flux was increased. A simpler method for the identification of critical flux was developed by extracting the real impedance ($Z_{Re}$) of the impedance element with the longest time constant (lowest characteristic frequency). This parameter can be conveniently extracted from the radius of the semicircle at the lowest characteristic frequency in a Nyquist plot. Various embodiments disclosed herein demonstrated that EIS may be used "online" using a side-stream (canary') cell to continuously monitor a system to ensure it is operating below the critical flux condition where fouling is likely to occur.

Electrical impedance spectroscopy (EIS) was also employed in various embodiments to monitor biofilm formation on the membrane surface in-situ and non-invasively. Characteristic changes in the electrical parameters of the diffusion polarization (DP) layer provide a direct indicator of whether biofouling is occurring. An EIS-derived parameter, the normalized conductance of the diffusion polarization ($G_{DP}$) layer showed two stages of biofilm formation. The first stage was related to the accumulation of bacterial cells and the formation of the respiration products from the bacteria. The second stage referred to the accumulation of the extracellular polymeric substances (EPS) which was the main component for the formation of the biofilm matrix. The effect of a biostat, sodium azide was also investigated and its presence slowed down the growth of bacteria and caused the partial detachment of bacteria from the membrane surface. Sodium azide's effects were also reflected in the normalized $G_{DP}$ plot. The sustainable flux, at which the fouling was minimal, could be estimated from the rate of change of the initial increase of the normalized $G_{DP}$ with respect to flux. Conventional monitoring methods such as transmembrane pressure (TMP) or autopsy by confocal laser scanning microscopy (CLSM) on their own gave little insights into the mechanisms of the biofilm formation. This study demonstrates the ability of EIS to be incorporated into a "canary" cell located in a side stream of the high pressure membrane vessel for the monitoring biofouling as well as for the assessment of the cleaning efficiency in a water treatment plant.

For a better understanding of the invention, a brief overview of EIS and the rationale for choosing EIS for the corroboration of the critical flux measured by the TMP method and for the monitoring of biofouling in RO processes are discussed.

Example 1: Theoretical Background and Equivalent Circuit Model (Embodiment 1)

Impedance measurements are conducted by the injection of small sinusoidal alternating currents, $i=i_o \sin(\omega t)$ at a series of known frequencies $\omega$ and amplitude $i_o$ into the system and measuring the voltage $v=v_o \sin(\omega t - \theta)$ across the sample. The voltage amplitude $v_o$ and phase difference $\theta$ between the voltage and current are measured. The impedance obtained was determined over a range of frequencies.

In the system used in this study, the current is determined by measuring the voltage drop across known impedance in series with the membrane. This reference impedance is made up resistors and a capacitor (Randall circuit) that matches approximately the frequency dependent impedance of the membrane.

The magnitude of the impedance is given by, $$|Z| = \frac{v_o}{i_o} \tag{1}$$

Impedance is a complex quantity, with real and imaginary components. The impedance can be decomposed into these components using the following expression:

$$Z = |Z|e^{j\angle Z} = \frac{v_o}{i_o}e^{-j\theta} = \frac{v_o}{i_o}(\cos\theta - j\sin\theta) \tag{2}$$

where $$|Z|\left(=\frac{v_o}{i_o}\right) \text{ and } \angle Z(=-\theta)$$

define the impedance magnitude and phase respectively. This gives the impedance in terms of the measurable parameters, such as $i_o$, $v_o$, $\theta$ and the imaginary unit vector, j where $j^2=-1$.

The admittance Y is derived from the reciprocal of impedance Z, where admittance Y may be expressed in terms of conductance (G) and capacitance (C) by the following expression:

$$Y = \frac{1}{Z} = \frac{i_o}{v_o}e^{j\theta} = \frac{i_o}{v_o}(\cos\theta + j\sin\theta) \equiv G + j\omega C \tag{3}$$

Here, the admittance Y is expressed in terms of a conductance element, G in parallel with a capacitance element, C, describing its ability to conduct and store charge respectively. In other words, G quantifies the ability of the system to conduct electrical charge (i.e. the ions), whilst C measures the capacity of the system to store charges. This single conductance in parallel with a capacitance is known as a Maxwell-Wagner element, where the impedance measurement provides a measure of, $$G = \frac{1}{|Z|}\cos\theta \text{ and } C = -\frac{1}{\omega|Z|}\sin\theta \tag{4}$$

where $\omega(2\pi f)$ is the angular frequency. The variation of dispersion of G and C with frequency can be used to determine the number of circuit elements or layers with different time constants present in the system. In the context of membranes, such elements arise from layers within the system and diffusion polarization layers or processes. This provides a means of real time and in-situ monitoring of the accumulation of particulates that could potentially foul the membrane. Rearrangement of Equation (3), led to $$Z(\omega) = \frac{1}{G + j\omega C} \tag{5}$$

Equation (5) may also be expressed as $$Z(\omega) = \frac{G}{G^2 + C^2\omega^2} - j\frac{C\omega}{G^2 + C^2\omega^2} \tag{6}$$

Since Z is a complex variable, $Z=Z_{Re}+jZ_{Im}$ where $Z_{Re}$ represents the real part of Z and $Z_{Im}$ refers to the imaginary component of Z. Therefore, $$Z_{Re} = \frac{G}{G^2 + C^2\omega^2} \text{ and } Z_{Im} = -\frac{C\omega}{G^2 + C^2\omega^2} \quad (7)$$

The impedance data can be presented graphically on Cartesian coordinates as a Nyquist plot in which negative imaginary $-Z_{Im}$ is plotted against real impedance $Z_{Re}$. The Nyquist plots consist of a number of overlapping semicircles where a single Maxwell-Wagner element produces a semicircular plot. Each semicircle may correspond to a single time constant element, for example, solution, membrane layers or diffusion polarization processes. The number of semicircles and the degree of overlapping are determined by the number of elements with different time constants and how close those time constants are to each other. In most cases, the Nyquist plot provides direct insights into the layers as well as the processes occurring in the system.

The frequency dependent complex impedance of membrane may be modeled using a number of circuit elements in series representing the various layers/elements in the system, such as internal and external layers in the membrane. This is the so-called Maxwell-Wagner model. Detailed explanations on the equivalent Maxwell-Wagner circuit model have been described in the literature. The veracity of such a fitting procedure requires very high precision in phase angle and impedance magnitude measurements as well as high reproducibility. The system used in this study had a phase angle resolution of 0.001 degrees and an impedance magnitude precision of 0.002% over the entire frequency range used. Such fitting must also take into account experimental errors from reproducibility of the EIS data. The results presented here for the values of $G_{DP}$ were obtained using these techniques which return only statistically significant values for the parameters.

Figure 4:
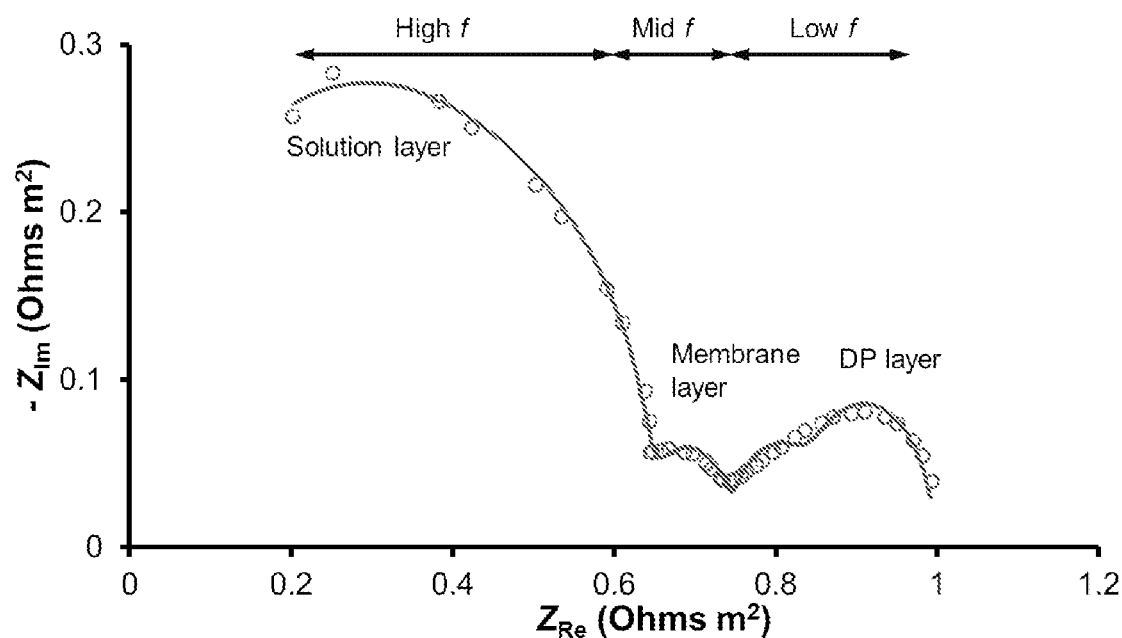
FIG. 4 shows a representative plot of the negative imaginary part of the impedance along the vertical axis against the real impedance along the horizontal axis, known as a Nyquist plot for a silica-fouled RO system. Conditions: RO feed=200 ppm silica with 2000 ppm sodium chloride (NaCl); flux=30 $l/m^2$ h; crossflow velocity=0.15 m/s. The line drawn in the figure shows theoretical results obtained by fitting the experimental data to a circuit consisting of a set of parallel conductance and capacitance elements connected in series. Such a circuit model is known as a Maxwell-Wagner (MW) model.

An example of such a Nyquist plot of the data and a plot of the theoretical Maxwell-Wagner (MW) model fitted to the data is shown in FIG. 4. Note that the error bars in the data shown are generally smaller than the size of the symbols used in the plot. The Maxwell-Wagner modeled to such results then yield values for the conduction element, $G_{DP}$, of the DP layer. The other parameters of the MW model obtained for the system were not of significance for the biofouling study described in this paper.

The Nyquist plot, when fitted to the Maxwell-Wagner model, can be categorized into a high frequency (solution layer), mid frequency (membrane layer) and a low frequency (diffusion polarization layer). Each of these corresponds to different layers of the system as a whole. It has been found that the low frequency element, corresponding to the diffusion polarization (DP) layer, expressed the most distinctive trend throughout the fouling process. Hence, the remaining discussions herein will be mainly based on the changes that occurred in the DP layer during fouling.

Briefly, the conductance of the diffusion polarization layer ($G_{DP}$) is derived from the impedance elements at very low frequencies. Since the DP layer exists at the membrane-solution interface, the electrical properties of this element are of special interest. This diffusion polarization (DP) layer originates from a phenomenological event caused by the alternative accumulation and depletion of ions at the membrane-solution interface during the measurement of impedance using AC currents. This layer is mainly observed in the low frequencies where the half cycle of the AC signal is long and therefore there is sufficient time for substantial changes to occur in the concentration of ions near the membrane surface and a significant build up of the AC concentration profiles at the solution-membrane interface.

For a salt rejecting membrane, like RO, ions such as $Na^+$ and $Cl^-$ tend to accumulate on the RO membrane surface during filtration as a result of the pressure driven flux as shown in FIG. 1. This is the so called concentration polarization effect. It should be noted that the DP layer defined here is not identical with the pressure driven concentration polarization layer, but it is extremely sensitive to the changes in the concentration profile of ions such as $Na^+$ and $Cl^-$ near the membrane surface, both at the feed side as well as at the permeate sides of the membrane (FIG. 1).

Modeling the Nyquist plot using a series of Maxwell Wagner elements allows the determination of the impedance of the DP layer, denoted as $Z_{DP}$ or the related conductance of this layer denoted as $G_{DP}$. The determination of the impedance of this alternating current DP layer allows one to probe the changes at the membrane-solution interface in order to provide insight into the events occurring at the membrane-solution interface throughout the biofouling process, and a clearer understanding of the events occurring below, around and above critical flux.

Example 2: Rationale for Choosing EIS (Embodiment 1)

EIS has been successfully employed to characterize various types of membranes, including synthetic and biological membranes. Porosity of the membrane may be estimated from the capacitance determined from EIS when the dielectric constant is known and the thickness of the membrane polymer. This technique is also capable of detecting fouling or scaling in membrane processes or monitoring such fouling or scaling on a real time and in a non-invasive manner.

To the best of the inventors' knowledge, most studies on critical flux or threshold flux have focused on examining the relationship between parameters such as TMP and flux. There are few studies which focus on understanding the phenomena occurring in-situ at the membrane surface around the critical flux condition. In-situ monitoring techniques for membrane filtration processes are of paramount importance for facilitating the inventors' understanding in the fundamental processes governing membrane fouling. To date, EIS has not been correlated directly with critical flux nor used to detect changes at the membrane surface below, at and above the critical flux. This study demonstrates the ability of EIS to characterize critical flux phenomena during the reverse osmosis processing of a colloidal silica suspension.

Briefly, the key signals which could be obtained from the EIS measurements include (1) the Nyquist plot and its temporal shift and (2) the impedance of the diffusion polarization layer.

Example 3: Design Considerations (Embodiment 1)

Example 3.1 Filtration Experiment

To elucidate the EIS behavior of a crossflow RO process operated below and above critical flux, the flux-stepping method was adopted. Flux stepping is preferred method in the determination of the critical flux as the flow of the material to be deposited on the membrane surface is better controlled since the convective flow of solutes towards the membrane is constant during the course of the filtration process.

Example 3.2 EIS Equipment

The main components of the EIS equipment are a crossflow impedance cell fitted with a pair of current injecting electrodes, a pair of electrodes for measuring the voltage, the EIS spectrometer and the amplifier unit. The current electrodes are used for the injection of current into the system whilst the voltage electrodes are used for measuring the electric potential difference developed across the membrane. The phase difference between the current and voltage is measured by the spectrometer in the specified range of frequencies and recorded through dedicated software. The measured parameters then yield the impedance or the related capacitance and conductance (as detailed in Example 1) of the sample at each frequency. The amplifier unit contains a reference circuit so that the measurement accuracy for the wide range of frequencies can be optimized. This system employs the four-terminal method where four electrodes are used for the measurement of impedance to eliminate the complicating effects of the frequency dependent impedance at the voltage electrode-solution interface.

Example 4: Model Foulant, Background Electrolyte and Membrane (Embodiment 1)

Colloidal silica was used as the model inorganic foulant in this study. It was supplied in the form of a 34 wt % suspension in deionized water at pH 7.0. The nominal size of the silica particles was 20 nm based on the datasheet provided by the manufacturer. Sodium chloride was used as the background electrolyte. Milli-Q water was used to prepare the silica and sodium chloride solution. A 0.45 µm filter was used to filter the sodium chloride solution to remove unwanted impurities before use.

Commercial RO membranes (DOW FilmTec, TW30) with a membrane hydraulic resistance of $1.06 \times 10^{14}$ m$^{-1}$ were used. The observed salt rejection of the membranes was about 97%, measured at a constant flux of 25 l/m$^2$ h with 2000 ppm NaCl aqueous solution. RO membranes were wetted in ethanol for 2 hours and rinsed thoroughly before storing them in Milli-Q water for at least 24 hours before use.

Example 5: RO-EIS Crossflow Cell and Electrical Impedance Spectrometer (Embodiment 1)

Figure 2:
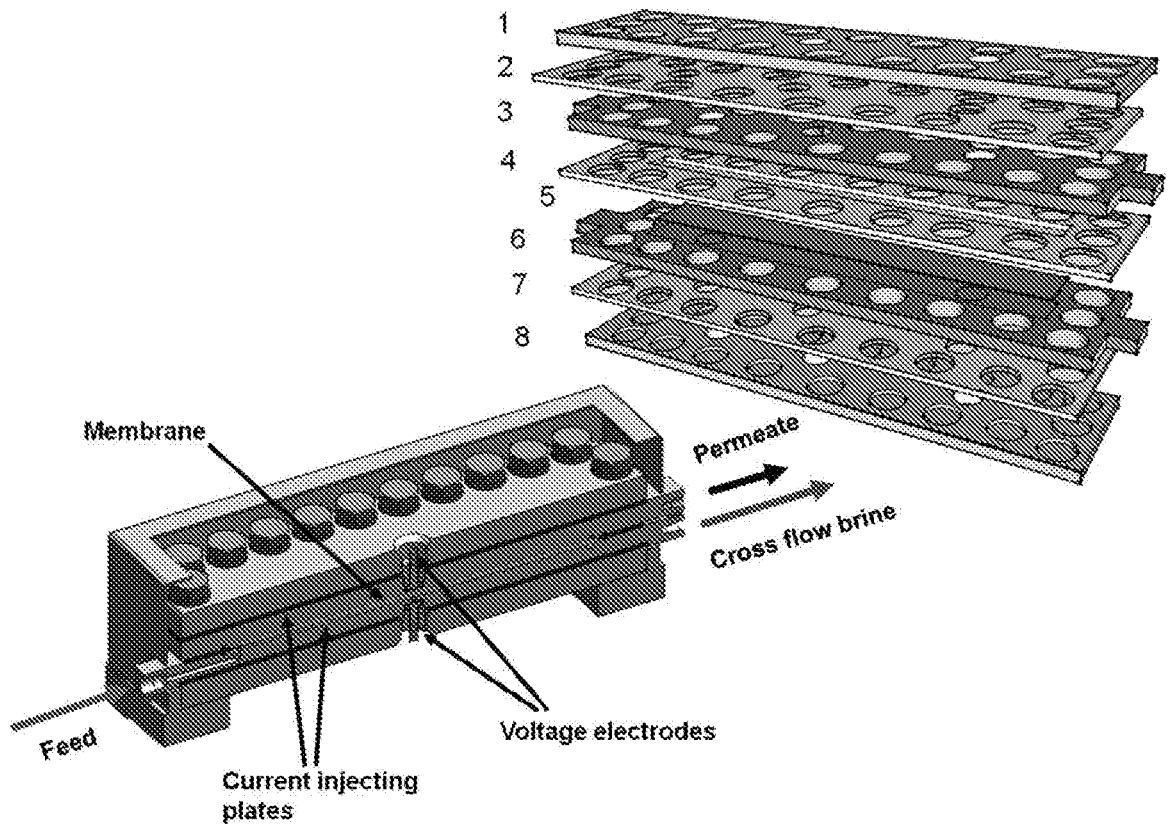
FIG. 2 is a schematic diagram of cross section (bottom) and expanded view (top right) of a stainless steel reverse osmosis-electrical impedance spectroscopy (RO-EIS) crossflow cell used for impedance measurements. (1 and 8—metal plates, 2, 4 and 7—insulating plastic gaskets, 3 and 6—metal plates that form the chamber and also act as the current electrodes, 5—RO membrane). The voltage electrodes protrude through the plates that act as the current injecting electrodes and are insulated from it. The tip of the voltage electrodes make contact direct with the solutions on either side of the membrane (feed or permeate). The bolts that clamp the components of the flow chamber together are insulated from the current injecting electrodes by plastic sleeves.

The RO experiments were performed using a stainless steel RO-EIS cross-flow cell. This cell is made up of four stainless steel plates and three plastic gaskets acting as the insulating plates as shown in FIG. 2. The two inner plates forming the feed side and permeate side cavities act as the current electrodes.

Two electrically insulated voltage electrodes were located at the top and bottom of the plates and contact the feed and permeate solutions via electrically insulated feed-throughs. The dimension of the cell was 302 mm×60 mm×0.95 mm with an effective membrane area of 0.01812 m$^2$. The membrane is placed in between the two current injecting stainless steel plates which are separated by a plastic gasket to prevent electrical short-circuit.

The cell was connected to an Electrical Impedance Spectrometer and the electrical properties of the membrane were measured periodically at frequencies ranges from $10^{-1}$ to $10^5$ Hz. The spectrometer has a phase resolution of 0.001° and is therefore capable of measuring the capacitance even at low frequencies where the admittance is dominated by the (high) electrical conductance. Three replicates of impedance spectra were obtained per scan and the time required per scan over the frequency range ($10^{-1}$ to $10^5$ Hz) was approximately 30 minutes.

Example 6: RO Setup (Embodiment 1)

Figure 3:
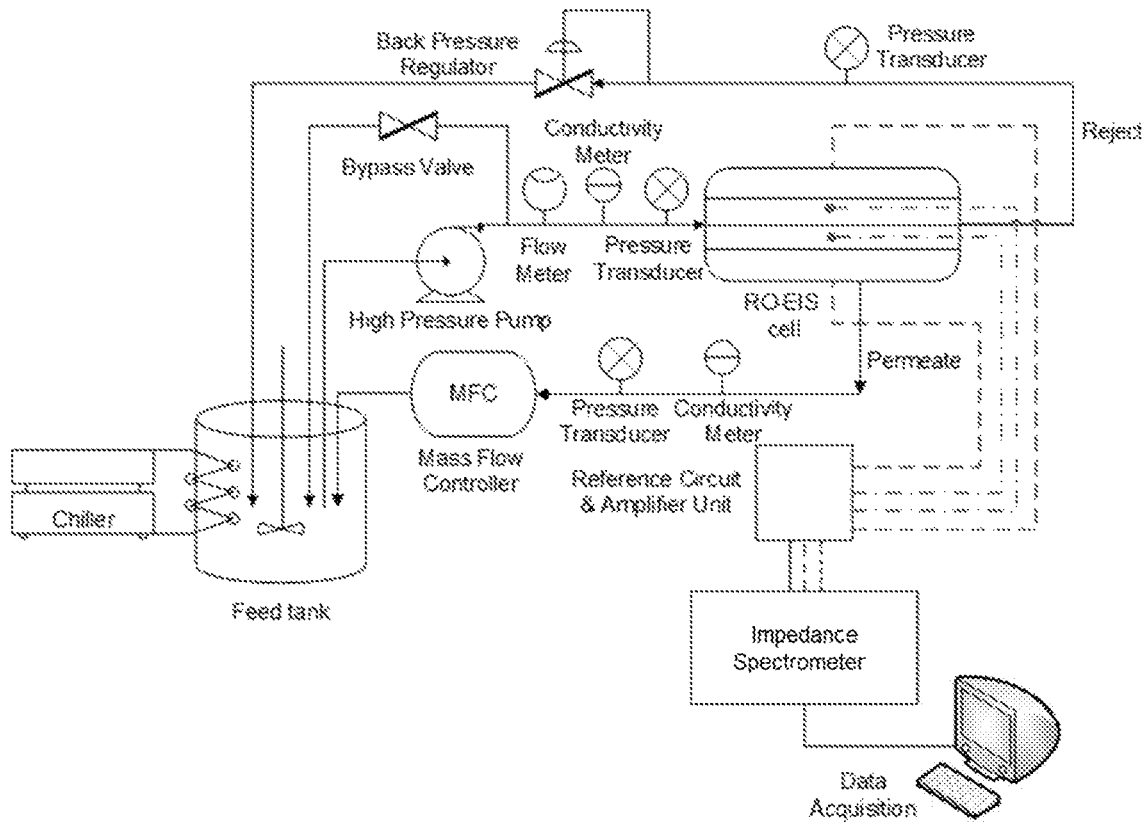
FIG. 3 is a schematic diagram of the RO-EIS crossflow filtration system.

A schematic diagram of the RO setup is shown in FIG. 3. A high pressure pump was used to deliver the solution from a 10 L feed tank to the RO-EIS crossflow cell. An overhead stirrer was installed in the feed tank to ensure that the solution was mixed thoroughly throughout the experiment. The temperature in the feed tank was maintained with cooling water from a chiller at 23±1° C. The reject and permeate were recycled back to the feed tank in the course of filtration where the permeate flux was controlled by a mass flow controller.

The system pressure was controlled by a backpressure regulator while the pressures of the feed and permeate were monitored using pressure transducers. The flow of the feed stream was measured with two flow meters while conductivity meters were installed to measure the conductivity of the feed and permeate. Pressure, flux and conductivity readings were recorded with a data acquisition system.

Example 7: Membrane Compaction (Embodiment 1)

The membrane was compacted at a flux of 40 l/m$^2$ h for at least 48 hours prior to the fouling experiments. This was to ensure that there were no significant changes in the membrane properties as these changes would affect the EIS signals. The final concentration of NaCl solution in the feed tank was adjusted to 2000 ppm to simulate brackish water conditions.

Example 8: Silica Fouling (Embodiment 1)

Example 8.1 Flux Step Method

The system was adjusted to the desired (lowest) flux and crossflow velocity before silica was added into the feed tank. After the system was stabilized, concentrated silica was added to the feed tank to achieve the target silica concentration of 200 ppm. The fouling stage at a particular flux was maintained for 2 hours and EIS measurements were taken at 1 and 2 hours intervals.

The flux was then increased incrementally after a fixed duration and the sequence continued until the highest desired flux was reached. The flux range in this study is only an exemplary example and should not be construed to be limited to this range.

Example 8.2 Filtration at Various Imposed Fluxes

The system was adjusted to the desired flux and crossflow velocity before the concentrated silica was added into the feed tank to achieve the target concentration of 200 ppm. For the fouling experiments were conducted for at least 3 hours and EIS measurements were recorded regularly to monitor the membrane responses throughout the experiment.

Example 9: Rationale for Results Presentation (Embodiment 1)

Nyquist plots (FIG. 4) are one of the most useful ways to represent EIS data, where each data point is obtained from a particular frequency. It is a plot of the negative of the imaginary impedance ($-Z_{Im}$) versus the real impedance ($Z_{Re}$) whereby the shape of the plots and shift in the plots provides real time information of the onset of fouling processes as well as the type of foulant.

It is made up of a combination of several overlapping semicircles, each of which corresponds to a single element that possesses a specific electrical time constant e.g. solution, membrane layers or diffusion polarization processes. When the experimental data were fitted to the Maxwell-Wagner model, it revealed the presence of various elements and processes occurring in the system.

As explained in Example 1, elements at low frequencies (about 0.1 to 10 Hz) correspond to the DP layer and its conductance, G, were derived from the fitted values obtained using mathematical fitting of the impedance data to a multi-layer Maxwell-Wagner model. The detailed procedure for fitting has been described elsewhere, for instance see Reference 2. Furthermore, to facilitate observation of the movement of the various Nyquist plots during the filtration process, $Z_{Re}$ and the $-Z_{Im}$ for a particular layer may also be directly deduced from the radius and the position of the apex of the semicircle at a particular characteristic frequency corresponding to the electrical time constant of that layer or process.

The remaining discussions in this paper are in terms of the Nyquist plot and the parameters, $G_{DP}$ which provide insights into the interfacial layer at the membrane surface when the operating conditions approach the critical flux and the onset of the cake enhanced concentration polarization (CECP) effect that leads to CEOP.

Example 10: Critical Flux Determined by the Flux Step Method (Embodiment 1)

The critical flux is usually determined by the flux step method. This is preferred over the pressure step due to the more manageable control of flux and a constant flow of foulants towards the membrane can be established more easily.

Example 10.1 TMP and EIS Measurement Using the Flux Step Method

Figure 5:
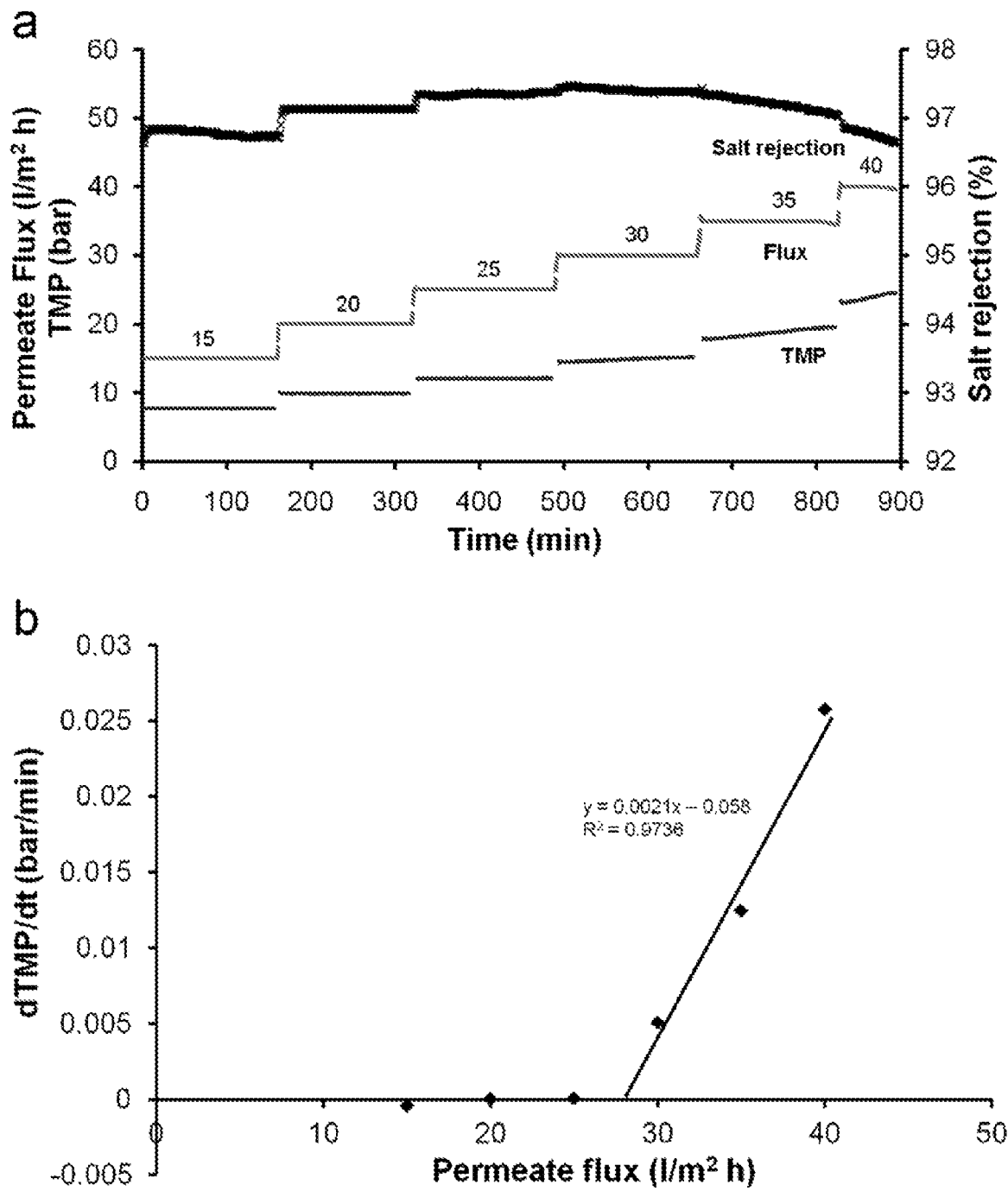
FIG. 5 shows (a) transmembrane pressure (TMP), permeate flux and salt rejection versus time plot; (b) rate of change of TMP with time, d/dt [TMP], versus permeate flux in a flux step experiment in which the imposed flux is increased in a step-wise manner. Conditions: RO feed=200 ppm silica with 2000 ppm NaCl; crossflow velocity=0.15 m/s.

The TMP and salt rejection profiles for the flux step method are presented in FIG. 5(A). The TMP values remained almost constant from 15 to 25 $l/m^2$ h throughout the course of filtration. A slope change occurred at about 30 $l/m^2$ h, suggesting the onset of a steady foulant deposition and membrane fouling. As shown in FIG. 5(B), the critical flux $J_{crit}$ was found to be about 28 $l/m^2$ h from the intersection of the d/dT [TMP] slopes.

Figure 6:
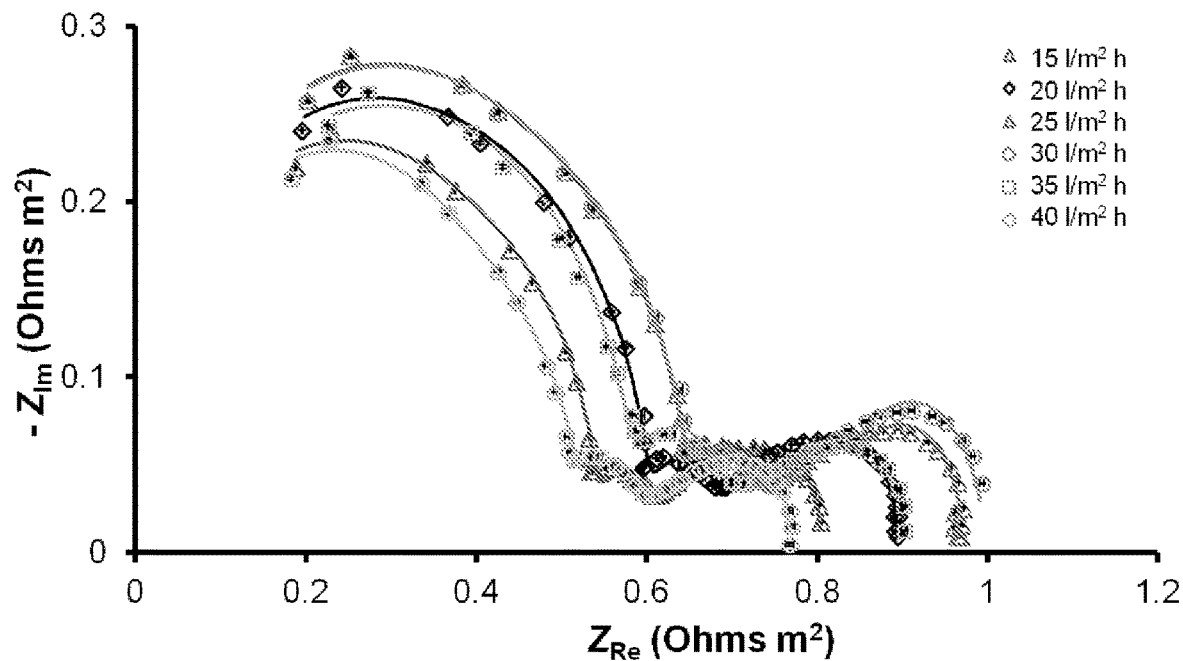
FIG. 6 shows Nyquist plots obtained from EIS measurement for flux step method. The points in the plot represent the measured data whereas the solid lines are obtained from the fitted data using the Maxwell-Wagner model. Error bars are obtained from three EIS scans for a particular imposed flux. Note that the x and y-axes of the plot are presented in different scale in order to give a better illustration as the Nyquist plot shifts. Conditions: RO feed=200 ppm silica with 2000 ppm NaCl; crossflow velocity=0.15 m/s.

FIG. 6 presents the Nyquist plots of the flux step method for silica fouling. The Nyquist plot shifted to the right as the flux increased from 15 to 30 $l/m^2$ h. When the system was operated beyond $J_{crit}$, the movement of Nyquist plot changed direction and shifted to the left. The left-shifted Nyquist plot was due to a decrease in overall Z (hence increase in G).

Figure 7:
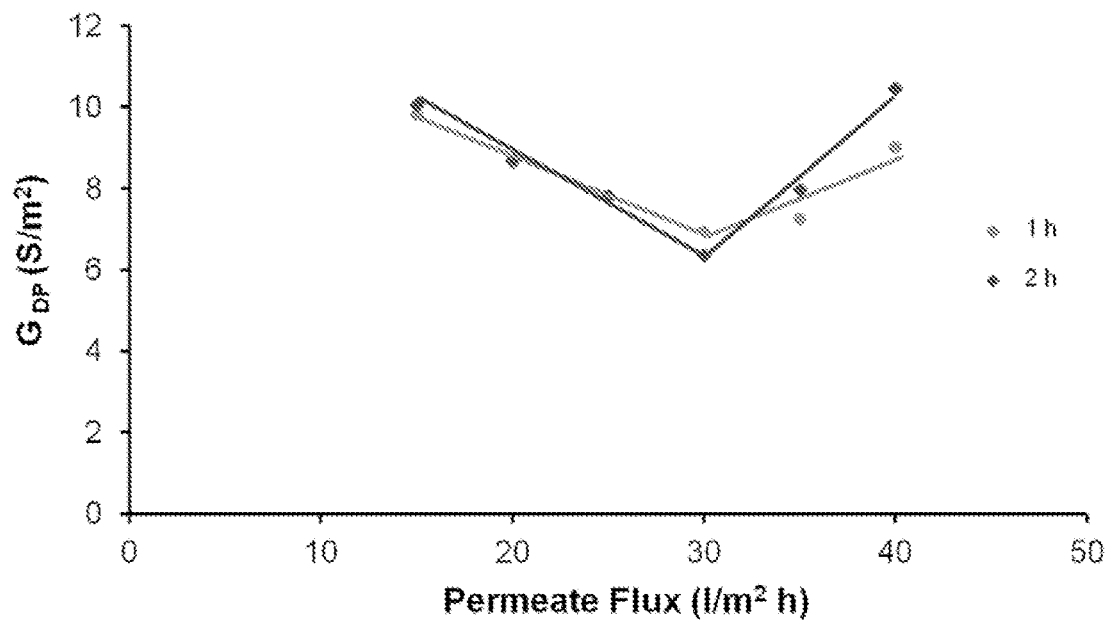
FIG. 7 shows conductance, G, derived from MW models of the fitted data for membranes during filtration of silica loaded feeds for (A) the diffusion polarization (DP) layer, $G_{DP}$, (B) membrane skin, $G_{skin}$, and (C) base layer, $G_{base}$ of membrane, obtained for various levels of the fluxes during the flux step method. The time in (A) indicates the duration after the flux has been adjusted to the desired value. Conditions: RO feed=200 ppm silica with 2000 ppm NaCl; crossflow velocity=0.15 m/s.
Figure 7:
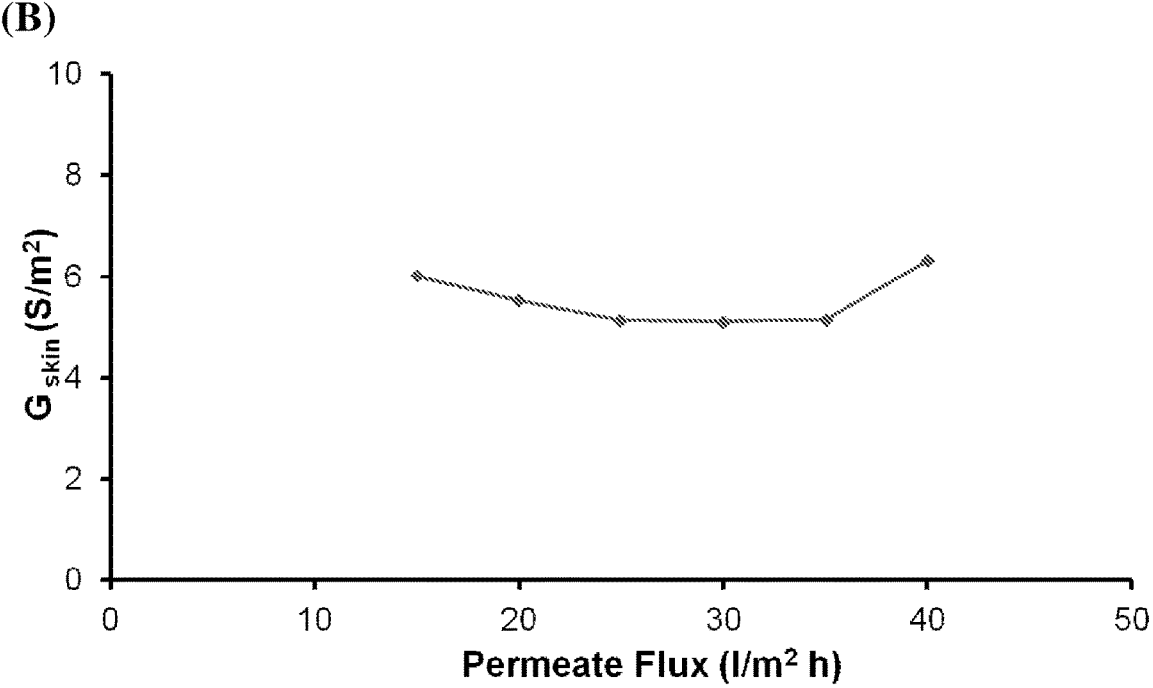
Figure 7:
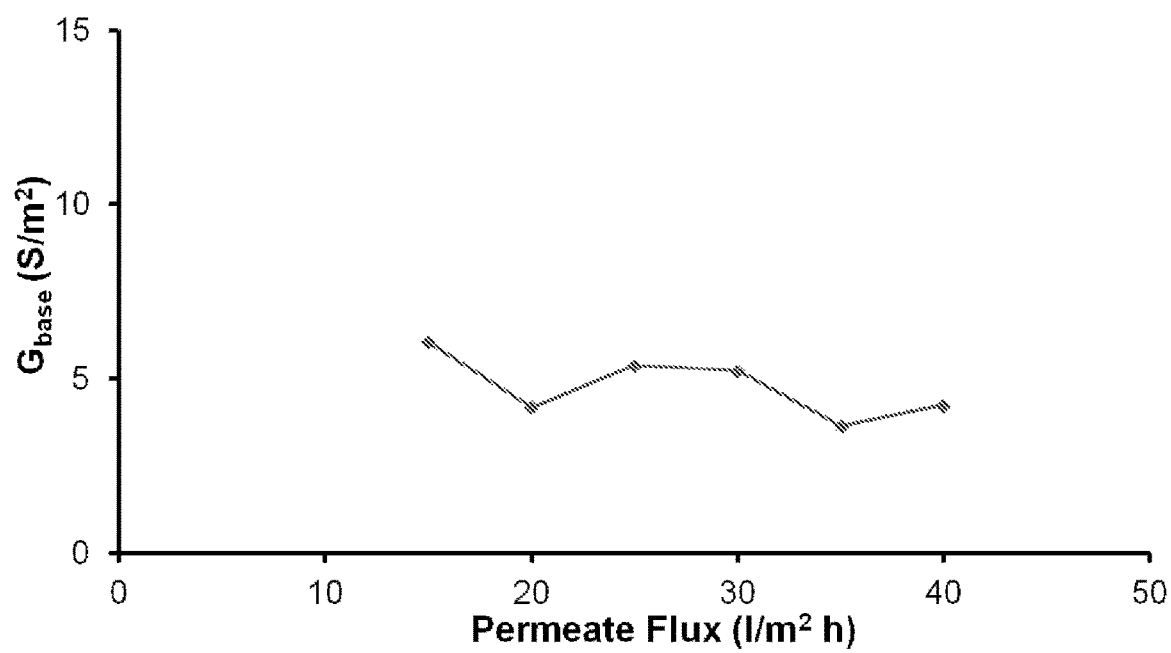

The conductance, $G_{DP}$ derived from the theoretical fitting of the impedance as detailed in Example 1 is shown in FIG. 7(A). The trends in $G_{DP}$ are consistent with the inventors' understanding of critical flux phenomena. The $G_{DP}$ decreased as flux increased from 15 to 30 $l/m^2$ h and this was believed to be due to an increase in the concentration of non-conducting silica particles in suspension close to the membrane-solution interface rather than cake formation. This resulted in a less conductive environment as the flux increased towards $J_{crit}$. This polarized layer is at a lower concentration at low flux and it is more likely to exist as a flowing suspension as there is little chance under these conditions for consolidation arising from solute-solute interactions.

It is worth noting that changes of ion concentration in the DP layer on the permeate side caused by flux adjustment could also impact the $G_{DP}$ value. When the flux was increased in the subcritical flux region, concentration of salt in the permeate side decreased due to the higher water flux, therefore resulting in decreased $G_{DP}$. As the flux increased to a critical point, the flowing suspension layer on the feed side eventually reached a maximum volume fraction of the particles at the membrane surface. At this condition a stagnant cake layer would begin to form beneath the flowing layer.

As observed in FIG. 7(A), there was a distinct inflection point at $J_{crit}$ where $G_{DP}$ increased sharply with increasing flux and this signals the formation of a more structured cake layer from the polarized layer on the membrane surface. The sharp rise in $G_{DP}$ is attributed to the increased salt concentration at the membrane-solution interface due to the CECP effect. Thus as the cake layer forms, the back diffusion of NaCl became hindered and the salt concentration on the membrane surface and the local osmotic pressure were elevated. This resulted in the CECP effect and studies have shown that more severe CECP is observed at higher fluxes due to the thicker cake layer.

With the elevated salt concentration near the membrane surface (on both the feed and permeate sides) beyond $J_{crit}$, the $G_{DP}$ (FIG. 7(A)) as well as the overall conductance of the system increased, which led to the left shift of the Nyquist plot (FIG. 6). This observation is further confirmed by the decrease in salt rejection (FIG. 5(A)) upon reaching the critical flux. Furthermore, the polarized layer formed below $J_{crit}$ did not appear to grow significantly with time, shown in FIG. 7(A). However, above $J_{crit}$, as the cake layer grew thicker it would increase CECP with a higher concentration at the membrane surface, and this is reflected in the higher $G_{DP}$ as the fouling proceeded (1 and 2 hr data after flux was adjusted in FIG. 7(A)).

Again, there was also a contribution to this effect on $G_{DP}$ from the permeate side. Thus initially, as accumulation on the feed side begins, the $G_{DP}$ on the feed side drops with increasing flux. The $G_{DP}$ on the permeate side also drops because of the increased water flux. When the $J_{crit}$ was exceeded, the cake formed on the feed side and the salt concentration rises on the feed with increasing flux. The increased salt concentration leads to an increase in salt in the permeate which was associated with an increase in the $G_{DP}$ in the permeate side.

Conductance of the skin layer ($G_{skin}$) and base layer ($G_{base}$) of the membrane were also deduced using mathematical modelling of the impedance data to a multilayered Maxwell-Wagner model. FIG. 7(B) shows the changes in $G_{skin}$ as the flux was increased. The change in $G_{skin}$ was not as distinct as $G_{DP}$ around the $J_{crit}$ although it does show a minor minima around 30 $l/m^2$ h. $G_{base}$, as shown in FIG. 7(C), does not differ much before and around the $J_{crit}$. These results confirm that the diffusion polarization layer was the dominant layer where fouling behavior can be observed and studied. Hence, the impedance of this layer was chosen as the most important EIS parameter for the study of the phenomenological events at the membrane-solution interface because it gives the most sensitive response as the concentration profile changes.

Figure 8:
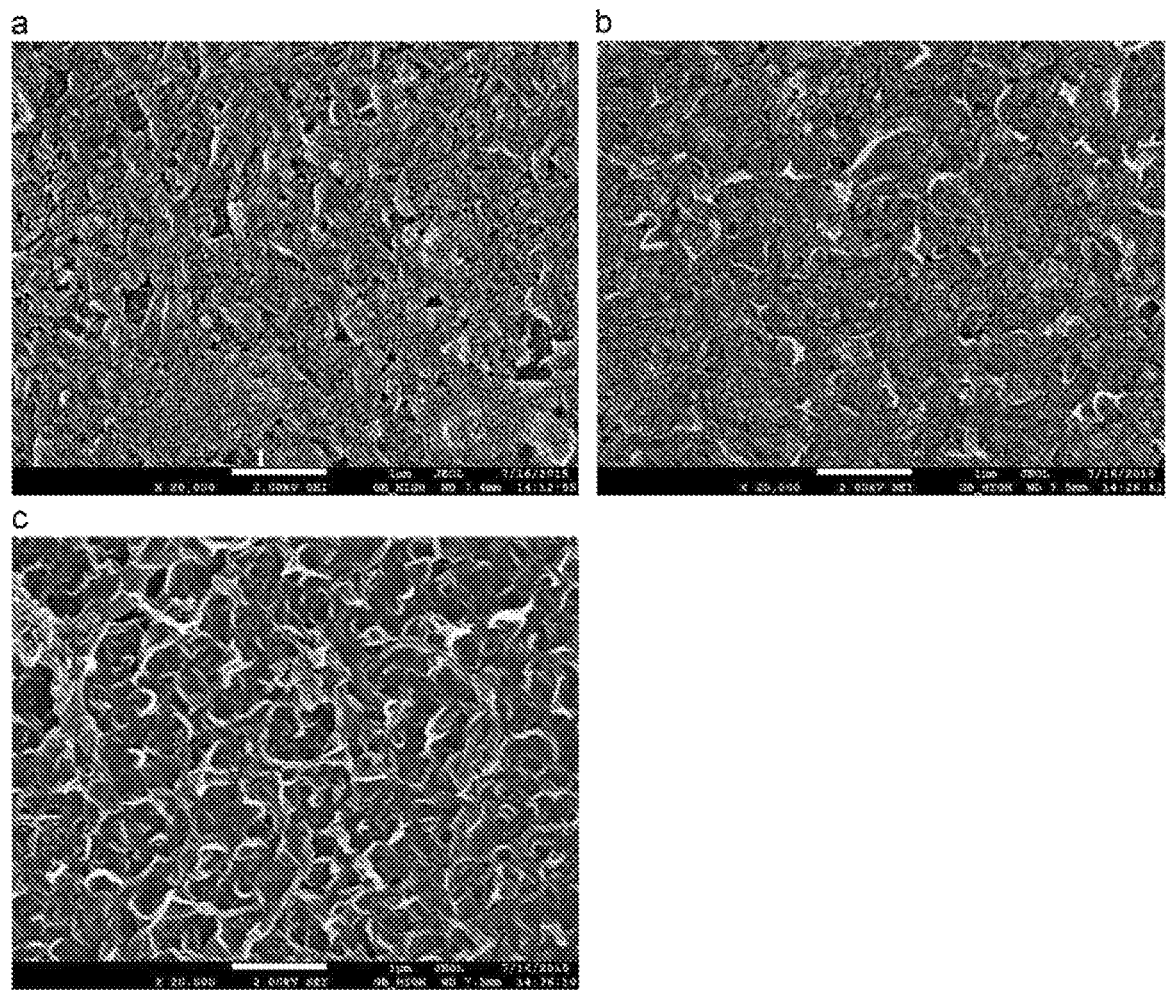
FIG. 8 depicts scanning electron microscopy (SEM) images of silica particles on membrane surface at ×20,000 magnification after 2 h of fouling at (a) 25 $l/m^2$ h; (b) 35 $l/m^2$ h, and (c) clean membrane. Conditions: RO feed=200 ppm silica with 2000 ppm NaCl; crossflow velocity=0.15 m/s. Scale bar in the figures denote 1 μm.

FIG. 8 depicts scanning electron microscopy (SEM) images of silica particles on membrane surface at ×20,000 magnification after 2 h of fouling at (a) 25 l/m² h; (b) 35 l/m² h, and (c) clean membrane. Conditions: RO feed=200 ppm silica with 2000 ppm NaCl; crossflow velocity=0.15 m/s. Scale bar in the figures denote 1 µm.

Example 10.2: Effect of Crossflow Velocity

Figure 9:
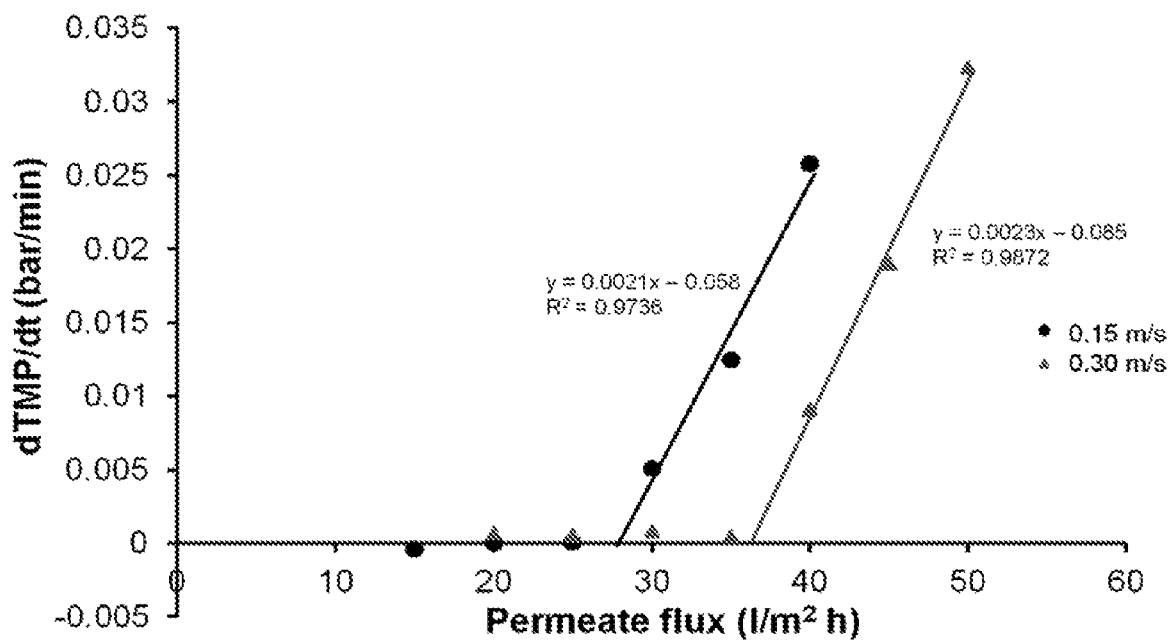
FIG. 9 is a graph showing comparison of d/dt [TMP] versus flux plot for a flux step methodology used herein with different crossflow velocities. Conditions: RO feed=200 ppm silica with 2000 ppm NaCl; crossflow velocity=0.15 m/s and 0.30 m/s.

The critical flux was also expected, from theoretical considerations to be dependent on crossflow velocity. This was examined in a separate series of experiments. The d/dT [TMP] data versus flux in FIG. 9 shows $J_{crit}$ at two crossflow velocities (0.15 and 0.30 m/s). In the present study, $J_{crit}$ with the increased crossflow velocity (from 0.15 to 0.30 m/s) resulted in a higher $J_{crit}$ of about 37 l/m² h (up from 30 l/m² h).

Figure 10:
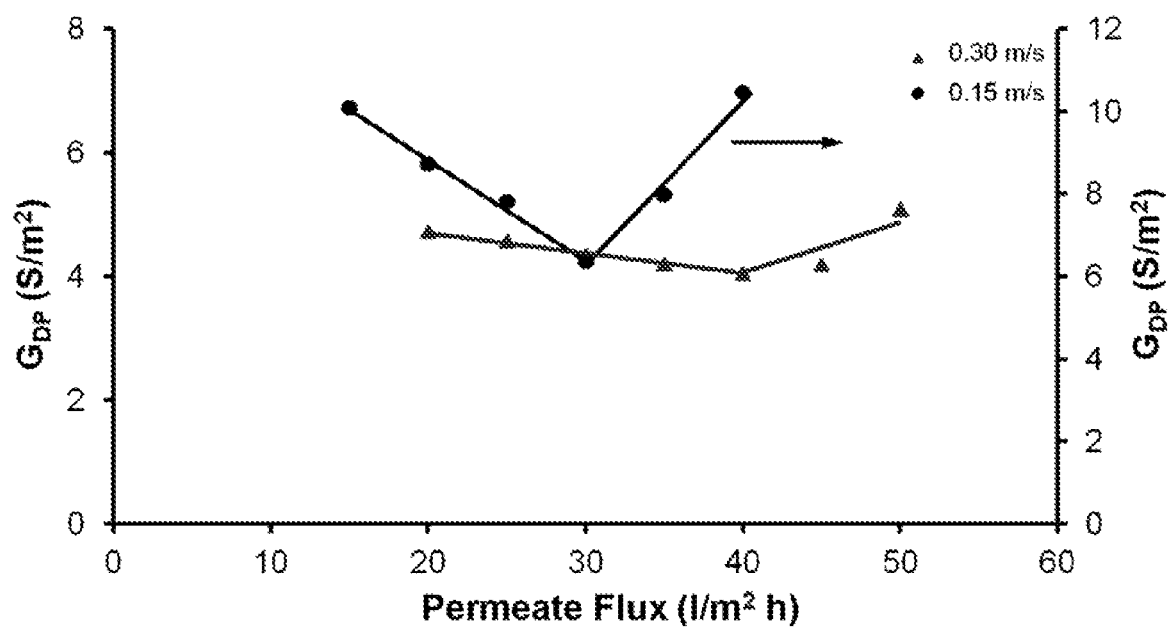
FIG. 10 is a graph showing comparison of conductance of the diffusion polarization layer ($G_{DP}$) for flux step experiments with different crossflow velocities. Conditions: RO feed=200 ppm silica with 2000 ppm NaCl; crossflow velocity=0.15 and 0.30 m/s.

From FIG. 10, it may be observed that the turning point for $G_{DP}$ also shifted to a higher flux of around 40 l/m² h that is relatively close to the TMP-derived $J_{crit}$. The explanation for this is the increased crossflow provided a greater shear rate, causing increased back transport of particles from the membrane-solution interface and a thinner layer of silica below the $J_{crit}$. Beyond the critical flux of about 40 l/m² h the cake would start to form as before at the surface leading to CECP and a rise in the $G_{DP}$.

Figure 11:
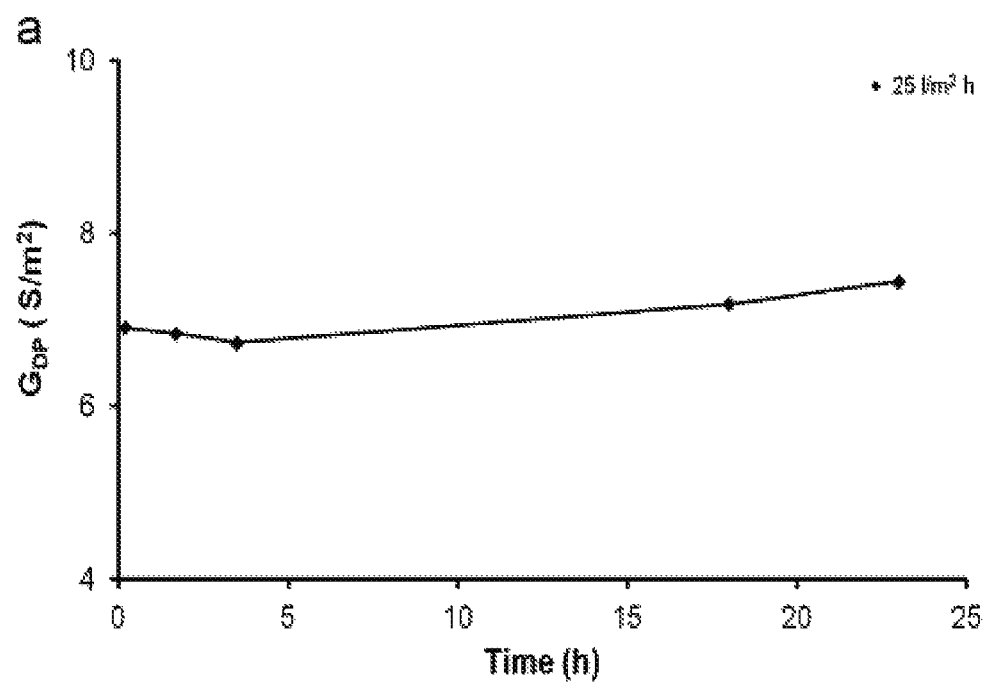
FIG. 11 shows (a) $G_{DP}$ of membrane obtained from the fitted model for silica fouling as a function of time in a prolonged fouling experiment at a flux of 25$l/m^2$ h; (b) $G_{DP}$ of membrane obtained from the fitted model for silica fouling as a function of time in a prolonged experiment at a flux of 35 $l/m^2$ h, and (c) TMP at an imposed flux of 25 and 35 $l/m^2$ h in the prolonged fouling experiment. Conditions: RO feed=200 ppm silica with 2000 ppm NaCl; crossflow velocity=0.15 m/s.
Figure 11:
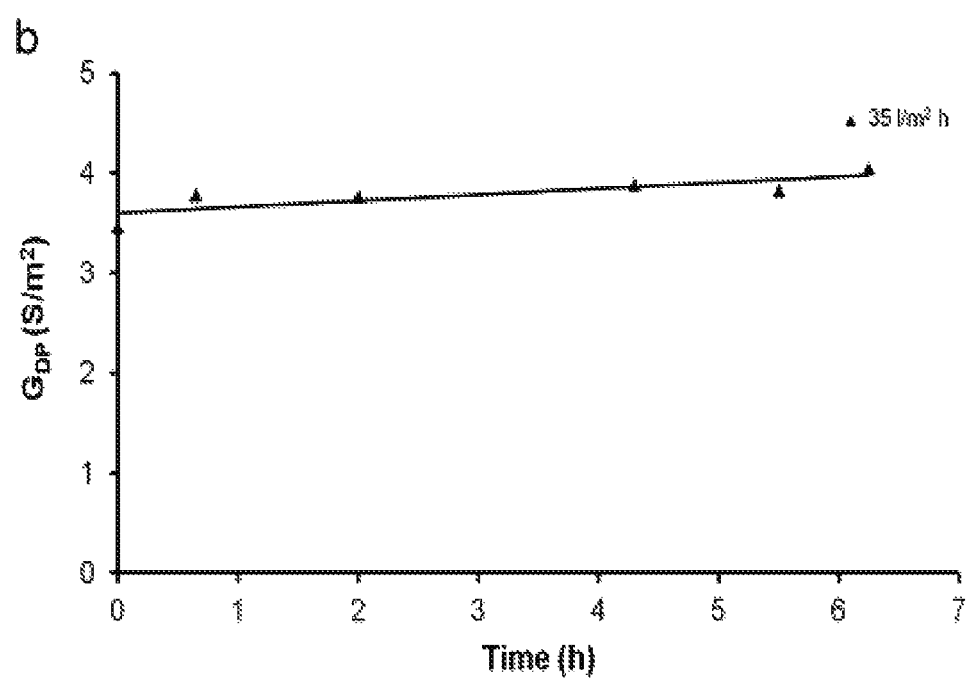
Figure 11:
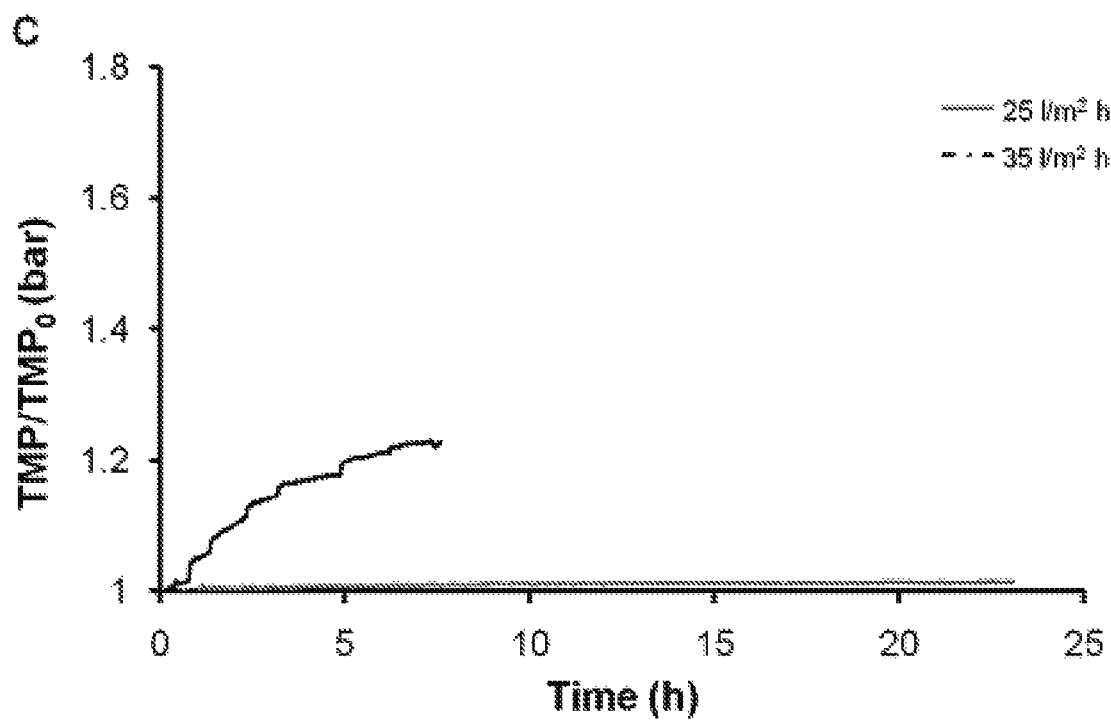

FIG. 11 shows (a) $G_{DP}$ of membrane obtained from the fitted model for silica fouling as a function of time in a prolonged fouling experiment at a flux of 25 l/m² h; (b) $G_{DP}$ of membrane obtained from the fitted model for silica fouling as a function of time in a prolonged experiment at a flux of 35 l/m² h, and (c) TMP at an imposed flux of 25 and 35 l/m² h in the prolonged fouling experiment. Conditions: RO feed=200 ppm silica with 2000 ppm NaCl; crossflow velocity=0.15 m/s.

Commercial RO systems and side-stream (canary) cells use spacer-filled channels. In the case of critical fluxes, several studies have shown that $J_{crit}$ may be enhanced in spacer-filled channels. This was done by the inclusion of a diamond shaped spacer in the feed channel.

Figure 12:
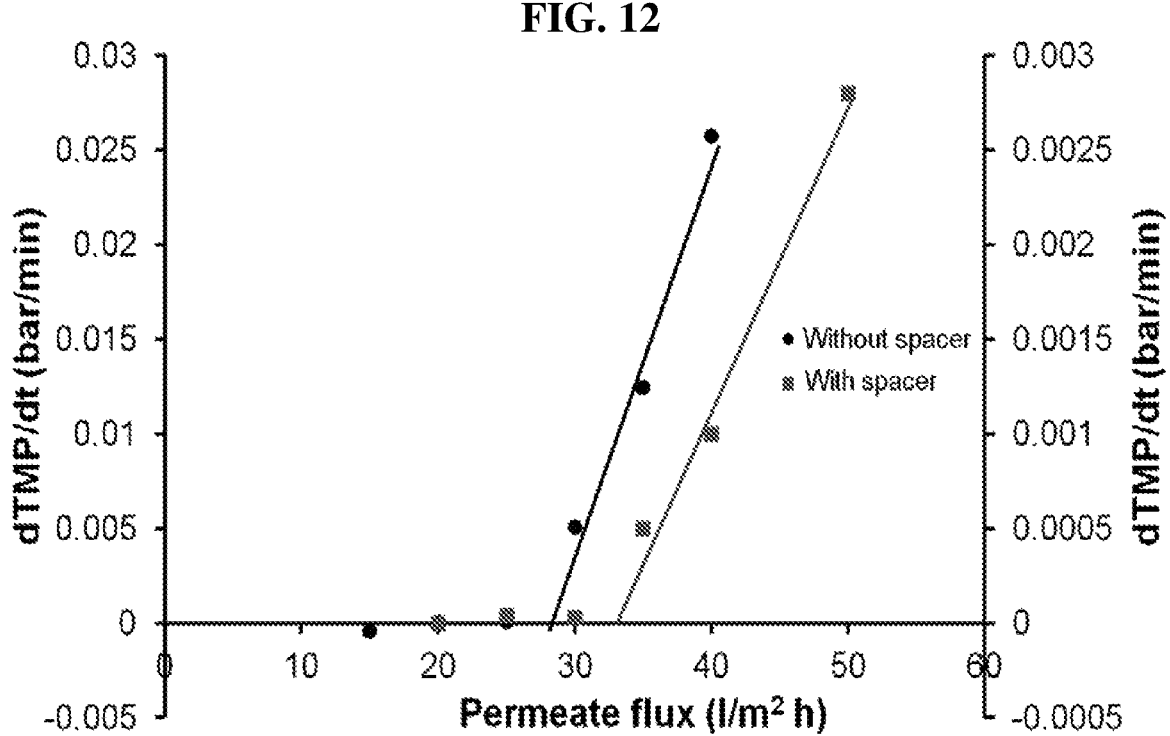
FIG. 12 is a graph showing d/dt [TMP] versus permeate flux for flux step experiment with and without a spacer in the feed channel. Conditions: RO feed=200 ppm silica with 2000 ppm NaCl; crossflow velocity=0.15 m/s.
Figure 13:
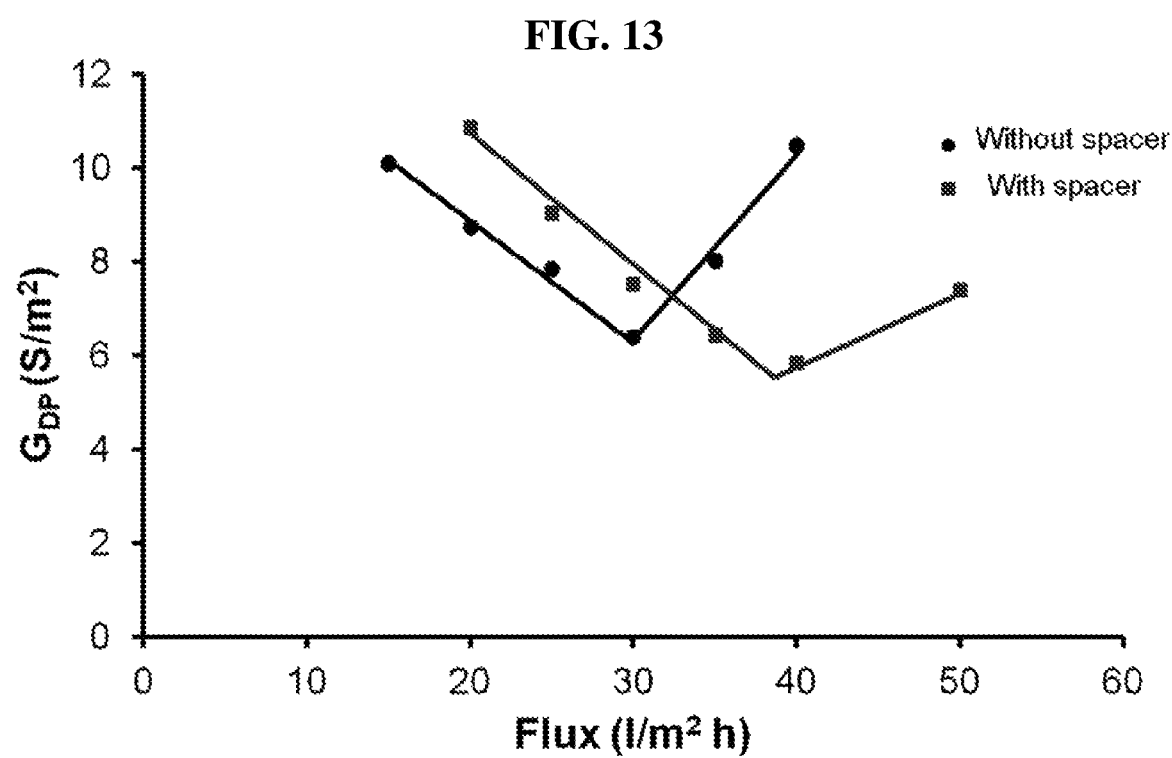
FIG. 13 is a graph showing $G_{DP}$ of membrane obtained from the fitted model for silica fouling in the flux step experiments with no spacer in the feed channel and with a spacer in the channel. Conditions: RO feed=200 ppm silica with 2000 ppm NaCl; crossflow velocity=0.15 m/s.
Figure 14:
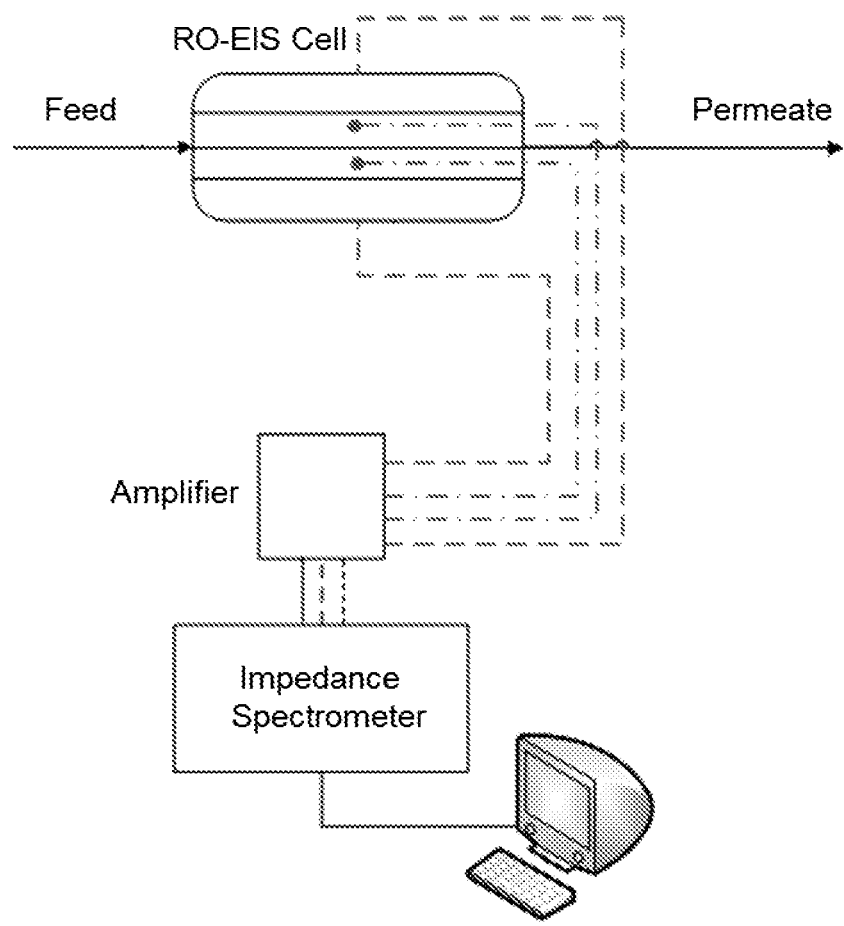
FIG. 14 is a schematic diagram showing connection of a reverse osmosis cell with a EIS spectrometer and amplifier unit according to an embodiment. It may be used for monitoring of biofouling using EIS.

The d/dt [TMP] in the spacer-filled channel is presented in FIG. 12, and the estimated critical flux, $J_{crit}$, was about 33 l/m² h at the crossflow rate of 0.15 m/s. The spacer gave an enhancement of the $J_{crit}$ by about 18%. The turning point of the $G_{DP}$ plot also shifted to a higher flux as shown in FIG. 13 with a $J_{crit}$ as determined by EIS of about 38 l/m² h. This value was higher, but relatively close to the value obtained by d/dt[TMP] analysis. A longer flux step period could bring the two methods closer, as suggested by FIG. 7(a).

Without wishing to be bound by theory, it was postulated that presence of the spacer introduced complex mixing behavior as the stream flows over and under the attached filaments, leading to a patchy and heterogeneous particle deposition, and in the present study it led to a higher value of $J_{crit}$. The fact that the EIS can determine $J_{crit}$, which is dependent on the presence of spacers further supported use of a side-stream 'canary cell' incorporating EIS to characterize plant performance. To simulate the plant, the canary cell requires spacers in the flow channel and the non-invasive detection method needs to provide a 'membrane-averaged' signal; EIS delivers this information.

Example 11: Steps for Determination of Critical Flux of RO Using EIS (Embodiment 1)

Figure 15:
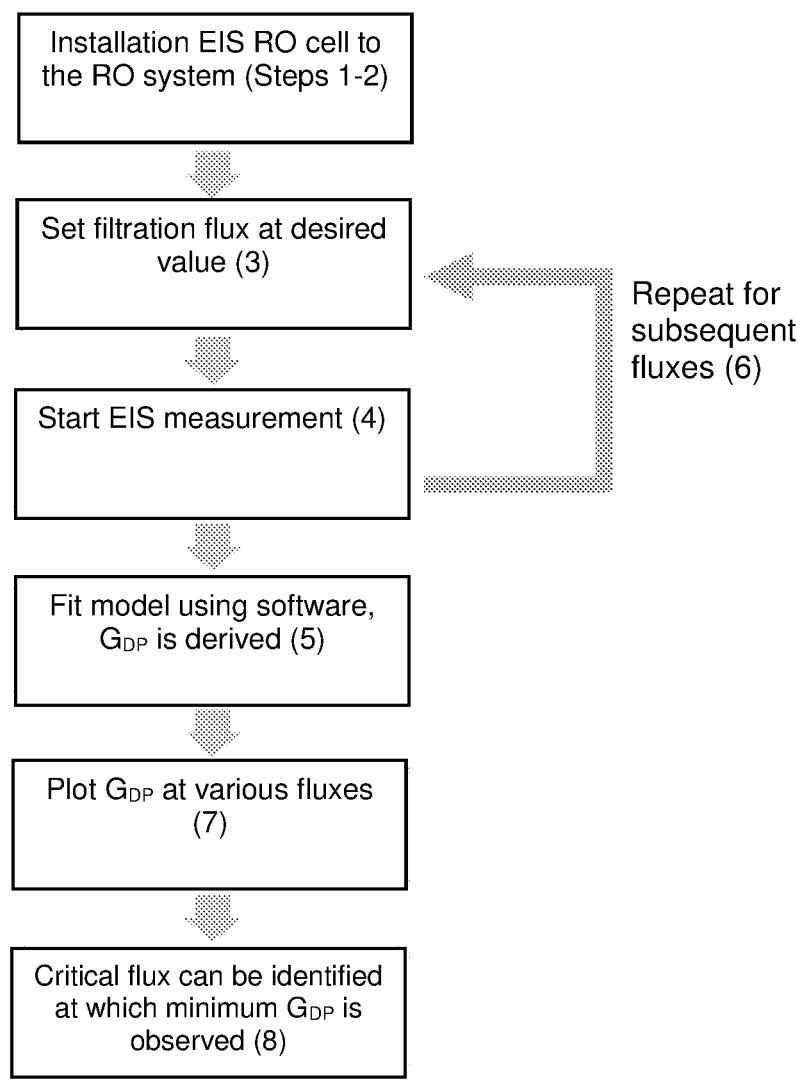
FIG. 15 is a flowchart for comparing the critical flux of RO system using the flux step method with that using EIS.

FIG. 15 is a flowchart for comparing the critical flux of RO system using the flux step method with that using EIS. The general methodology for determination of critical flux of reverse osmosis membrane using electrical impedance spectroscopy is as follows.

1. Attach EIS equipped RO cell (FIG. 2) to a RO system or connected to a side stream of RO train in water treatment plant
2. Connect the cell with the EIS spectrometer and the amplifier unit (FIG. 15)
3. Start filtration at the lowest flux
4. Using the control software provided by the EIS spectrometer to initiate EIS measurement.
   a. When the measurement was initiated, a small sinusoidal AC of known frequencies ω and amplitude $i_o$ was injected into the RO cell through the current electrodes throughout the specified range of frequencies ($10^{-1}$ Hz to $10^5$ Hz).
   b. The voltage amplitude $v_o$ and phase difference θ between the voltage and current were measured throughout the frequencies.
5. The conductance and capacitance at each frequency were determined through:

$$G = \frac{1}{|Z|}\cos\theta \text{ and } C = -\frac{1}{\omega|Z|}\sin\theta \text{ where } |Z| = \frac{v_o}{i_o}$$

And hence the frequency dependent complex impedance can be determined $$Z(\omega) = \frac{G}{G^2 + C^2\omega^2} - j\frac{C\omega}{G^2 + C^2\omega^2}$$

6. These frequency dependent complex impedances at the frequency range of $10^{-1}$ Hz to $10^5$ Hz can be modelled using a number of circuit elements in series representing internal and external layers in the membrane. This is the so-called Maxwell-Wagner model and can be performed through mathematical fitting procedures. Once fitted, the model would reveal the numbers of elements that are present in the system. The elements that are of interest are at very low frequencies (less than 10 Hz). This layer is known as the diffusion polarization layer (DP). The impedance and hence conductance of the DP layer ($G_{DP}$) is hence extracted from the fitted model.
7. Perform the same measurement and data analysis for different fluxes.
8. Plot $G_{DP}$ against various fluxes.
9. Critical flux is identified at which the minimum $G_{DP}$ is observed.

In summary, EIS was employed to detect the phenomenological events that occur at the membrane-solution interface when the system was operated below, above and near the critical flux region. Generally, trend of $G_{DP}$ derived from the EIS data corroborated well with TMP measurement for both the filtration with different imposed fluxes and flux step methods. The $G_{DP}$ decreased with increasing flux due to silica concentration polarization. As the flux was increased toward the critical flux, the $G_{DP}$ was found to increase due to the formation of stagnant/cake layer and the accumulation of salt at this layer as well as the membrane-solution interface, leading to the CECP effect and hence, the rise in $G_{DP}$. This hypothesis was further confirmed when higher $G_{DP}$ was obtained at longer fouling times due to the thicker stagnant layer that contained higher concentration of salt in the flux step experiment.

The critical flux increased with increasing crossflow velocity. The inflection point of $G_{DP}$ shifted to a higher flux, indicating the formation of cake layer at higher flux, which is attributed to the shear force that tends to drag the particles along on the membrane surface. In addition, it was observed that the use of spacer enhanced the $J_{crit}$, leading to a higher turning point in the $G_{DP}$ plot obtained from EIS measurement.

This study shows that EIS is able to provide the basis of the phenomenological events happening at the membrane-solution interface below, around and above the critical flux region. The onset of cake formation and CECP effect can be detected by EIS measurements while the TMP data provides no information for these events. Hence, EIS is a highly promising tool to be incorporated into a side stream canary cell for fouling and cake formation monitoring in high pressure membrane systems.

Example 12: EIS Fouling Monitor (Embodiment 2)

A detailed description of the EIS fouling monitor has been described above. Briefly, the system consists of a stainless steel crossflow RO-EIS cell fitted with a pair of current injecting plates and a pair of voltage electrodes, a high resolution four-terminal EIS spectrometer and an amplifier unit. The dimension of the RO-EIS cell is 302 mm×60 mm×0.95 mm with an effective membrane area of 0.01812 m².

The RO membrane was sandwiched between the two current injecting stainless steel plates, separated by a plastic gasket to prevent electrical short-circuits. Both the current and voltage electrodes are made of stainless steel. During the EIS measurement, a small AC was injected into the system and the phase difference between the current and voltage and the amplitude of voltage and current were measured using an electrical impedance spectrometer. The electrical properties of the system were measured from $10^{-1}$ to $10^5$ Hz. For each scan, three replicates of impedance spectra were obtained. The time required per scan was approximately 30 minutes.

This system makes use of the four-terminal method in which four electrodes are used to measure the frequency dependent impedance and therefore the complicating effects of the frequency dependent impedance at the voltage electrode-solution interface is eliminated.

Example 13: Bacteria Stock Preparation (Embodiment 2)

*Pseudomonas aeruginosa* PA01 (ATCC, BAA-47) was used as the model bacterium in this study. Single colony on agar plates, freshly cultured from frozen glycerol stocks was sub-cultured on Nutrient Broth (NB) (Difco NB-BD diagnostics) agar plates (NB, 8 g L$^{-1}$ supplemented with 14 g L$^{-1}$ agar—Difco agar, BD diagnostics). The bacterial stock solution was prepared by growing the culture in nutrient broth (NB) (5 g L$^{-1}$ NB, 2 g L$^{-1}$ NaCl) with shaking at 150 rpm at room temperature for 24 hours. The bacteria cells were then harvested by centrifugation at 4000×g at 4° C. for 30 minutes. The pellets were subsequently washed and suspended in NaCl solution (2 g L$^{-1}$, the same concentration as the experimental condition) to achieve an optical density (OD600) of 0.1.

The stock solution of dead bacteria was prepared using the above procedure followed by heating in 80° C. for 2 hours to ensure that the bacteria were killed. Viable bacterial counts were carried out for the dead bacterial stock and no colonies were found to be formed on the plates even after 36 hours of incubation at 37° C.

Example 14: RO Biofouling Setup (Embodiment 2)

Figure 16:
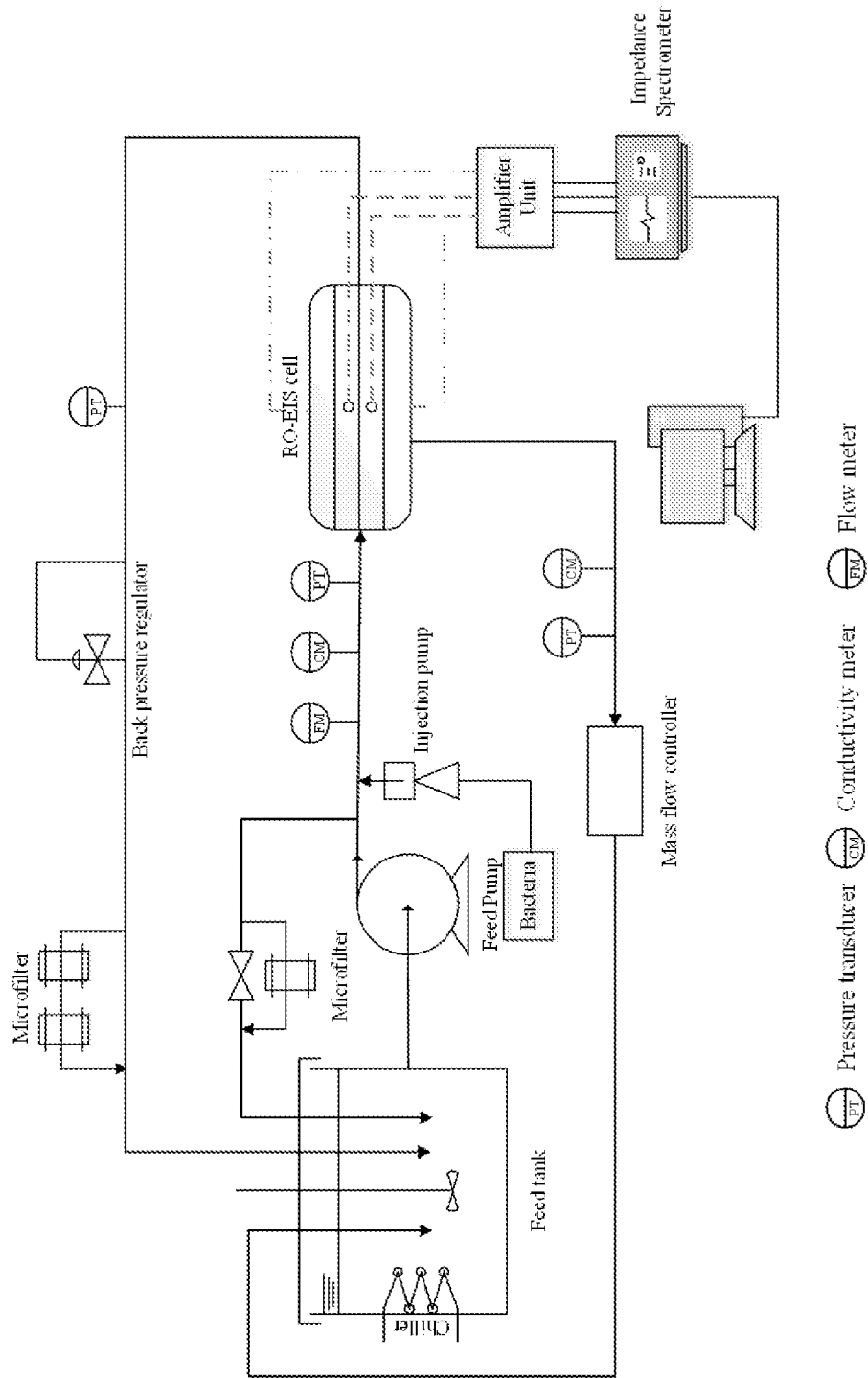
FIG. 16 is a schematic diagram of the RO-EIS crossflow filtration system according to one embodiment.

A schematic diagram of the RO setup is illustrated in FIG. 16. Modifications of the setup include the installation of the injection pump as well as micro-filters in the bypass and retentate streams.

A high pressure pump was used to pump the feed solution from a 10 L feed tank to the RO-EIS crossflow cell. To ensure that the solution in the feed tank could be mixed thoroughly, an overhead stirrer was installed in the feed tank. The temperature in the feed tank was maintained with cooling water from a chiller at 23±1° C. The system pressure was controlled by a backpressure regulator and the pressures of the feed as well as permeate were monitored using pressure transducers. A mass flow controller was installed in the permeate line to maintain constant flux throughout the experiment. Two rotameters were installed in the feed stream to indicate the flow to the RO-EIS cell.

The conductivity of feed and permeate were measured using two conductivity meters. All the readings, including pressure, permeate flux, feed and permeate conductivities were recorded through a data acquisition system. During the biofouling studies, the bacteria stock solution was injected into the system before entering the RO-EIS cell using an injection pump.

The system was operated in a full recirculation mode where the bypass, retentate and permeate streams were returned to the feed tank. A set of micro-filters were installed in the bypass and retentate streams (5 μm and 0.2 μm for concentrate, 0.2 μm for bypass) before they flowed into the feed tank to prevent the feed tank from turning into an "active bioreactor".

Example 15: Biofouling Experimental Protocol (Embodiment 2)

Before each experiment, the RO flat sheet membranes (DOW FilmTec, TW30) were cut and sterilized in absolute ethanol for 2 hours. The membranes were then rinsed thoroughly and stored in Milli-Q water (Millipore) for at least 24 hours before using.

The experimental procedures included: (i) overnight membrane compaction at 50 L m$^{-2}$ h$^{-1}$ with background NaCl (2000 ppm), (ii) addition of NB (to obtain a final concentration of 24 mg L$^{-1}$), (iii) continuous injection of the bacteria stock solution, (iv) biofouling of the RO membrane and (v) cleaning of the RO setup upon completion of the experiment. The repeatability of the biofouling experiments was calculated using the standard deviation of the initial increase of normalized $G_{DP}$ plot and it was estimated to be ±10%.

The RO membrane was compacted at a flux of 50 L m$^{-2}$ h$^{-1}$ for 24 hours prior to the biofouling experiment. This was to ensure that there were no significant changes in the membrane properties as any such changes would be detected by EIS.

After compaction, the flux was adjusted to the desired value and fresh NaCl solution was added into the feed tank. The system was then allowed to stabilize for 1 hour. NB was added into the feed tank to achieve 24 mg L$^{-1}$ or 7.8 mg L$^{-1}$ of total organic carbon (TOC) and the system was allowed to stabilize for another hour.

After stabilization, the biofouling experiment was commenced with continuous injection of the bacterial stock solution into the feed line at a dilution rate of 1:1000 based on the RO crossflow velocity. This was equivalent to a bacterial load of $10^9$ cfu $mL^{-1}$ into the system. The bacterial stock solution was replaced every 48 hours. The biofilm was allowed to grow for durations of 1 to 5 days. The experiments were conducted in a constant flux mode (ranging from 8 to 40 L $m^{-2}$ $h^{-1}$) and the increases in TMP were monitored. EIS measurements were conducted every 2.5 hours (over a frequency range: $10^{-1}$ to $10^5$ Hz). The solution in the feed tank was replaced twice daily with the same concentration of NaCl and NB in order to maintain the freshness level of the feed.

Upon completion of each experiment, the RO system was cleaned with $HNO_3$ solution (pH 2, 1.5 hours) followed by NaOH (pH 11, 1.5 hours) and then rinsed thoroughly with Milli-Q water.

Example 16: Salt Pulse Tracer Test (Embodiment 2)

A sodium chloride solution, 200 g $L^{-1}$ was injected into the high pressure feed line of the RO-EIS crossflow using an injection pump. The flow rate of the high concentration salt solution was maintained at 0.6 mL $min^{-1}$ and each pulse length lasted for 10 minutes. During the tracer test, the retentate and permeate were drained and the feed solution was topped up to 20 L prior to the test. The detailed procedure of the salt pulse tracer test was described elsewhere (for example see Reference 1).

Example 17: Membrane Autopsy (Embodiment 2)

The fouled membrane was removed from the RO-EIS cell for autopsy studies when the experiment was completed. The membrane was first cut into four segments. Three segments (3 cm×4 cm) covering the inlet, middle and outlet of the RO-EIS cell were used for the viable bacterial counts and quantifications of protein and polysaccharides which made up the EPS. The results presented are based on the averaged value of the three samples. The other segment (1 cm×3 cm) was cut from the middle of the membrane for the confocal laser scanning microscopy (CLSM) observation.

The cut membrane segments (3 cm×4 cm) were soaked in 25 mL NaCl (2000 ppm, the same as the experimental conditions) in separate centrifuge tubes. The tubes were sonicated using a probe sonicator for 3 minutes to detach the biofilm from the membrane surface. The tubes were then vortexed for 10 seconds and 10 µL of the solution was withdrawn from the tube for viable bacterial counts. A 1.0 M of solution of NaOH was added into the remaining solution in the tubes, mixed and stored at 4° C. for 24 hours before the analysis of EPS was carried out.

Example 17.1 EPS Extraction

The polysaccharide content of the EPS was measured by the colorimetric method. One mL of 5% (v/v) phenol solution and 5 ml of concentrated $H_2SO_4$ were added into a 2 mL of sample solutions. The solutions was mixed and left to cool down to room temperature for 15 minutes before the UV absorbance at 490 nm ($A_{490}$) was measured using a UV spectrometer. Glucose was used as the polysaccharide standard for calibration.

The protein content of the EPS was quantified using the Bicinchoninic acid (BCA) Assay Kit (Pierce, #23227). Two mL of the working solution was mixed with 1 mL of sample solution and incubated in darkness at room temperature for 2 hours. The UV absorbance was then measured at 562 nm ($A_{562}$). Bovine serum albumin was used to construct the standard calibration curve.

Example 17.2 Viable Bacterial Counts

Viable bacterial counts were conducted using the modified Miles and Misra method. Briefly, 10 µL of $10^{-1}$ to $10^{-5}$ dilutions were pipetted onto the NB agar plates. The plates were incubated at 37° C. for 24 hours before colony counting. Viable cells were expressed as colony forming units (cfus) per $cm^2$ of membrane.

Example 17.3 Confocal Laser Scanning Microscopy (CLSM)

Membrane samples used for CLSM analysis were obtained from the same site for all experiments. Biofilms were stained with LIVE/DEAD BacLight Bacterial Viability Kit (Molecular Probes, L7012) according to the manufacturer's specifications.

In brief, the reagents supplied by the manufacturer in a buffer solution of 0.85% NaCl were used to obtain the working solution for staining. The membrane samples were then soaked in the working solution for 45 minutes in dark at room temperature. After the incubation, the membrane samples were rinsed three times with the buffer solution before placing them on a glass slide under a cover slip. The microscopic observation and image acquisition were obtained using a CLSM (Zeiss, model LSM710). The biovolume was calculated using the IMARIS software (Bitplane, version 7.1.3).

Example 18: Rationale for Results Presentation (Embodiment 2)

Example 18.1 Normalized $G_{DP}$ ($G_{DP}$/$G_{DP-0}$)

The experimental data obtained from the EIS measurements were fitted with the Maxwell-Wagner model, which reveals the number of elements and/or processes occurring in the system. The elements at the low frequencies (about 0.01 Hz to 10 Hz), corresponding to the DP layer can be derived from the fitting as detailed in Example 1.

$G_{DP}$ has been identified as the main EIS parameter associated with membrane fouling as it reveals the conditions at the interfacial layer on the membrane surface. As each membrane could possibly have different initial values of $G_{DP}$, it should be noted that the $G_{DP}$ results represented here have been normalized with the value of $G_{DP}$ at the start of the experiment (time=0) (designated as $G_{DP-0}$).

$$G_{DP-Normalized} = \frac{G_{DP}}{D_{DP-0}} \quad (8)$$

Example 19: TMP and EIS Measurements (Embodiment 2)

Figure 17:
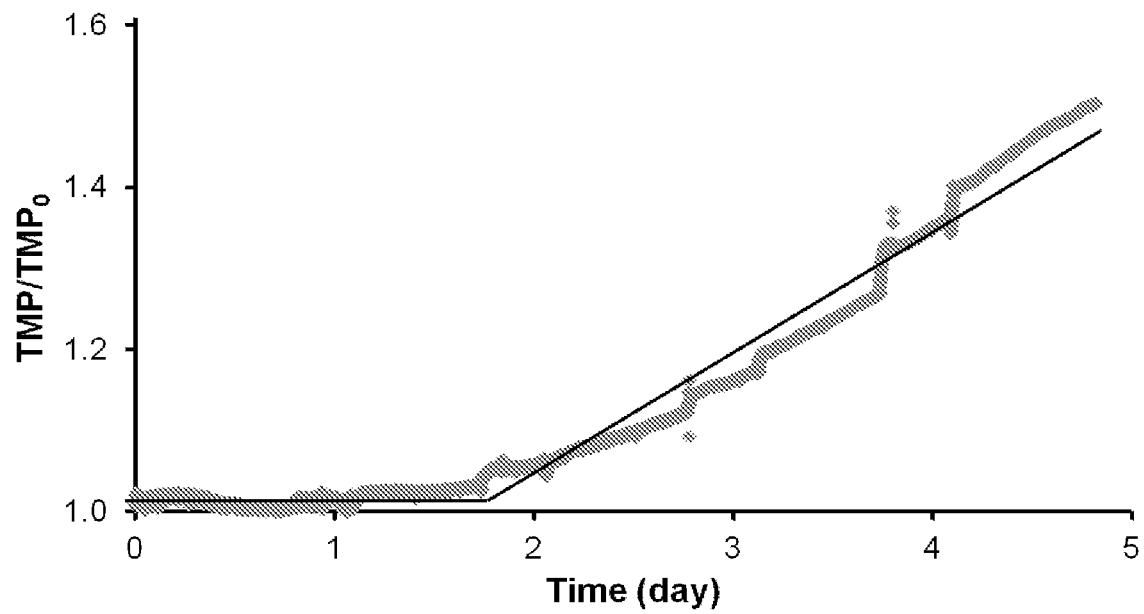
FIG. 17 is a graph showing normalized TMP profile as a function of time in the presence of bacteria (concentration about $10^9$ cfu $mL^{-1}$). Conditions: permeate flux=30 L $m^{-2}$ $h^{-1}$, crossflow velocity=0.15 m $s^{-1}$, RO feed=24 mg $L^{-1}$ NB with 2000 mg $L^{-1}$ NaCl.

FIG. 17 shows the normalized TMP profile when bacteria were injected continuously into the system. There are two stages of TMP profiles that were observed: the first stage shows only insignificant changes from day 0 to day 1.7. A TMP jump was observed in this study, at about 1.8 days where the normalized TMP increased rapidly (47%) up to day 5.

Figure 18:
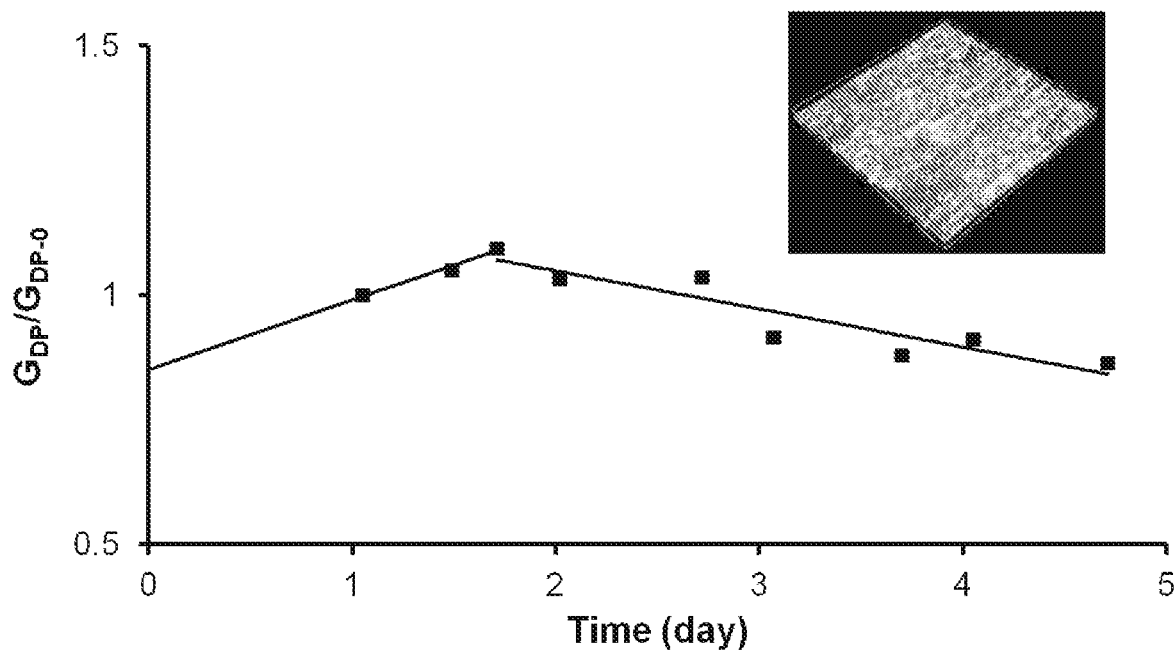
FIG. 18 is a graph showing normalized $G_{DP}$ as a function of time for a 5-day biofouling experiment. Inset: Confocal laser scanning microscopy (CLSM) images for live/dead staining of biofilm on RO membrane at end of the 5-day experiment. Note that the live cells are shown in green whilst dead cells are in shown red. Conditions: permeate flux=30 L $m^{-2}$ $h^{-1}$, crossflow velocity=0.15 m $s^{-1}$, RO feed=24 mg $L^{-1}$ NB with 2000 mg $L^{-1}$ NaCl.

FIG. 18 displays the normalized $G_{DP}$ obtained from the EIS measurement for the 5-day long biofouling experiment. The normalized $G_{DP}$ increased initially from day 1 to day 1.5 where a maximum point could be observed. From day 1.5 onwards, the plot shows an opposite trend in which the normalized $G_{DP}$ decreased for the remaining course of biofouling.

Figure 19:
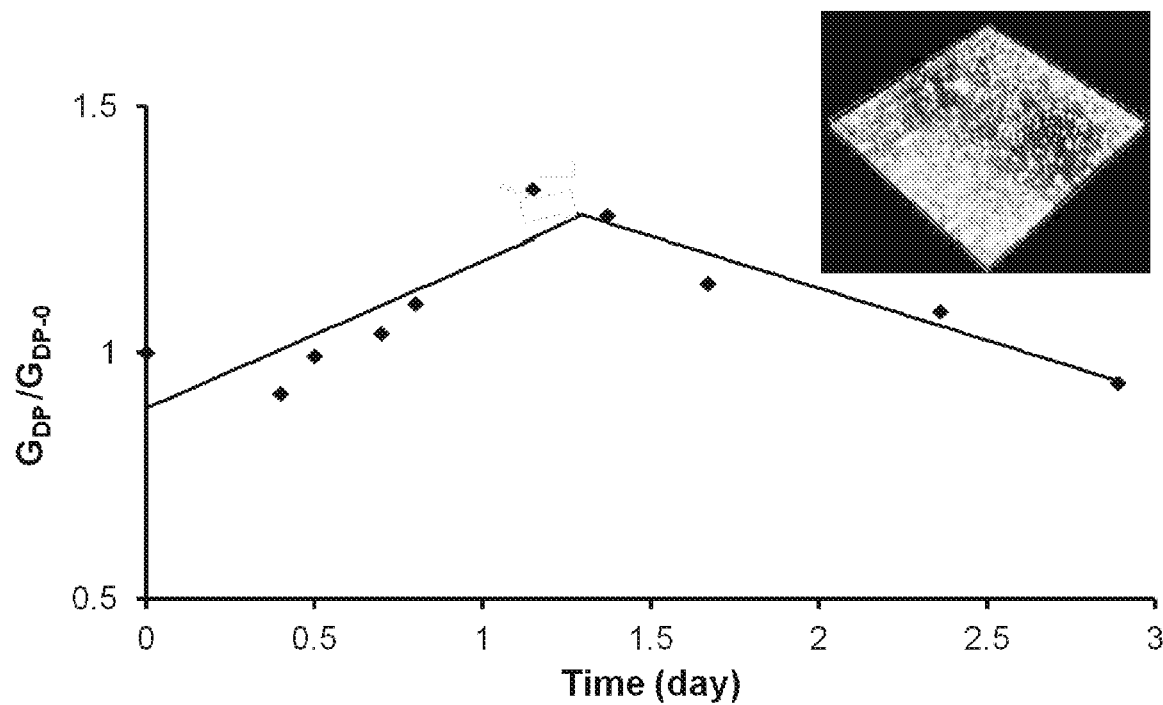
FIG. 19 is a graph showing normalized $G_{DP}$ as a function of time for a 5-day biofouling experiment. Inset: CLSM images for live/dead staining of biofilm on RO membrane at end of the 5-day experiment. Note that the live cells are shown in green whilst dead cells are in shown red. Conditions: permeate flux=30 L $m^{-2}$ $h^{-1}$, crossflow velocity=0.15 m $s^{-1}$, RO feed=24 mg $L^{-1}$ NB with 2000 mg $L^{-1}$ NaCl.
Figure 20:
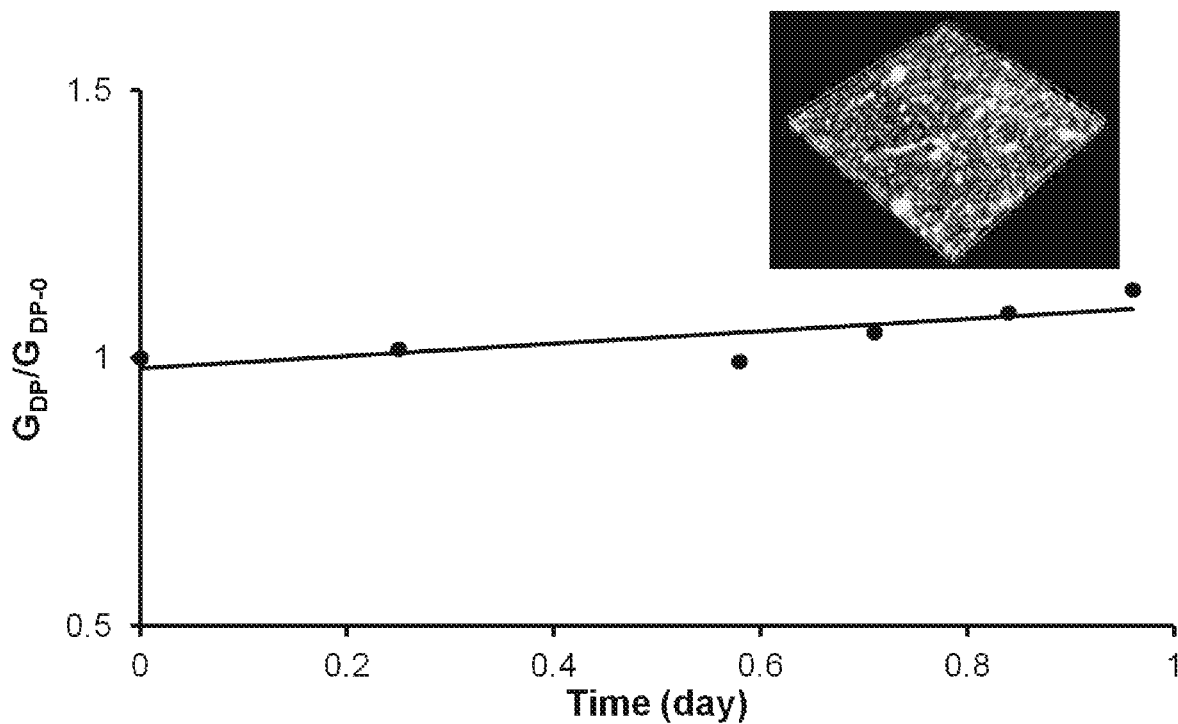
FIG. 20 is a graph showing normalized $G_{DP}$ as a function of time for a 3-day biofouling experiment. Inset: CLSM images for live/dead staining of biofilm on RO membrane at the end of the 3-day experiment. Note that the live cells are shown in green whilst dead cells are shown in red. Conditions: permeate flux=30 L $m^{-2}$ $h^{-1}$, crossflow velocity=0.15 m $s^{-1}$, RO feed=24 mg $L^{-1}$ NB with 2000 mg $L^{-1}$ NaCl.

To confirm the trend obtained for the EIS measurements, different durations of biofouling were carried out with the EIS scans recorded in-situ and in real time. FIG. 19 features the normalized $G_{DP}$ as a function of time for 3-day biofouling. Similar to the results obtained for 5-day biofouling, there was a maximum point at around 1.5 days followed by a gradual decrease of normalized $G_{DP}$ for the 1-day biofouling experiment, the normalized $G_{DP}$ (FIG. 20) shows a slight increase, which is consistent with the results shown for 5-day and 3-day biofouling experiments.

In order to investigate whether concentration polarization of the components in the medium, rather than the bacteria, was responsible for the results obtained, experiments were performed using only the medium without the injection of the bacteria.

Figure 21:
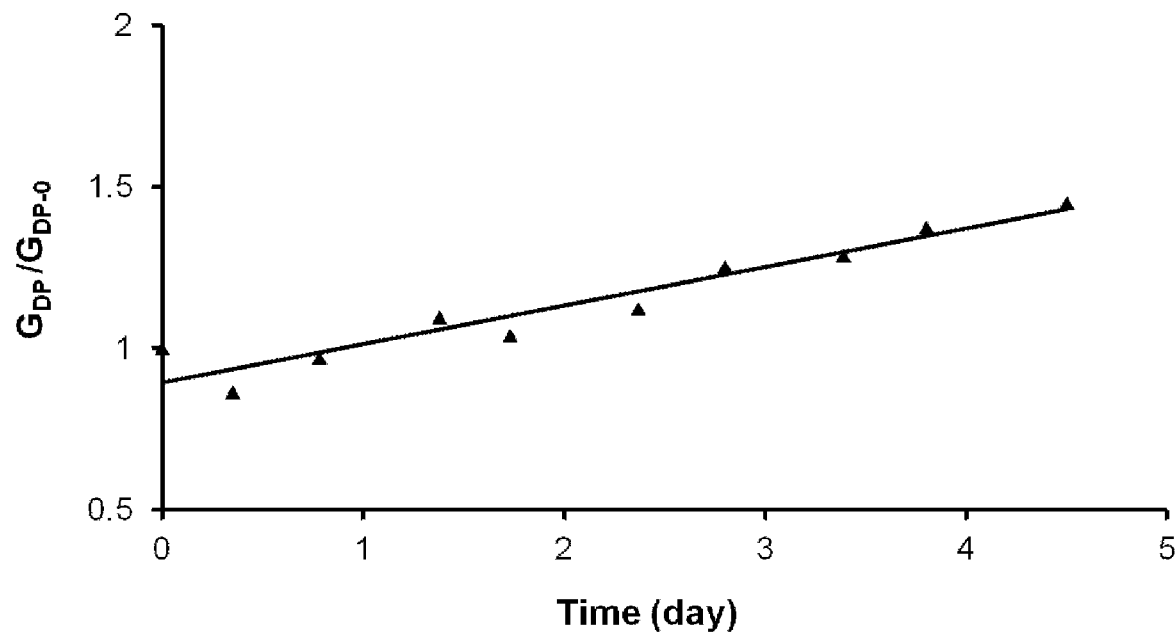
FIG. 21 is a graph showing normalized $G_{DP}$ as a function of time for nutrient fouling in the absence of bacteria. Conditions: permeate flux=30 L m$^{-2}$ h$^{-1}$, crossflow velocity=0.15 m s$^{-1}$, RO feed=24 mg L$^{-1}$ NB with 2000 mg L$^{-1}$ NaCl.

The normalized $G_{DP}$ for nutrient fouling (without bacteria) shows an increasing trend for 5-day operation (FIG. 21). In contrast to the normalized $G_{DP}$ plot for biofouling, no maximum point was observed in this case. The increasing trend in the normalized $G_{DP}$ is likely to be due to gradual accumulation and concentration polarization (CP) of nutrient when no bacteria are present. Enhanced concentration polarization, CP, of the background salinity could also contribute.

Figure 22:
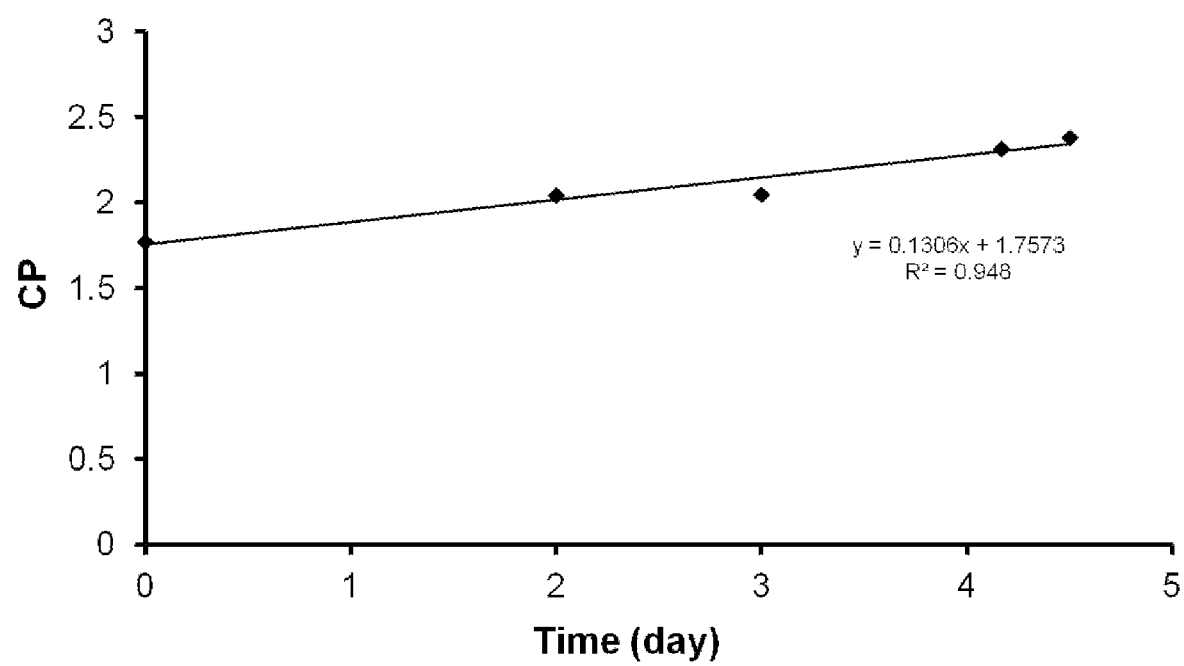
FIG. 22 is a graph showing CP profile for nutrient fouling. Conditions without salt pulse: permeate flux=30 L m$^{-2}$ h$^{-1}$, crossflow velocity=0.15 m s$^{-1}$, RO feed=24 mg L$^{-1}$ NB with 2000 mg L$^{-1}$ NaCl. Conditions for salt pulse: additional salt concentration: 200 mg L$^{-1}$ NaCl, pulse length=10 min.

To verify the role of concentration polarization, a salt pulse tracer test was also conducted to investigate if concentration polarization (CP) had occurred. The results shown in FIG. 22, verified that CP increased during the course of nutrient fouling, confirming the existence of the concentration polarization effect in this type of fouling. Such a CP would also lead to an increase in normalized $G_{DP}$ as observed (FIG. 21).

Example 20: Fouling with Dead Bacteria (Embodiment 2)

To investigate whether the maximum in the normalized $G_{DP}$ trend are related to the presence and colonization by live bacteria on the membrane surface, the inventors performed experiments in which dead bacteria were used in the fouling experiments.

Figure 23:
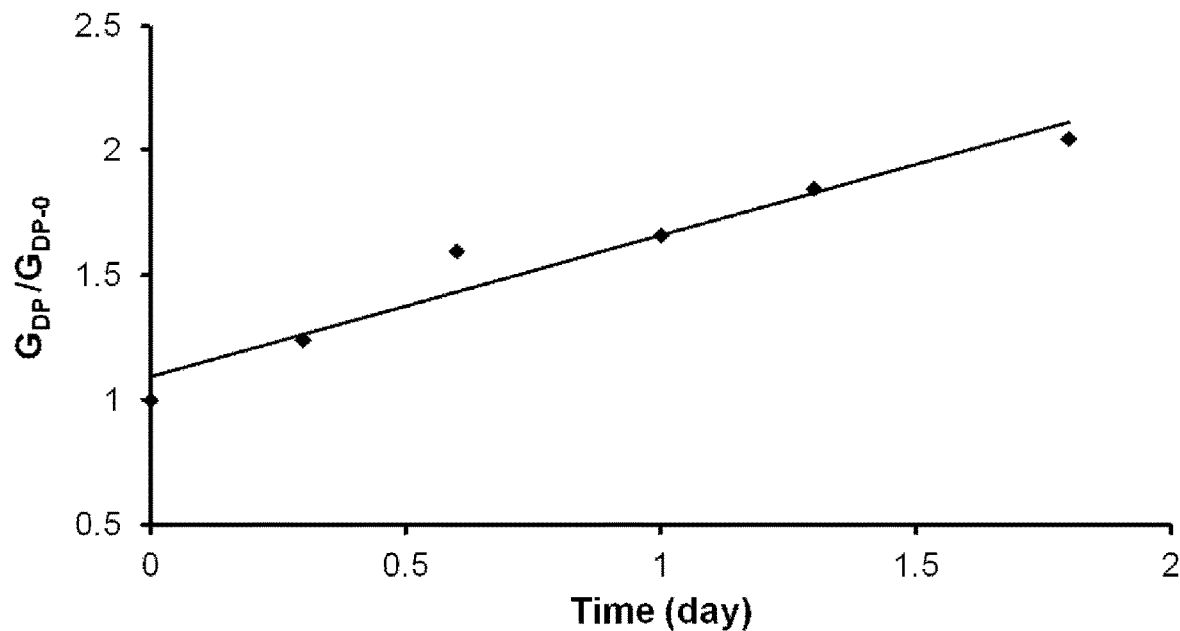
FIG. 23 is a graph showing normalized $G_{DP}$ as a function of time during fouling with dead bacteria (dead bacteria=stock solution heated in 80° C. water bath for 2 hours). Conditions: permeate flux=30 L m$^{-2}$ h$^{-1}$, crossflow velocity=0.15 m s$^{-1}$, RO feed=24 mg L$^{-1}$ NB with 2000 mg L$^{-1}$ NaCl.

FIG. 23 shows a plot of the normalized $G_{DP}$ as a function of time for fouling with dead bacteria. Similar to fouling with nutrient medium only (FIG. 22), the normalized $G_{DP}$ for fouling using dead bacteria increased monotonically as the fouling proceeded and no maximum could be seen.

To investigate whether or not EPS was associated with the $G_{DP}$ trends when live bacteria were used, effects of EPS-like materials on normalized $G_{DP}$ were studied using mixtures of dead bacteria with two different concentrations of alginate. The concentrations of alginate used matched the total organic carbon, TOC values corresponding to 1 and 5 day biofouling.

Figure 24:
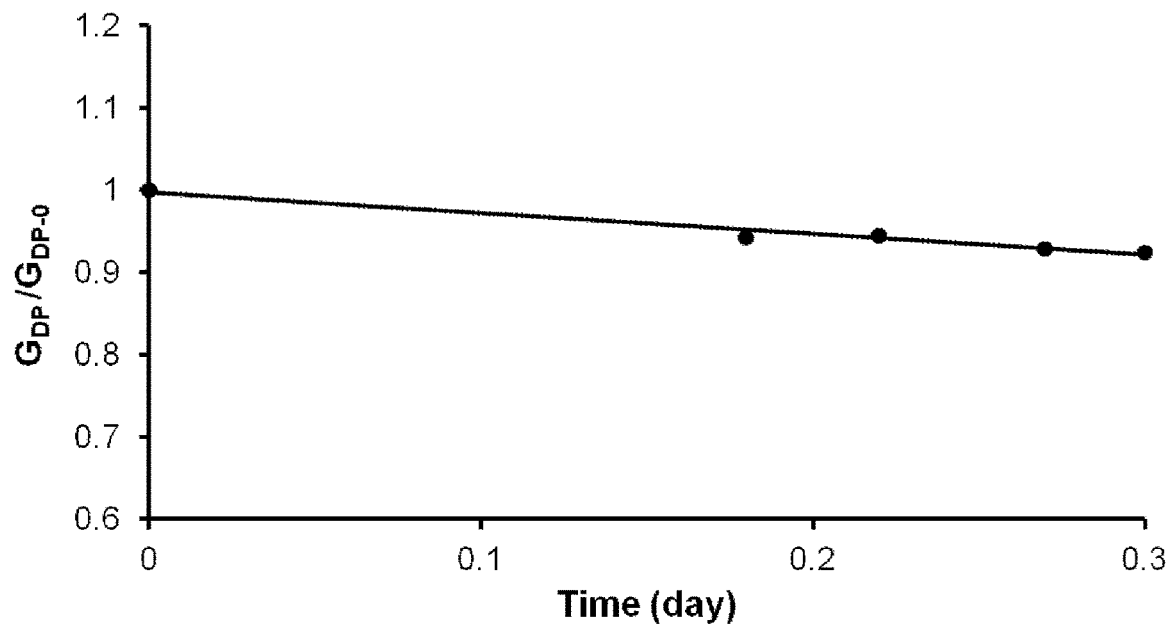
FIGS. 24(A) and (B) are graphs showing normalized $G_{DP}$ as a function of time for (A) fouling with dead bacteria mixed with 100 ppm alginate, and (B) fouling with dead bacteria mixed with 16 ppm alginate. Conditions: permeate flux=30 L m$^{-2}$ h$^{-1}$, crossflow velocity=0.15 m s$^{-1}$, RO feed=24 mg L$^{-1}$ NB, 100 mg L$^{-1}$ or 16 mg L$^{-1}$ alginate with 2000 mg L$^{-1}$ NaCl.
Figure 24:
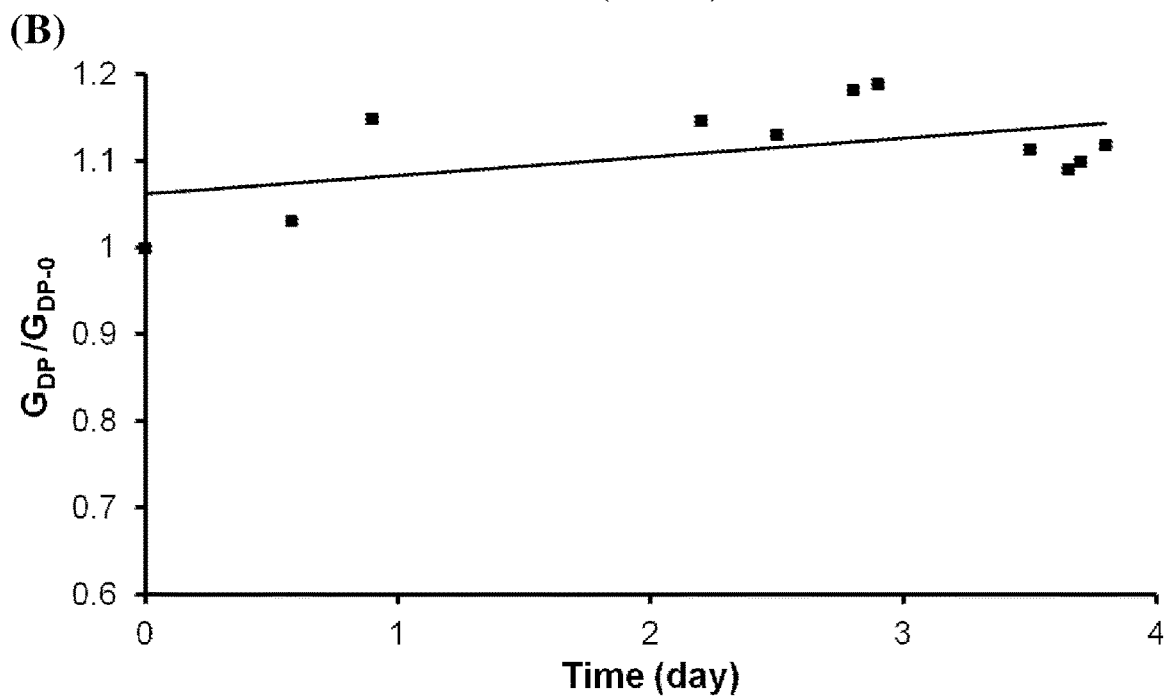

When the alginate concentration (100 ppm) was as high as the EPS produced for the 5-day old biofilm, the normalized $G_{DP}$ decreased (FIG. 24(A)). However, when the alginate concentration (16 ppm) was low, at an equivalence to the TOC in the 1-day old biofilm, the normalized $G_{DP}$ increased slightly (FIG. 24(B)), similar to the trend of fouling with dead bacteria alone. The results obtained thus indicate that the maxima observed in time with fouling with live bacteria can be simulated by fouling with dead bacteria when a build up of alginate is included.

Example 21: Characterization of Biofilms on the Membrane Surface (Embodiment 2)

Figure 25:
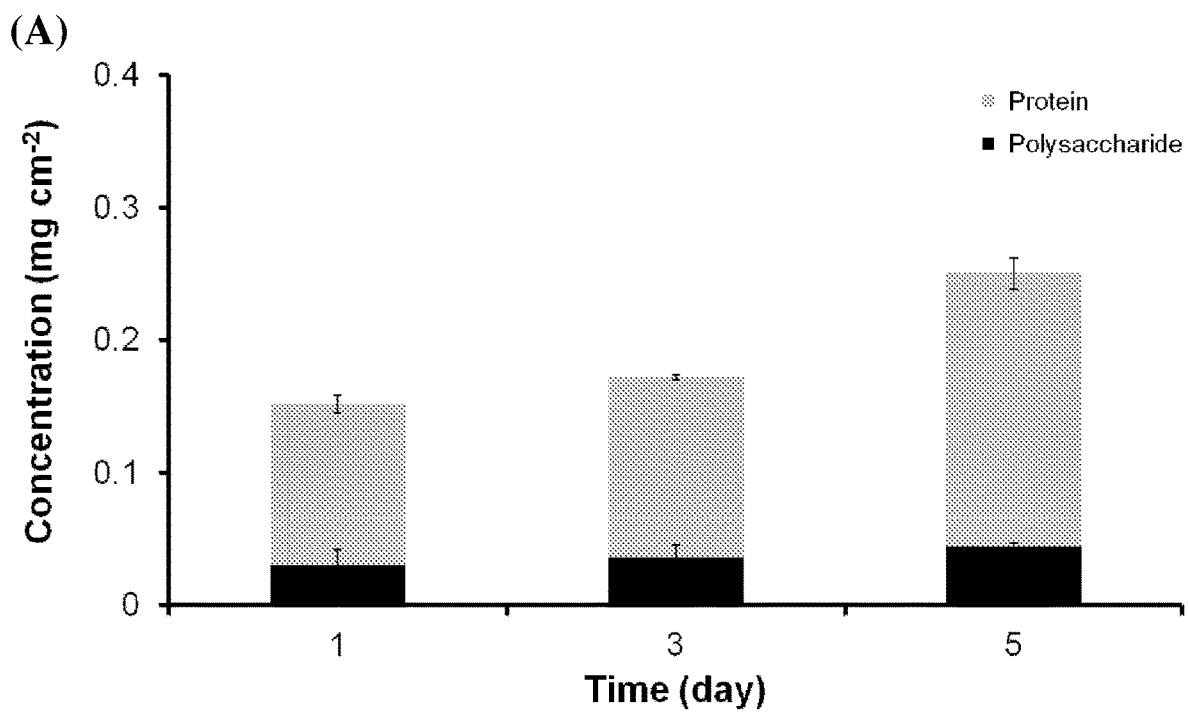
FIG. 25(A) to (C) are graphs showing characterization of biofilms on the RO membranes, where (A) concentrations of EPS (proteins and polysaccharides) determined by the extraction method for different durations of biofouling; (B) average biovolume which consists of live and dead bacteria cells calculated using the IMARIS software; and (C) viable bacteria count for different durations of biofouling. Bars represent standard error, n=3.
Figure 25:
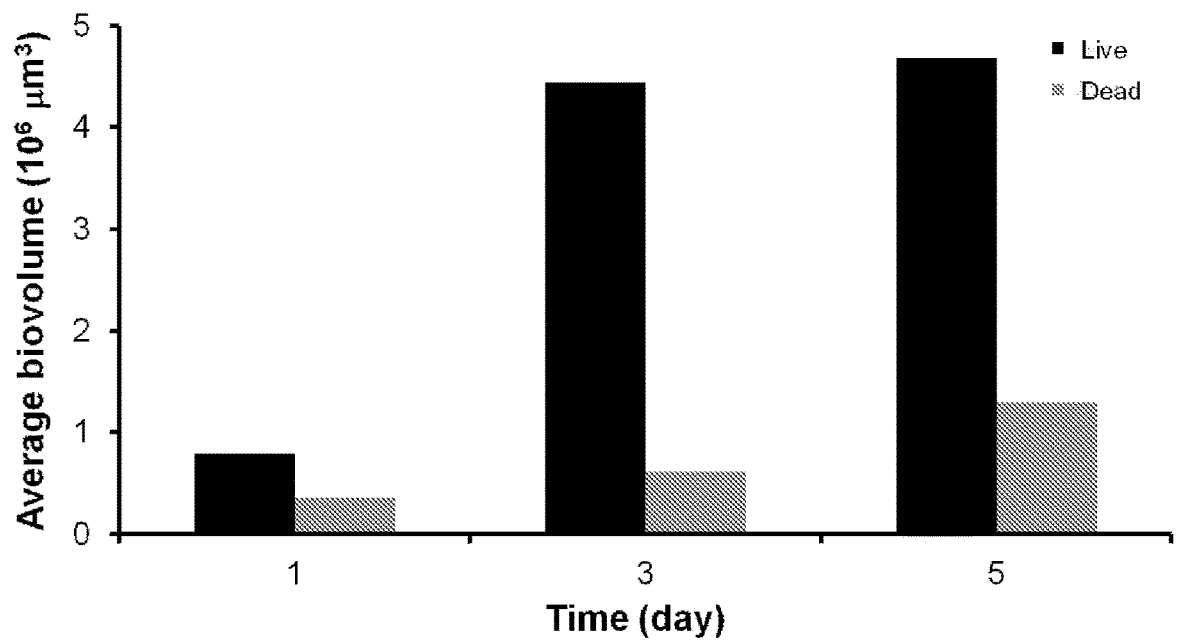
Figure 25:
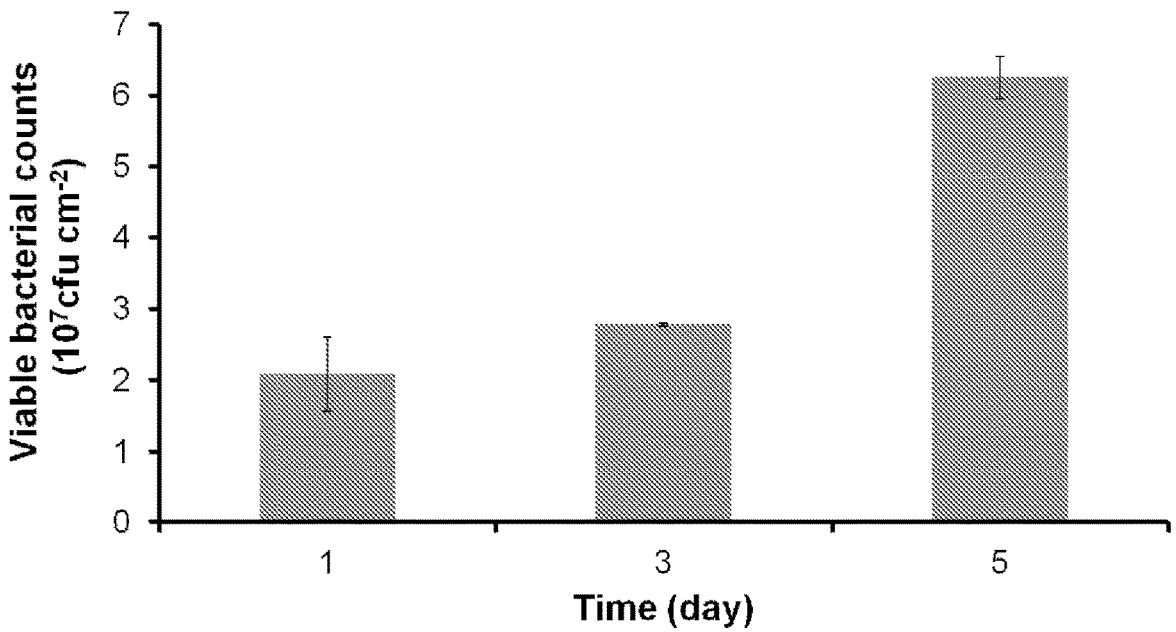

At the end of 1, 3 and 5-day biofouling experiments, images were made of the membrane surface. From the CLSM images, biofilms developed from individual planktonic cells (Inset of FIG. 20) to a slightly dispersed biofilm (Inset of FIG. 19) and then to a more complete coverage at day 5 (Inset of FIG. 18). The concentrations of proteins and polysaccharides which made up the main components of the EPS were determined using the extraction method and the results are shown in FIG. 25(A). The total EPS increased by 13% from day 1 to day 3 whilst there was a 46% increase from day 3 to day 5. This clearly shows that the EPS amount at day 5 was significantly higher as compared to the early stage of the biofouling process.

The bio-volume for live and dead cells was determined and the live cell biovolume for day 3 was more than four-fold compared to that of day 1 (FIG. 25(B)). However, the amount of dead cells for day 5 was twice the amount observed on day 1. The increase in biovolume was also validated by the viable bacterial count (FIG. 25(C)) which increased from $2.08 \times 10^7$ (day 1) to $2.78 \times 10^7$ (day 3) and then to $6.25 \times 10^7$ cfu cm$^{-2}$ (day 5).

Example 22: Effect of Sodium Azide (Embodiment 2)

Figure 26:
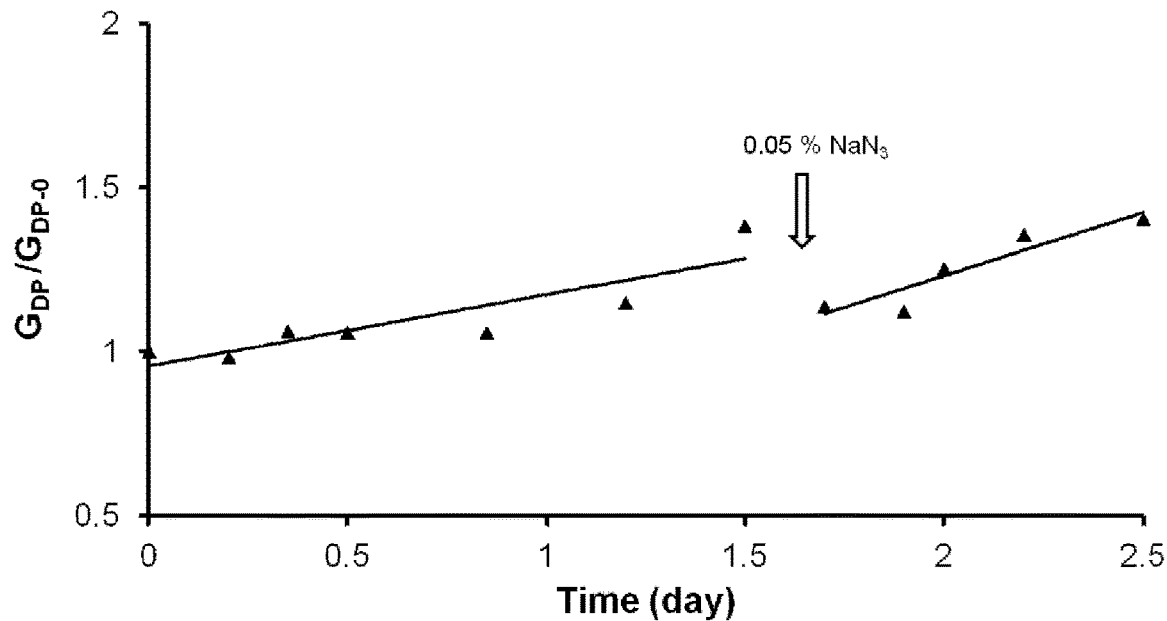
FIGS. 26(A) and (B) are graphs showing (A) normalized $G_{DP}$ as a function of time for biofouling where sodium azide was dosed into the system for 2 hours (concentration=0.05 wt %). After the dosing of sodium azide was stopped, the system was allowed to run continuously without introducing further bacteria; and (B) normalized $G_{DP}$ as a function of time for biofouling with and without the dosing of sodium azide. Sodium azide was dosed into the systems for one hour each, at a crossflow velocity of 0.15 m/s, 24 ppm of nutrient broth with 2000 ppm of aqueous sodium chloride solution in the feed with injection of *Pseudomonas aeruginosa* PA01. Concentration of sodium azide for first and second dosing=0.03 wt % and 0.05 wt %. After the sodium azide dosing was stopped, the system was left to run continuously with bacteria injection.
Figure 26:
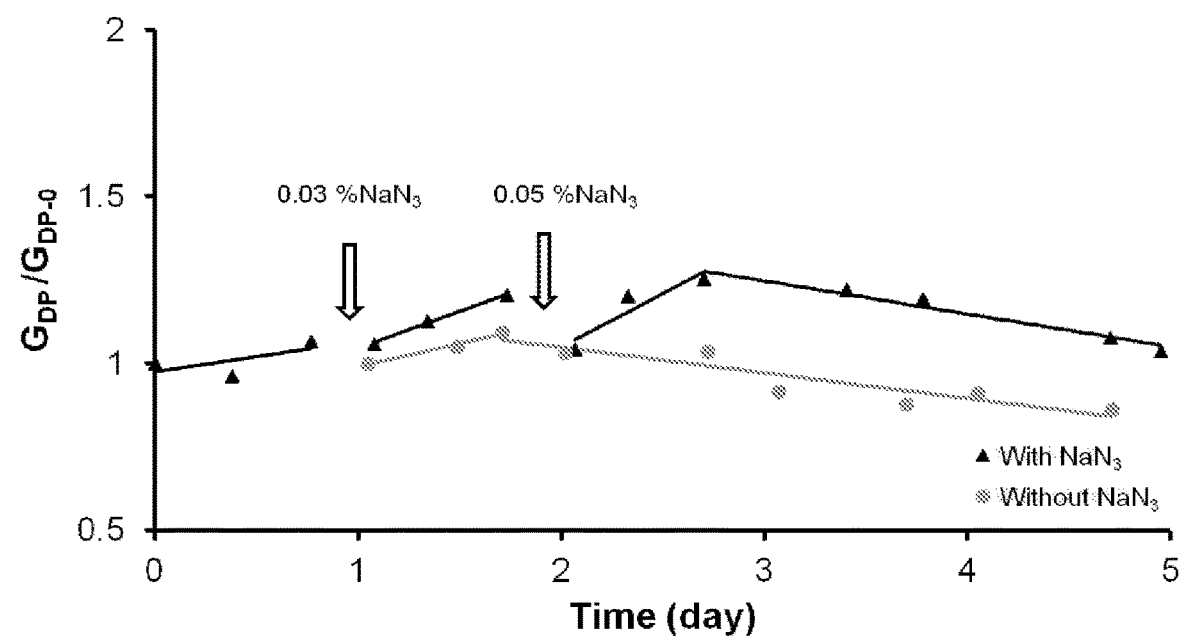

In order to evaluate the EIS spectra when the biofilm growth was disrupted, the biofouling studies were performed with NaN$_3$ dosing during the experiment. FIG. 26(A) shows the normalized $G_{DP}$ when NaN$_3$ was dosed into the system at day 1.5, where the maximum of the peak was normally observed. In contrast to the normalized $G_{DP}$ plots shown in FIG. 18 and FIG. 19, the normalized $G_{DP}$ dropped to the initial value when NaN$_3$ was introduced and was then followed by an increase of the normalized $G_{DP}$ when the system was allowed to run continuously.

To further examine the effect of sodium azide, another experiment was carried out with two cycles of dosing and with a bacterial supply after the introduction of the biostat. In this case (FIG. 26(B)), the first dosing with lower concentration (0.03 wt %) showed an almost unchanged normalized $G_{DP}$. However, the second dosing with higher concentration of NaN$_3$ (0.05 wt %) showed a larger drop of normalized $G_{DP}$ as compared to the first dosing. Interestingly, after two cycles of NaN$_3$ dosing, and with the continuous injection of bacteria into the system, the trend of normalized $G_{DP}$ developed after the disturbance was similar to that of biofouling without dosing with NaN$_3$ (FIG. 18).

Example 23: Effect of Flux (Embodiment 2)

Since the rate of biofilm growth has been reported to increase with imposed flux, it was of interest to compare the initial increase of the normalized $G_{DP}$ at different fluxes (FIG. 27(A) to (E)).

Figure 27:
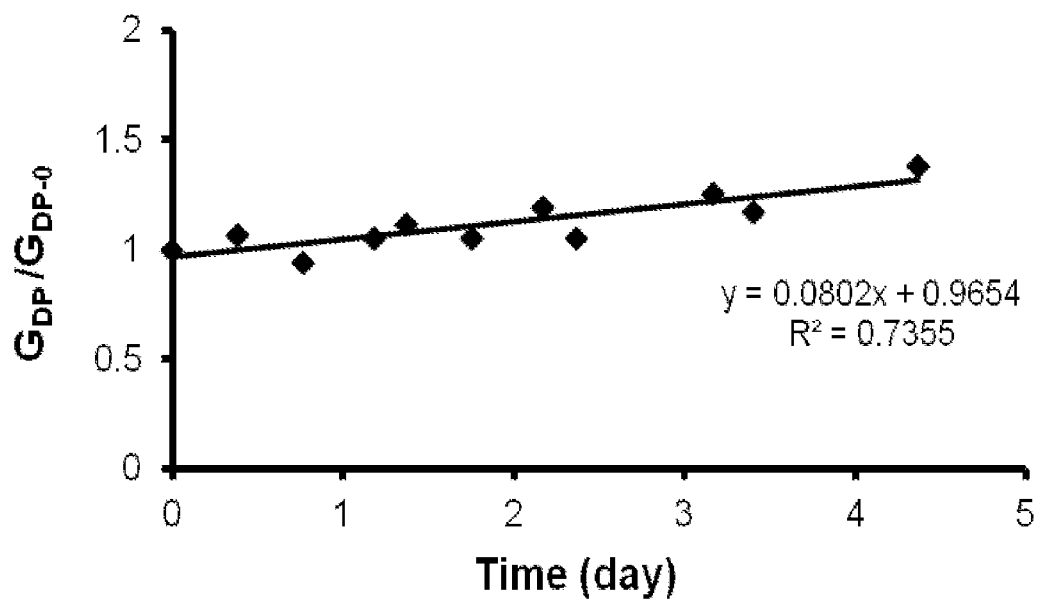
FIG. 27(A) to (E) are graphs showing normalized $G_{DP}$ as a function of time for biofouling at (A) 8 L m$^{-2}$ h$^{-1}$, (B) 15 L m$^{-2}$ h$^{-1}$, (C) 20 L m$^{-2}$ h$^{-1}$, (D) 30 L m$^{-2}$ h$^{-1}$ and (E) 40 L m$^{-2}$ h$^{-1}$ during the initial increase of $G_{DP}$. Conditions: crossflow velocity=0.15 m s$^{-1}$, RO feed=24 mg L$^{-1}$ NB with 2000 mg L$^{-1}$ NaCl.
Figure 27:
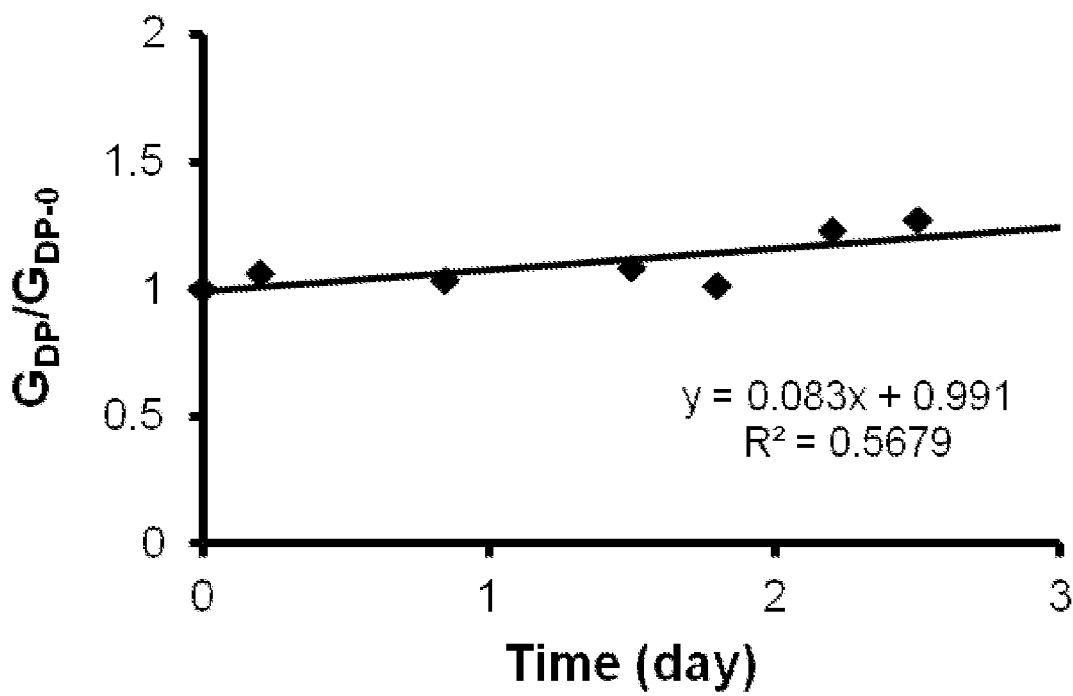
Figure 27:
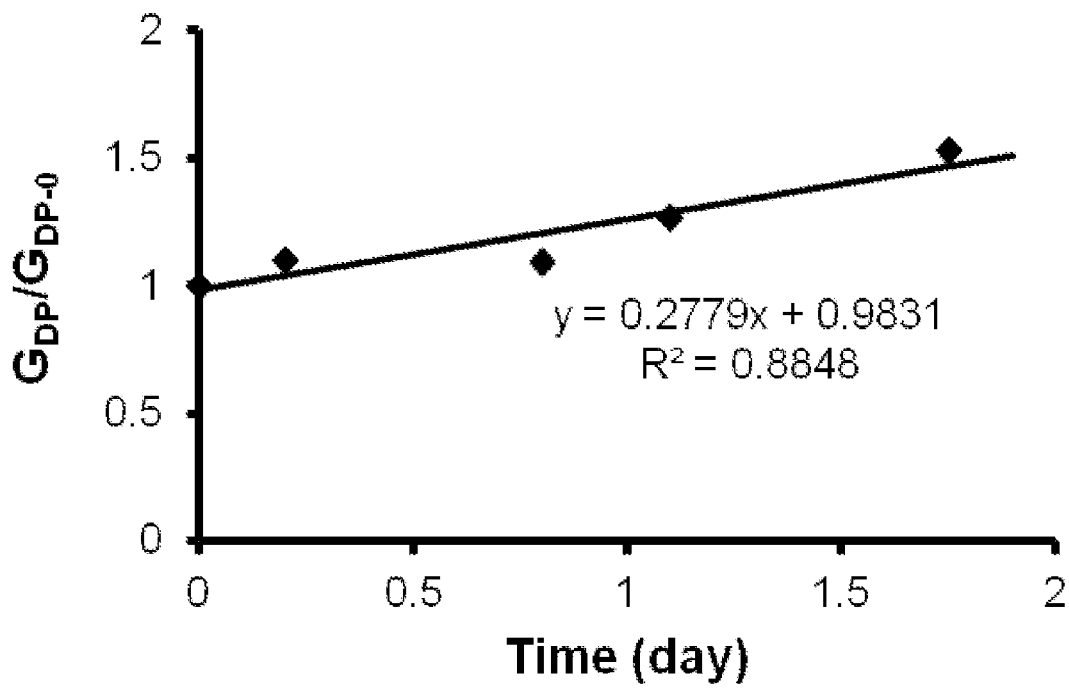
Figure 27:
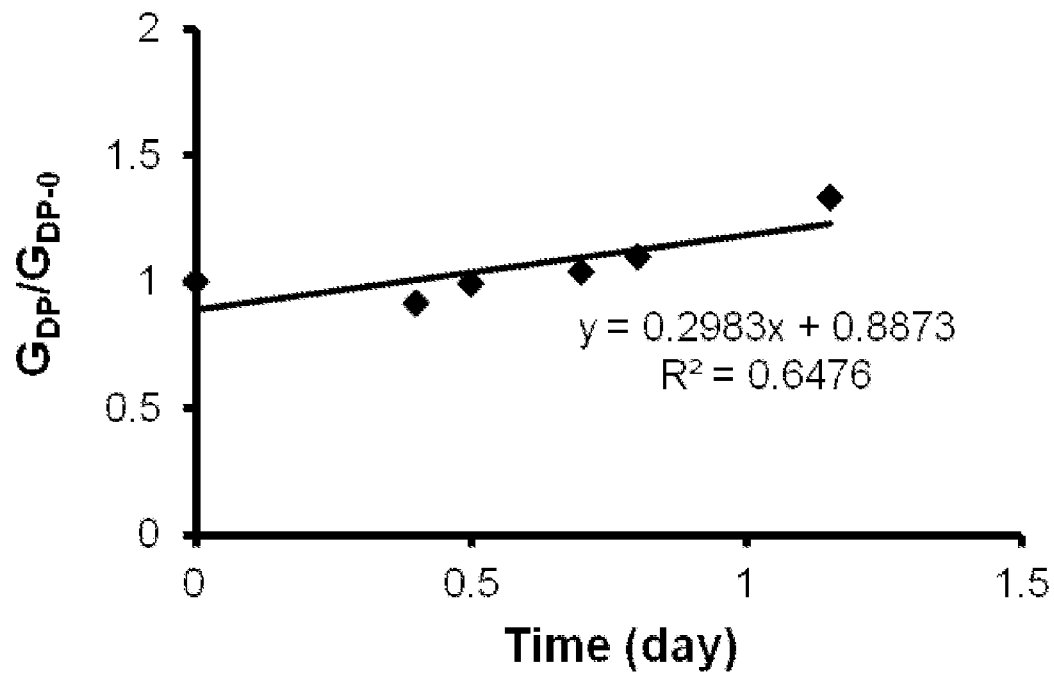
Figure 27:
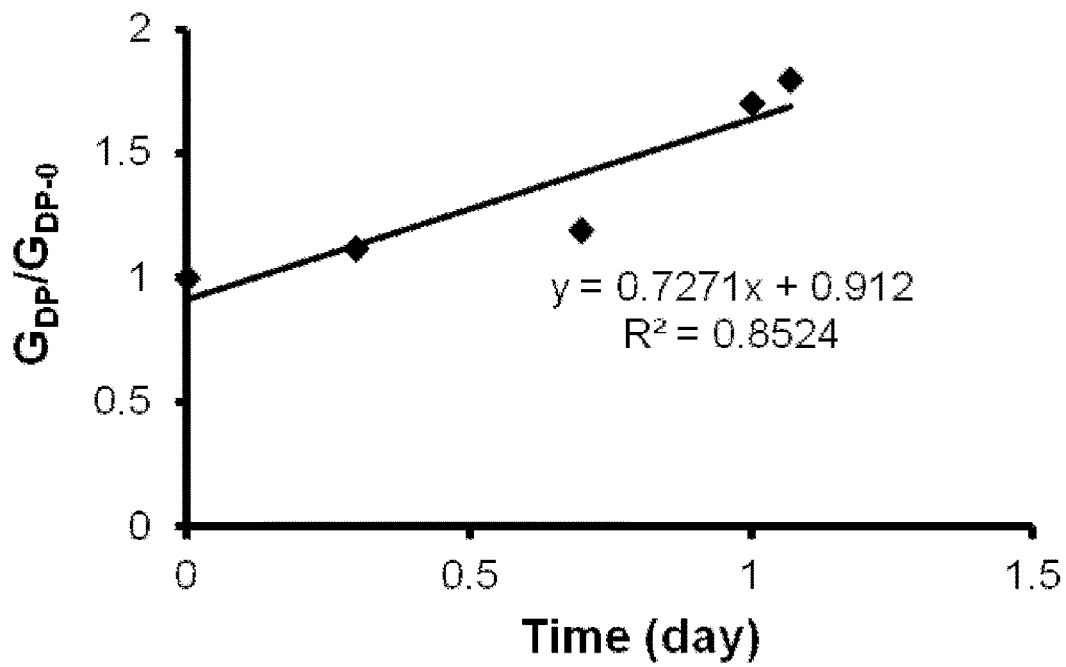

The slopes of the normalized $G_{DP}$ were similar for operating fluxes of 8 L m$^{-2}$ h$^{-1}$ (FIG. 27(A)) and 15 L m$^{-2}$ h$^{-1}$ (FIG. 27(B)) whilst it increased three-fold when the flux was increased from 15 L m$^{-2}$ h$^{-1}$ to 20 L m$^{-2}$ h$^{-1}$ (FIG. 27(C)). The increase in slope was smaller for 20 L m$^{-2}$ h$^{-1}$ and 30 L m$^{-2}$ h$^{-1}$ (FIG. 27(D)) as compared to the significant increase (about 1.4 times) when the flux was changed from 30 L m$^{-2}$ h$^{-1}$ to 40 L m$^{-2}$ h$^{-1}$ (FIG. 27(E)). It should be noted that at 8 and 15 L m$^{-2}$ h$^{-1}$ the normalized $G_{DP}$ profile did not go through a maximum during 5 or 3 days operation respectively, unlike the behavior at higher flux (FIG. 18 and FIG. 19).

The magnitude of the initial increase of the normalized $G_{DP}$ might give an indication of the flux below which the mature biofilm is less likely to form. If that was the case, the process might be more sustainable at these lower fluxes.

Example 24: Mechanisms of Biofilm Formation (Embodiment 2)

These studies clearly indicate that EIS is able to detect the formation of a mature biofilm on the RO membrane surface and provide insights on its development. The normalized $G_{DP}$ plot (FIG. 18 and FIG. 19) shows a maximum point at around 1.5 days which correlates well with the abrupt rise of TMP/TMP$_0$ (FIG. 17). Such a TMP jump was also observed in other studies.

The normalized $G_{DP}$ trends in FIG. 18 and FIG. 19 may be explained as follows. The accumulation of live bacteria on the membrane surface led to an initial increase of the normalized $G_{DP}$ as the bacterial cells and their respiration products are very conductive. The normalized $G_{DP}$ is also enhanced by the accumulation of material by concentration polarization. This period also coincides with the induction phase of biofilm development where bacteria start to attach on the membrane surface before forming micro-colonies. This was consistent with the confocal images taken for a 1 day biofouling experiment where the biofilm had not yet formed on the membrane surface (Inset of FIG. 20).

With the longer biofouling experiments, upon reaching a maximum point, the normalized $G_{DP}$ started to drop due to the substantial formation of EPS. Once bacteria attached on the membrane surface, the cells began to grow and multiply. During this stage, EPS was produced continuously and provided the biofilm with greater structural integrity and this was evident in the confocal image for 5-day biofouling (Inset of FIG. 18).

The accumulation of a tighter EPS matrix reduced the electrically conductivity in the fouling layer, despite concentration polarization effects, resulting in a lower normalized $G_{DP}$ after about 1.5 days. The increase of the EPS content (proteins and polysaccharides) with the longer biofouling duration was confirmed by the extraction method and viable bacterial cell counts. However, the slight increase of the dead cell biovolume from 3 day to 5 day (FIG. 25(B)) suggests that the deposition of EPS within the matrix has a greater impact on the EIS than the accumulation of dead cells itself.

To validate the proposed mechanisms deduced from the EIS signal response, several control studies were conducted, namely (1) nutrient fouling, (2) dead bacteria fouling and (3) mixtures of alginate and dead bacteria fouling.

As nutrient broth (NB) was also added into the system, it was relevant to investigate its effect on the EIS signal response without the presence of bacteria. The normalized $G_{DP}$ (FIG. 21) was found to increase throughout the course of filtration, due to the CP effect as nutrient broth (NB) materials accumulated on the membrane surface. The increasing normalized $G_{DP}$ would also be due to enhanced salt polarization. The CP effect (FIG. 22) was confirmed by the salt pulse tracer test and it clearly indicated the presence of the CP effect during the nutrient fouling.

The bacteria stock solution heated in a 80° C. water bath was used in the study to elucidate its effect on the EIS signal. When dead bacteria were injected, no maximum point was observed in the normalized $G_{DP}$ plot (FIG. 23). With live bacteria, the NB, background salinity and the cell content in the bacteria cells could both contribute to the early conductance increases as explained above, hence, causing the normalized $G_{DP}$ to increase.

The surrogate of EPS, alginate, mixed with dead bacteria was also used in the study to further validate that the decreasing trend in the normalized $G_{DP}$ profiles could be attributed to the accumulation of EPS. The changes of d/dt $[G_{DP\text{-}Norm}]$ for dead bacteria and its mixtures with alginate are summarized in TABLE 1.

TABLE 1

Comparison of d/dt $[G_{DP\text{-}Norm}]$ for fouling with dead bacteria and mixture of alginate with dead bacteria.

| Conditions | d/dt $[G_{DP\text{-}Norm}]$ (1/day) |
| --- | --- |
| Dead bacteria | 0.5635 |
| 16 ppm alginate & dead bacteria | 0.0215 |
| 100 ppm alginate & dead bacteria | −0.2528 |

The decrease in normalized $G_{DP}$ with an alginate concentration equivalent to the total organic carbon (TOC) for a 5-day biofouling experiment (FIG. 24(A)) supports the view that the effect of EPS build-up outweighed the accumulation of dead cells. However, when a lower concentration of alginate (TOC equivalent to 1-day old biofilm) was used with dead bacteria, the accumulation of the bacteria cells on the membrane surface caused a slight increase of normalized $G_{DP}$ (FIG. 24(B)).

Example 25: Effect of Sodium Azide on Biofilm Growth (Embodiment 2)

Sodium azide is known to inhibit the catalytic activity and growth of bacteria. In the present study, *P. aeruginosa* biofilms were allowed to grow and sodium azide was dosed into the system at day 1.5. Its effect could be observed clearly from the normalized $G_{DP}$ plot. Dosing of sodium azide into the system was believed to 1) inhibit the growth of *P. aeruginosa*, leading to reduced production of respiration products and 2) cause the detachment of some bacteria from the membrane surface, resulting in lower normalized $G_{DP}$ after injection (FIG. 26(*a*)). When the system was allowed to continue (after sodium azide dosing) even without the supply of new bacteria, the normalized $G_{DP}$ followed the trend of a 5 day biofouling experiment. This implies that the residual cells subsequently attached onto the membrane surface continued to proliferate and grow, forming eventually a matrix of biofilm material.

When a lower concentration of sodium azide was used (FIG. 26(B)), the normalized $G_{DP}$ remained almost unchanged immediately after the sodium azide dosing. Thereafter, the normalized $G_{DP}$ increased again due to the accumulation of the new bacterial cell supply. However, for the second dosing with a higher concentration of sodium azide, the normalized $G_{DP}$ dropped to a lower value, similar to the case in FIG. 26(A). When fresh bacteria solution was reintroduced into the system the normalized $G_{DP}$ profile showed a similar trend to the 5 day biofouling without NaN$_3$ dosing. Thus, a maximum point in normalized $G_{DP}$ could be observed after about 1 day of biofouling in which the normalized $G_{DP}$ decreases due to the accumulation of EPS. This result demonstrates that EIS could be employed to assess cleaning efficiency or the effectiveness of control strategies for biofouling in water treatment plants.

Example 26: Sustainable Flux Derived from EIS Parameters (Embodiment 2)

Since the initial increase of the normalized $G_{DP}$ was hypothesized to result from the deposition of bacterial cells and their respiration products, it was worthwhile to investigate the rate of the initial increase with respect to flux. The slope of the normalized $G_{DP}$ plot increased with flux, implying that the rate of biofilm growth also varies with flux. This allows for an estimation of sustainable flux, referred to as "a flux in which fouling is minimized to avoid frequent cleaning". This could provide opportunities to tune operations to provide more economically sustainable performance with minimum fouling. This type of monitoring tool for assessing the sustainable flux could be useful in the wastewater industry for plant process optimization at the start-up stage.

As demonstrated herein, biofouling may be detected and its development mechanisms elucidated using the non-invasive and real time monitoring tool of EIS. There were two distinct stages in the time profile of the normalized $G_{DP}$ where the first stage, initial increase, was related to the accumulation of the live bacteria on the membrane surface and the production of the respiration products. The second stage corresponded to the formation of EPS and a biofilm matrix.

The introduction of a biostat (sodium azide) during cleaning operations would slow down the growth of bacteria and would ultimately lead to a detachment of the bacteria from the membrane. The EIS changes observed might thus be of assistance to the plant operators as it establishes the ability of EIS to assess the cleaning efficiency and effectiveness of control measures for biofouling.

The initial increase of the normalized $G_{DP}$ plot could also provide indications of the sustainable flux at which filtration could be carried out in a more economically efficient way with minimal fouling.

EIS in combination with TMP and CLSM autopsy provides considerable insights into the mechanisms of biofilm formation on the membrane surface while TMP or CLSM measurements alone give no direct information on this process. EIS is therefore a potential tool to be incorporated in-situ into a side stream 'canary cell' in high pressure membrane systems to assess their biofouling conditions or the cleaning efficiency in a real time, non-invasively and online.

Example 27: Methodology for Biofouling Monitoring and Detection (Embodiment 3)

Suitable electrodes are fitted to the membrane module such as (1) a flat sheet module, (2) a spiral wound, and (3) a small flat sheet crossflow module connected in parallel to a spiral wound module to act as a "canary" connected to an electrical impedance spectrometer system. The crossflow canary cell that is connected in parallel with the spiral wound modules aims to mimic its fouling behavior in the RO plant.

Impedance measurement was taken periodically over a wide range of frequencies from $10^{-1}$ Hz to $10^5$ Hz. Impedance measurement outcome was then analyzed to obtain the conductance of the diffusion polarization layer ($G_D$p).

Detailed description of $G_{DP}$ is described in the following. The $G_{DP}$ was then normalized with $G_{DP}$ at time 0 of biofouling ($G_{DP-0}$) to obtain the normalized $G_{DP}$.

Figure 28:
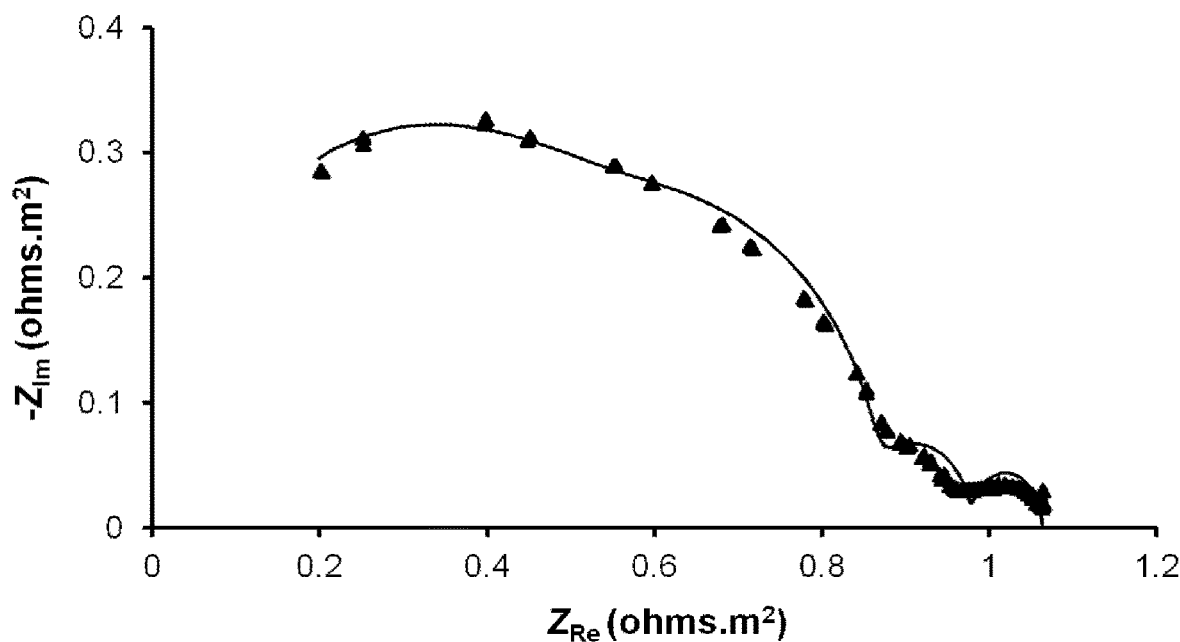
FIG. 28 is a representative Nyquist plot for a bio-fouled RO system obtained from EIS measurement. Conditions: crossflow velocity=0.15 m s$^{-1}$, RO feed=24 mg L$^{-1}$ NB with 2000 mg L$^{-1}$ NaCl. The full line represents the theoretical results obtained from fitting the data to a Maxwell Wagner model of the membrane.
Figure 29:
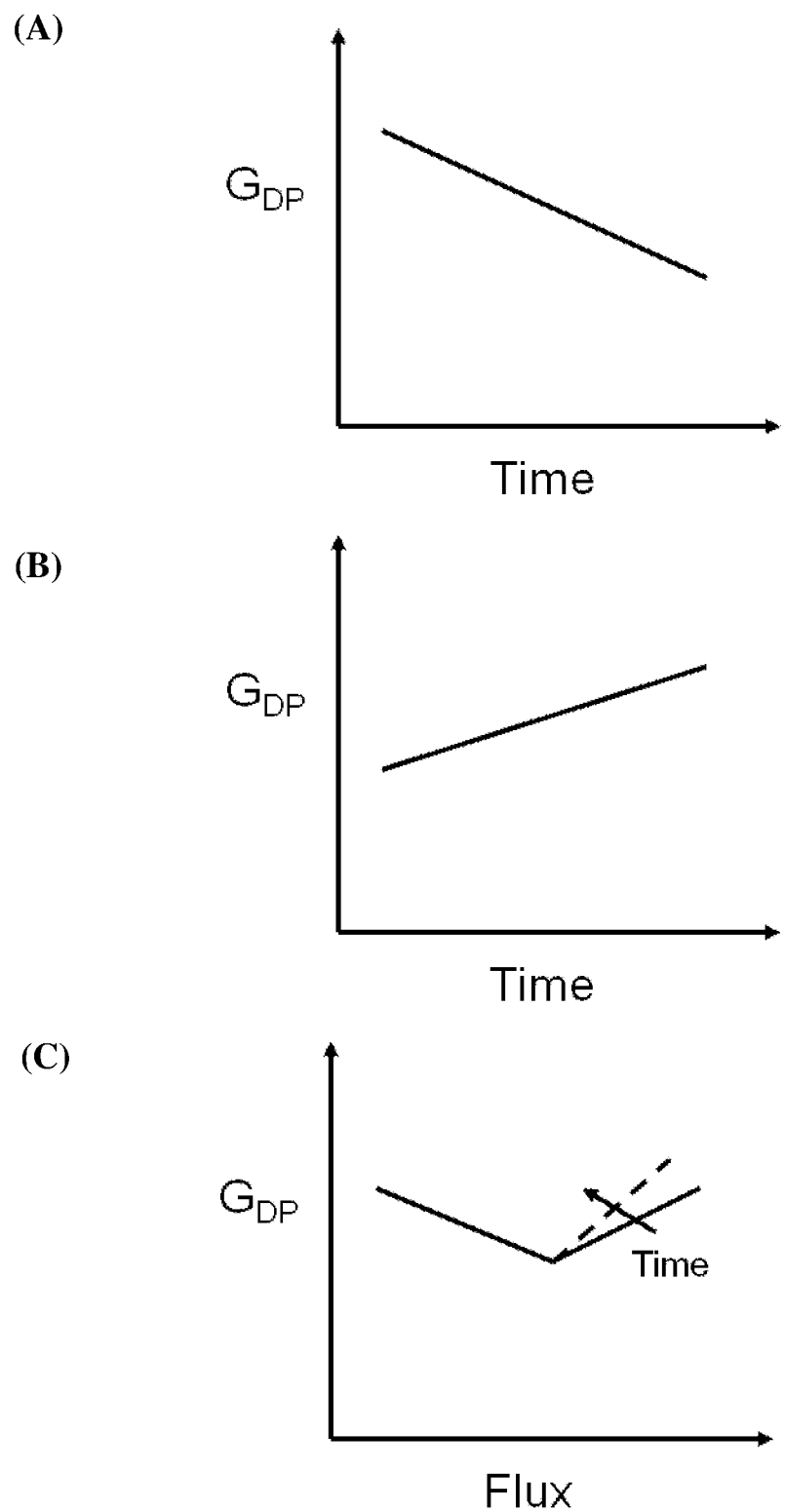
FIG. 29 is shows $G_{DP}$ plots. For the profile shown in (A), a drop in $G_{DP}$ signifies a build-up of a less conductive layer, such as colloidal cake and organics, adjacent to the membrane. In (B), an increase in $G_{DP}$ signifies an increase in conductivity of the layer, which may be due to an increase in ionic species such as salts, adjacent to the membrane. In (C), a decline then increase in $G_{DP}$ signifies a transition in polarization and fouling. The increase of slope of $G_{DP}$ with time indicates formation or presence of a cake with cake enhanced concentration polarization.

Following impedance measurement, Nyquist plots, which are plots of negative imaginary impedance ($-Z_{1m}$) against real impedance ($Z_{Re}$) were generated as shown in FIG. 28. This consisted of a combination of several overlapping semicircles, each of which corresponded to a single time constant element, for example, solution, membrane layers or diffusion polarization processes. In most of the cases, the Nyquist plot provided direct insights on the layers as well as the processes occurring in the system.

The experimental Nyquist plots may be fitted to a model system consisting of a number of layers in the membrane system with different electrical time constants. These electrical time constants were determined by dielectric parameters of layers or ionic electrodiffusion processes. In order to determine where the biofouling was occurring and to understand the phenomenon occurring at the membrane-solution interface, the fitted conductance value for the diffusion polarization layer ($G_{DP}$), corresponding to the element at low frequencies (about 0.01 to 10 Hz) was deduced.

The diffusion polarization (DP) originated from a phenomenological event caused by the alternative accumulation and depletion of ions at the membrane-solution interface during the measurement of impedance using AC currents. This layer was mainly observed in the low frequencies where the half cycle of the AC signal was long and therefore, there was sufficient time for the significant build up of the AC concentration profiles at the solution-membrane interface. For a salt rejecting membrane, such as RO, ions like $Na^+$ and $Cl^-$ tend to accumulate on the surface during filtration as a result of the pressure driven flux as shown in FIG. 1. This was the so-called concentration polarization (CP) effect. The DP layer defined here was not identical to the pressure driven concentration polarization layer, but it was very sensitive to the concentration profile of the $Na^+$ and $Cl^-$ near the membrane surface, both at its feed and permeate sides.

The change of normalized $G_{DP}$ derived from the theoretical fitting result with respect to time is shown in FIG. 18. When the normalized $G_{DP}$ increased and then decreased, this indicated that biofouling was occurring on the membrane surface.

The normalized $G_{DP}$ increases were due to the accumulation of biological cells from the solution at the membrane-solution interface, resulting in a more conductive environment. When the flux was increased, or as time progressed, the biomass on the surface built up and the conductivity continued to increase until eventually a mature biofilm began to form. Conductance at that point started to decrease due to the increase concentration of extracellular polymer substances (EPS) produced by the bacteria.

The accumulation of EPS matrix displaced the salt in the DP layer thereby resulting in a lower normalized $G_{DP}$. The normalized $G_{DP}$ for biofouling with biostat (sodium azide, $NaN_3$) dosing is depicted in FIG. 26B. The biofilm growth on the membrane surface slowed down when biostat was introduced into the system. This can be clearly observed from the EIS data (normalized $G_{DP}$ plot).

REFERENCES

1. T. H. Chong, F. S. Wong, A. G. Fane: in Journal of Membrane Science, vol 314, pages 101-111, 2008

2 H. G. L. Coster, T. C. Chilcott and A. F. C. Coster: in Bioelectrochemistry and Bioenergetics, Vol 40: pages 79-98, 1996

Nomenclature i alternating current
$i_0$ amplitude of current
v voltage
$v_0$ amplitude of voltage
Z impedance (ohms m$^2$)
j imaginary constant
Y admittance (ohms$^{-1}$ m$^{-2}$)
G conductance (S/m$^2$)
C capacitance (F/m$^2$)
$Z_{Re}$ real impedance (ohms m$^2$)
$Z_{Im}$ imaginary impedance (ohms m$^2$)
$G_{DP}$ conductance of diffusion polarization layer (S/m$^2$)
$G_{skin}$ conductance of membrane skin layer (S/m$^2$)
$G_{base}$ conductance of membrane support layer (S/m$^2$)
$J_{crit}$ critical flux (l/m$^2$ h)

Abbreviation

AC Alternating Current
RO Reverse osmosis
TMP Transmembrane pressure
TOC Total organic carbon
CEOP Cake enhanced osmotic pressure
CECP Cake enhanced concentration polarization
EIS Electrical impedance spectroscopy
DP Diffusion polarization
EPS Extra-cellular polymeric substances
MW Maxwell-Wagner circuit model Greek Symbols θ phase difference
ω angular frequency (rad/s)

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An apparatus for assessing a state of fouling of a reverse osmosis system, the apparatus comprising:
    two or more electrodes configured to be arranged on opposing sides of a reverse osmosis membrane,
    an alternating current generator configured to generate an alternating electrical current of various frequencies between the two or more electrodes,
    a detector configured to measure (i) a voltage across the membrane, (ii) a current through the membrane, and (iii) a phase difference between the voltage and the current, at the various frequencies, and
    a processor configured to derive an impedance value in a diffusion polarization layer adjacent to the membrane using the measured voltage, current, and phase difference, and
    a device configured to determine a state of fouling of the reverse osmosis system based on a plurality of the derived impedance values, by:
    (i) determining a critical flux of the reverse osmosis membrane so as to ascertain a sustainable flux condition of the reverse osmosis membrane, wherein determining the critical flux of the reverse osmosis membrane comprises plotting the plurality of the derived impedance values as a function of membrane flux to generate a curve, and determining the membrane flux at a point of change of a slope of the curve,
    (ii) determining a critical flux point of the reverse osmosis membrane as a signal for an incipient fouling event, wherein determining the critical flux point comprises plotting the plurality of the derived impedance values as a function of time to generate a curve, and determining a time at a point of change of a slope of the curve, or
    (iii) monitoring occurrence of biofouling at the reverse osmosis membrane comprised in the reverse osmosis system, wherein each impedance value is a conductance value and is derived while the reverse osmosis membrane comprised in the reverse osmosis system is operating at a same membrane flux or substantially the same membrane flux, determining the state of fouling of the reverse osmosis system based on the plurality of impedance values comprises plotting the conductance values as a function of time to generate a curve and determining presence of a point at which a slope of the curve transitions to a negative slope as indication that biofouling has occurred.

2. The apparatus according to claim 1, wherein the processor is configured to derive the impedance value in the diffusion polarization layer adjacent the membrane by fitting the measured voltage, current, and phase difference to a Maxwell-Wagner model.

3. The apparatus according to claim 1, wherein each derived impedance value is a conductance value and determining the membrane flux at the point of change of the slope of the curve comprises determining the membrane flux at a point at which the slope of the curve transitions to a positive slope.

4. The apparatus according to claim 1, wherein each derived impedance value is a conductance value and determining the time at the point of change of the slope of the curve comprises determining a time at a point at which the slope of the curve transitions to a positive slope in the case of inorganic fouling.

5. The apparatus according to claim 2, wherein the apparatus is configured to assess the state of fouling of the reverse osmosis system on-line.

* * * * *